(12) United States Patent
Lee et al.

(10) Patent No.: US 11,200,021 B2
(45) Date of Patent: Dec. 14, 2021

(54) DISPLAY APPARATUS AND AUTOMOTIVE APPARATUS

(71) Applicant: LG DISPLAY CO., LTD., Seoul (KR)

(72) Inventors: Sungtae Lee, Paju-si (KR); KwanHo Park, Paju-si (KR); YeongRak Choi, Paju-si (KR); Kwangho Kim, Paju-si (KR)

(73) Assignee: LG Display Co., Ltd, Seoul (KR)

(*) Notice: Subject to any disclaimer, the term of this patent is extended or adjusted under 35 U.S.C. 154(b) by 98 days.

(21) Appl. No.: 16/686,669

(22) Filed: Nov. 18, 2019

(65) Prior Publication Data

US 2020/0167122 A1    May 28, 2020

(30) Foreign Application Priority Data

Nov. 23, 2018    (KR) .................. 10-2018-0146672

(51) Int. Cl.
| | |
|---|---|
| G06F 3/16 | (2006.01) |
| G10K 9/122 | (2006.01) |
| G06F 1/16 | (2006.01) |
| B60R 11/02 | (2006.01) |

(52) U.S. Cl.
CPC ............ *G06F 3/16* (2013.01); *B60R 11/0235* (2013.01); *G06F 1/1605* (2013.01); *G10K 9/122* (2013.01)

(58) Field of Classification Search
CPC .......... G06F 3/16; G06F 1/1605; G06F 3/165; G10K 9/122; G10K 9/13; G10K 11/004; G10K 11/002; B60R 11/0235; H04R 7/045; H04R 1/32; H04R 7/04; H04R 2499/13; H04R 2440/00; G02F 1/1333; G02F 1/133308
See application file for complete search history.

(56) References Cited

U.S. PATENT DOCUMENTS

| | | | | |
|---|---|---|---|---|
| 6,731,764 | B2 * | 5/2004 | Asada .................... | H04R 5/02 381/152 |
| 6,807,051 | B2 * | 10/2004 | Takahashi ............. | H04N 5/642 348/E5.13 |
| 6,853,734 | B2 * | 2/2005 | Sahyoun ................ | H04R 1/06 381/403 |
| 7,658,456 | B2 * | 2/2010 | Aikawa .................. | H04N 5/64 312/7.2 |

(Continued)

FOREIGN PATENT DOCUMENTS

| | | |
|---|---|---|
| CN | 203933946 U | 11/2014 |
| CN | 108462917 A | 8/2018 |

(Continued)

OTHER PUBLICATIONS

Office Action dated Mar. 22, 2021, issued in corresponding Chinese Patent Application No. 201911156411.9.

*Primary Examiner* — Oyesola C Ojo
(74) *Attorney, Agent, or Firm* — Morgan, Lewis & Bockius LLP

(57) ABSTRACT

A display apparatus includes a display panel configured to display an image, a supporting member configured to support the display panel, at least one sound generating device in the display panel, to the at least one sound generating device being configured to vibrate the display panel to generate sound, and a connection member at a lower portion of the supporting member to correspond to a center of the at least one sound generating device.

40 Claims, 26 Drawing Sheets

(56) References Cited

U.S. PATENT DOCUMENTS

| | | | |
|---|---|---|---|
| 10,674,271 B2* | 6/2020 | Ikeuchi | H04R 7/26 |
| 2005/0254682 A1* | 11/2005 | Maekawa | H04R 9/043 |
| | | | 381/404 |
| 2006/0227981 A1* | 10/2006 | Miyata | H04R 7/04 |
| | | | 381/124 |
| 2007/0189576 A1* | 8/2007 | Chan | H04R 9/06 |
| | | | 381/404 |
| 2009/0261694 A1* | 10/2009 | Yamanaka | G06F 1/1601 |
| | | | 312/7.2 |
| 2010/0046788 A1* | 2/2010 | Harris | H04R 9/043 |
| | | | 381/404 |
| 2017/0280246 A1* | 9/2017 | Choi | H04R 9/066 |
| 2020/0322728 A1 | 10/2020 | Choi et al. | |
| 2021/0014449 A1* | 1/2021 | Maeshiba | H04R 1/2811 |

FOREIGN PATENT DOCUMENTS

| | | |
|---|---|---|
| CN | 108810760 A | 11/2018 |
| JP | 2013-219720 A | 10/2013 |

* cited by examiner

DISPLAY APPARATUS AND AUTOMOTIVE APPARATUS

This application claims the benefit and priority to Korean Patent Application No. 10-2018-0146672, filed on Nov. 23, 2018, the entirety of which is incorporated herein by reference.

BACKGROUND

Technical Field

The present disclosure relates to a display apparatus and an automotive apparatus.

Discussion of the Related Art

Recently, as society advances toward an information-oriented society, the field of display apparatuses for visually displaying an electrical information signal has rapidly advanced. Therefore, various display apparatuses having excellent performance, such as thinness, light weight, and low power consumption, are being developed.

For example, display apparatuses may be categorized into liquid crystal display (LCD) apparatuses, field emission display (FED) apparatuses, organic light emitting display apparatuses, etc.

The LCD apparatuses include an array substrate including a thin film transistor (TFT), an upper substrate including a color filter and/or a black matrix, and a liquid crystal layer between the array substrate and the upper substrate. The LCD apparatuses are apparatuses in which an alignment state of the liquid crystal layer is adjusted with an electric field generated between two electrodes in a pixel area, and a transmittance of light is adjusted based on the alignment state, thereby displaying an image.

The organic light emitting display apparatuses, which are self-emitting devices, have low power consumption, a fast response time, high emission efficiency, excellent luminance, and a wide viewing angle.

SUMMARY

Display apparatuses display an image on a display panel, and a separate speaker is generally installed for providing a sound. When a speaker is installed in a display apparatus, a sound generated by the speaker travels to a rear surface of the display panel or toward a region under the display panel, instead of toward a front surface of the display panel, and for example, does not travel in a direction toward a viewer who is watching an image displayed on the display panel. Due to this, an immersion experience of the viewer is hindered.

Moreover, a sound generated by a speaker travels toward a rear surface of a display panel or toward a region under the display panel. As such, the quality of the sound is degraded due to interference of a sound reflected from a wall or a floor.

Moreover, when a speaker is included in a set device such as a television (TV), a laptop computer, or a computer monitor, the speaker occupies a certain space. Thus, the design and space disposition of the set apparatus are limited.

Accordingly, embodiments of the present disclosure are directed to provide a display apparatus and an automotive apparatus that substantially obviate one or more of issues due to limitations and disadvantages of the related art.

Therefore, the inventors have recognized the above-described problems and have performed various experiments so that when watching an image in front of a display panel, a traveling direction of a sound becomes a direction toward a front surface of the display panel, and thus, sound quality is enhanced. Through the various experiments, the inventors have invented a display apparatus having a new structure, which outputs a sound so that a traveling direction of the sound becomes a direction toward a front surface of a display panel, thereby enhancing sound quality.

An aspect of the present disclosure is to provide a display apparatus including a sound generating device that generates sound travelling toward a region in front of a display panel.

Another aspect of the present disclosure is to provide a display apparatus including a sound generating device having a new structure for enhancing sound.

Additional features and aspects will be set forth in the description that follows, and in part will be apparent from the description, or may be learned by practice of the inventive concepts provided therein. Other features and aspects of the inventive concepts may be realized and attained by the structure particularly pointed out in the written description, or derivable therefrom and the claims hereof as well as the appended drawings.

To achieve these and other aspects of the inventive concepts as embodied and broadly described, a display apparatus comprises a display panel configured to display an image, a supporting member configured to support the display panel, at least one sound generating device in the display panel, the at least one sound generating device being configured to vibrate the display panel to generate sound, and a connection member at a lower portion of the supporting member, the connection member being disposed to correspond to a center of the at least one sound generating device.

In another aspect, a display apparatus comprises a display panel configured to display an image and including a first region, a second region, and a third region, a supporting member configured to support the display panel, at least one sound generating device in the display panel and at least one of the first region, the second region, and the third region, a connection member between the supporting member and the at least one sound generating device, a first partition between the display panel and the supporting member, the first partition including a first side and a second side vertical to the first side, a second partition between the first region and the third region, and a third partition between the second region and the third region.

In another aspect, an automotive apparatus comprises a vehicle body and a display apparatus or a sound generating device in the vehicle body.

Since the display apparatus according to the embodiments of the present disclosure may include the sound generating device that vibrates the display panel to generate a sound, the sound of the display apparatus may be output to a region in front of the display panel. Accordingly, immersion of a viewer who is watching an image displayed by the display apparatus may be enhanced.

Moreover, in the display apparatus according to the embodiments of the present disclosure, since the sound generating device may be provided in the display panel, the sound generating device may be slimmed and may enhance a sound. Accordingly, an automotive apparatus may be implemented with the display apparatus or the sound generating device according to the embodiments of the present disclosure.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this application, illustrate embodiments of the disclosure and together with the description serve to explain the principles of the disclosure.

Figure 1A:
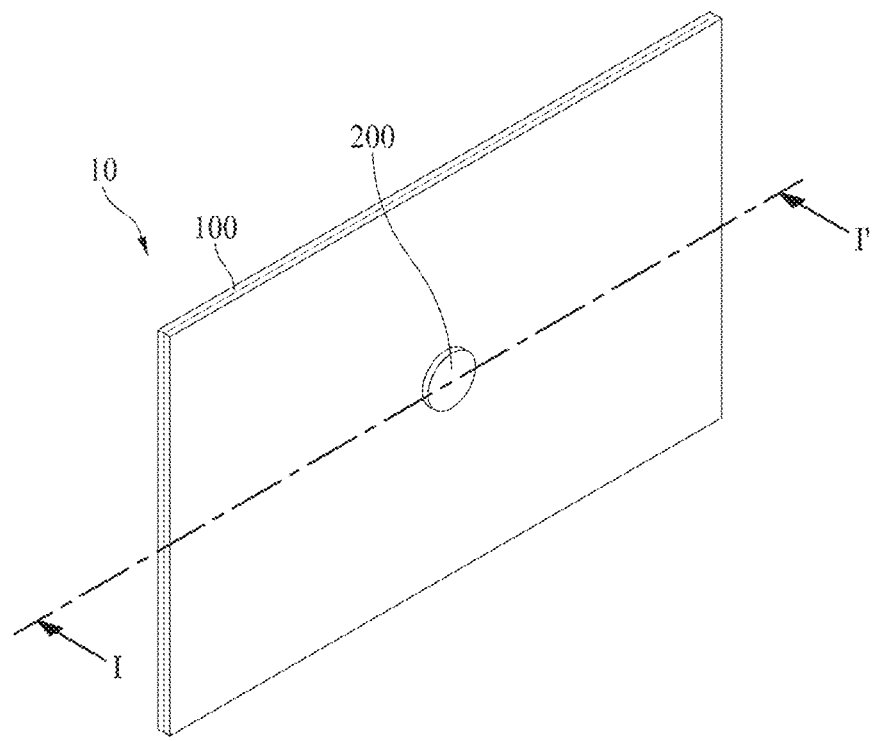
FIG. 1A illustrates a display apparatus including a sound generating device according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to the exemplary embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where "comprise," "have," and "include" described in the present specification are used, another part may be added unless "only" is used. The terms of a singular form may include plural forms unless referred to the contrary.

In construing an element, the element is construed as including an error range although there is no explicit description.

In describing a position relationship, for example, when a position relation between two parts is described as "on," "over," "under," and "next," one or more other parts may be disposed between the two parts unless "just(ly)" or "direct(ly)" is used.

In describing a time relationship, for example, when the temporal order is described as "after," "subsequent," "next," and "before," a case which is not continuous may be included unless "just(ly)" or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as "first," "second," "A," "B," "(a)," "(b)," etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

Features of various embodiments of the present disclosure may be partially or overall coupled to or combined to each other, and may be variously inter-operated to each other and driven technically as those skilled in the art can sufficiently understand. Embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device (or a set electronic apparatus) such as a notebook computer, a TV, a computer monitor, an equipment apparatus including an automotive apparatus or another type apparatuses for vehicles, or a mobile electronic apparatus such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set apparatus which is a final consumer apparatus or an application product including the LCM or the OLED module.

In some embodiments, an LCM or an OLED module including a display panel and a driver may be referred to as a narrow-sense display apparatus, and an electronic apparatus that is a final product including an LCM or an OLED module may be referred to as a set apparatus. For example, the narrow-sense display apparatus may include a display panel, such as an LCD or an OLED, and a source printed circuit board (PCB) that is a controller for driving the display panel. The set apparatus may further include a set PCB that is a set controller electrically connected to the source PCB to overall control the set apparatus.

A display panel applied to an embodiment of the present disclosure may use any type of display panel, such as a liquid crystal display panel, an organic light emitting diode (OLED) display panel, and an electroluminescent display panel, but is not limited to any particular type of display panel that is vibrated by a sound generation device according to an embodiment of the present disclosure to output sound. Also, a shape or a size of a display panel applied to a display apparatus according to an embodiment of the present disclosure is not limited.

For example, if the display panel is the liquid crystal display panel, the display panel may include a plurality of gate lines, a plurality of data lines, and a plurality of pixels respectively in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached to the display panel. However, embodiments are not limited to the metal plate, and the display panel may include another structure.

Hereinafter, embodiments of the present disclosure will be described in detail with reference to the accompanying drawings.

FIG. 1A illustrates a display apparatus including a sound generating device according to an embodiment of the present disclosure.

FIG. 1A illustrates a rear surface of a display apparatus 10. With reference to FIG. 1A, the display apparatus 10 may include a display panel 100, which may display an image, and a sound generating device 200. The sound generating device 200 may vibrate the display panel 100 to generate sound. The sound generating device 200 may be on a rear surface of the display panel 100. That is, the display apparatus 10 may include the sound generating device 200, which may vibrate the display panel 100 to generate sound.

The display panel 100 may display an image (for example, an electronic image or a digital image) and may be implemented as any type of display panel, such as a liquid crystal display panel, an organic light emitting diode (OLED) display panel, an electroluminescent display panel, etc. The display panel 100 may vibrate based on a vibration of the sound generating device 200 to output sound.

According to an embodiment of the present disclosure, the display panel 100 may display an image in a type such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a region in front of a base substrate to allow an image to be displayed. In the bottom emission type, the visible light emitted from the pixel array layer may be irradiated onto a rearward region behind the base substrate to allow an image to be displayed.

Moreover, the sound generating device 200 may generate sound using the display panel 100 as a vibration plate. The sound generating device 200 may be referred to as an "actuator," an "exciter," or a "transducer," but is not limited thereto. For example, the sound generating device 200 may be a sound device for outputting a sound according to an electrical signal.

Figure 1B:
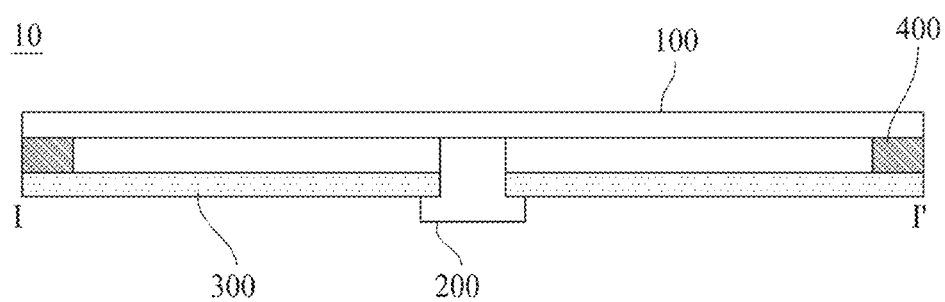
FIG. 1B is a cross-sectional view taken along line I-I' of FIG. 1A.

FIG. 1B is a cross-sectional view taken along line I-I' of FIG. 1A.

With reference to FIG. 1B, the display apparatus may include the sound generating device 200 and a supporting member 300.

The supporting member 300 may support one or more of a rear surface and a side surface of the display panel 100. Also, the sound generating device 200 may be fixed to the supporting member 300.

The supporting member 300 may be, for example, a cover bottom. For example, the supporting member 300 may include a middle cabinet, which may be coupled or connected to a cover bottom to surround the side surface (or a lateral surface) of the display panel 100 and accommodates one edge or periphery of the display panel 100 to support the display panel 100. For example, the middle cabinet may include a sideways-'T'(-|)-shaped cross-sectional surface. The supporting member 300 may include the cover bottom, or may include the cover bottom and the middle cabinet, but is not limited thereto. For example, the supporting member 300 may include an arbitrary structure that supports the rear surface or the side surface of the display panel 100.

The supporting member 300 may be a plate member that may be provided on the rear surface of the display panel 100 or all over the display panel 100. For example, the supporting member 300 may cover the whole rear surface of the display panel 100 to be spaced apart from the rear surface. Also, the supporting member 300 may have a plate shape formed of a glass material, a metal material, or a plastic material. Here, an edge or a sharp corner of the supporting member 300 may have a tetragonal (e.g., quadrilateral) shape or a curved shape, e.g., through a chamfer process or a corner rounding process. According to an embodiment, the supporting member 300 including the glass material may include sapphire glass. For example, the supporting member 300 including the metal material may include one or more of aluminum (Al), an Al alloy, a magnesium (Mg) alloy, and an iron (Fe)-nickel (Ni) alloy. As another example, the supporting member 300 may have a stacked structure including a metal plate and a glass plate, the metal plate may have a thickness relatively thinner than the glass plate and the glass plate may face the rear surface of the display panel 100. For example, a rear surface of the display apparatus 10 may be used as a mirror surface due to the metal plate. However, embodiments are not limited to the above materials or shape.

Moreover, the supporting member 300 may include a hole or a through-hole into which the sound generating device 200 may be inserted or accommodated. For example, the hole or the through-hole may be perforated in a certain partial region of the supporting member 300 along a thickness direction of the supporting member 300 to have a circular shape or a polygonal shape, for the sound generating device 200 to be inserted into the through-hole.

Moreover, in the present disclosure, the supporting member 300 may be referred to as a "cover bottom," a "plate bottom," a "back cover," a "base frame," a "metal frame," a "metal chassis," a "chassis base," or an "m-chassis." Therefore, the supporting member 300 may be a supporter for supporting the display panel 100 and may be implemented as any type of frame or plate structure, on the rear surface of the display apparatus.

An adhesive member 400 may be at an edge or periphery of the display panel 100 and the supporting member 300. For example, the adhesive member 400 may be between the rear surface of the display panel 100 and an upper surface of the supporting member 300. The adhesive member 400 may attach the display panel 100 to the supporting member 300. Also, the adhesive member 400 may include a double-sided tape, a single-sided tape, an adhesive, a bond, and/or the like, but is not limited thereto.

Figure 2A:
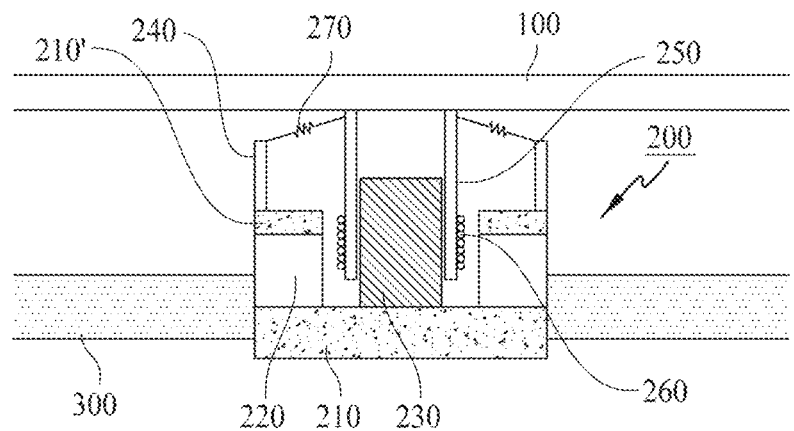
FIGS. 2A and 2B are cross-sectional views of a sound generating device according to an embodiment of the present disclosure.
Figure 2B:
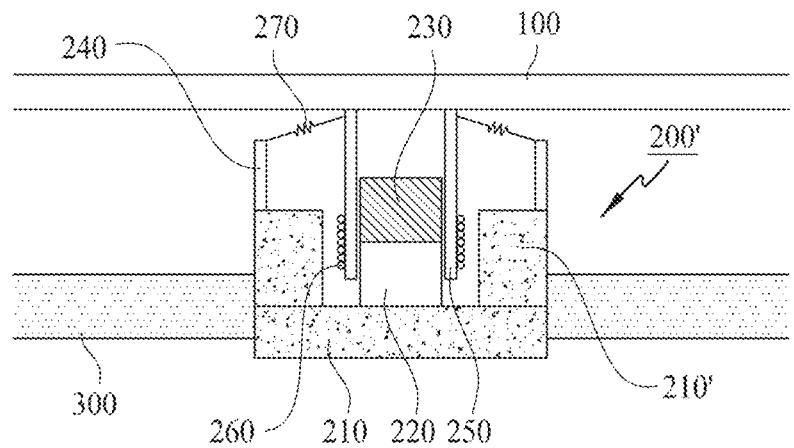

FIGS. 2A and 2B are cross-sectional views of a sound generating device according to an embodiment of the present disclosure.

The sound generating device may be classified into a first structure in which a magnet may be outside a coil, and a second structure in which a magnet may be inside a coil. The first structure may be referred to as a "dynamic type" or an "external magnetic type." Also, the second structure may be referred to as a "micro type" or an "internal magnetic type."

FIG. 2A illustrates the first structure, and FIG. 2B illustrates the second structure.

With reference to FIG. 2A, a sound generating device 200 may include a plurality of plates (for example, first and second plates) 210 and 210', a magnet 220 on a corresponding plate, a center pole 230 disposed on a corresponding plate, a bobbin 250 near the center pole 230, and a coil 260 wound around the bobbin 250.

For example, the magnet 220 may be on the first plate 210, and the second plate 210' may be on the magnet 220. The first plate 210 and the second plate 210' may support the magnet 220 and may fix the sound generating device 200 to a supporting member 300. Therefore, the first plate 210 may be fixed to a supporting hole in the supporting member 300, and the magnet 220 may be fixed and supported between the first plate 210 and the second plate 210'.

At least one of the first plate 210 and the second plate 210' may include a material, such as iron (Fe). Each of the first plate 210 and the second plate 210' is not limited to the term. For example, the first plate 210 or the second plate 210' may be referred to as a "yoke."

The magnet 220 may be implemented with a sintered magnet such as barium ferrite, and a material of the magnet 220 may use iron (III) oxide ($Fe_2O_3$), barium carbonate ($BaCO_3$; "witherite"), a neodymium magnet, strontium ferrite ($Fe_{12}O_{19}Sr$), e.g., with an improved magnet component, an alloy cast magnet including Al, nickel (Ni), and cobalt (Co), and/or the like, but is not limited thereto. For example, the neodymium magnet may be neodymium-iron-boron (Nd—Fe—B). However, embodiments are not limited thereto.

A frame 240 may be on the second plate 210' along an edge or periphery of the first plate 210. A center pole 230 may be in a center region of the first plate 210. Also, the center pole 230 and the first plate 210 may be provided as one body. Also, the center pole 230 may be referred to as "pole pieces." For example, pole pieces may be further on the center pole 230.

The bobbin 250 may surround the center pole 230. The coil 260 may be wound around a certain lower region (for example, a lower outer surface of the bobbin 250) of the bobbin 250. For example, the coil 260 may be wound around a lower outer surface of the bobbin 250, and a voice signal or a current for generating a sound may be applied to the coil 260.

The bobbin 250 may include a ring (cylindrical) structure, including a material obtained by processing pulp or paper, Al or Mg or an alloy thereof, synthetic resin such as polypropylene, or a polyamide-based fiber. The generic term for the bobbin 250 and the coil 260 may be a voice coil.

Moreover, a damper 270 may be between the frame 240 and a partial region of an upper portion of the bobbin 250. The damper may be referred to as an edge or the like.

FIG. 2B illustrates the second structure in which a magnet may be disposed inside a coil.

With reference to FIG. 2B, a sound generating device 200' having the second structure may include a magnet 220 on a first plate 210, a center pole 230 on the magnet 220, a bobbin 250 near the magnet 220 and the center pole 230, and a coil 260 wound around the bobbin 250.

For example, the first plate 210 may be fixed to a supporting hole of a supporting member 300. The magnet 220 may be on the first plate 210, and the center pole 230 may be on the magnet 220. Also, the center pole 230 may be referred to as "pole pieces." For example, pole pieces may be further on the center pole 230.

The bobbin 250 may surround the magnet 220 and the center pole 230, and the coil 260 may be wound around an outer surface of the bobbin 250.

A second plate 210' may be near the first plate 210, and a frame 240 may be fixed to the second plate 210'. For example, the frame 240 may be on or outside of the second plate 210'. For example, a damper 270 may be between the frame 240 and the bobbin 250.

In comparison with the first structure in which a magnet may be outside a coil, the second structure including an internal magnet may be small in leakage of magnetic flux and may reduce a total size of a sound generating device.

The sound generating device applied to the display apparatus according to an embodiment of the present disclosure is not limited to the first structure illustrated in FIG. 2A and the second structure illustrated in FIG. 2B. For example, the display apparatus according to an embodiment of the present disclosure may include another kind of sound generating device, which may vibrate a display panel to generate sound.

Figure 3A:
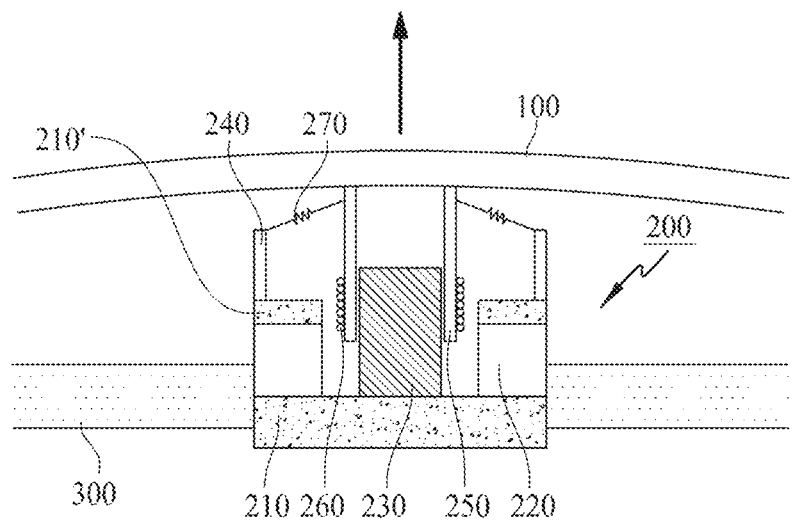
FIGS. 3A and 3B are diagrams for describing a sound generating operation performed by a sound generating device having a first structure according to an embodiment of the present disclosure.
Figure 3B:
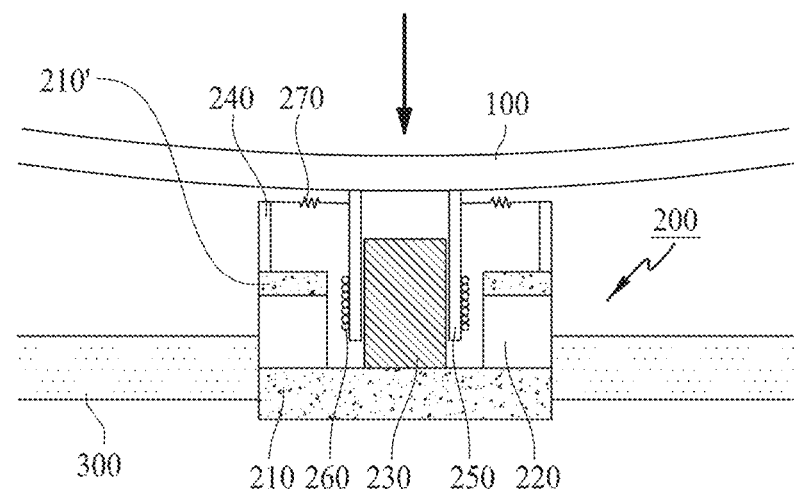

FIGS. 3A and 3B are diagrams for describing a sound generating operation performed by a sound generating device having a first structure according to an embodiment of the present disclosure.

FIG. 3A illustrates a state in which a current may be applied.

The center pole 230 may be a north (N)-pole, and the second plate 210' connected to an upper surface of the magnet 220 may be a south (S)-pole, and an external magnetic field may be generated around the coil 260. The north and south poles may be interchangeable.

In this state, when a current for generating a sound is applied to the coil 260, an application magnetic field may be generated around the coil 260, and a force for moving the bobbin 250 to an upper portion may be generated by the application magnetic field and an external magnetic field. For example, when a current is applied to the coil 260, a magnetic field may be generated around the coil 260. Thus, the bobbin 250 may be guided by the center pole 230, and may move to the upper portion according to Fleming's Left-Hand Rule for Motors based on the application magnetic field and the external magnetic field generated by the magnet 220.

Therefore, one surface of the bobbin 250 may contact a rear surface of the display panel 100. Thus, the bobbin 250 may vibrate the display panel 100 in an upward direction (illustrated by an arrow) according to whether a current is applied to the coil 260 or not, and a sound wave (or a sound) may be generated by the vibration of the display panel 100.

In this state, when the application of the current stops or a reverse current is applied, as illustrated in FIG. 3B, a force for moving the bobbin 250 to a lower side may be generated according to the principle similar to description given above with reference to FIG. 3A, and the display panel 100 may vibrate in a downward direction (illustrated by an arrow).

The damper 270 may be between a portion of an upper portion of the bobbin 250 and the frame 240. The damper 270 may be provided in a creased structure and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more or vibrates by a certain height or less, the bobbin 250 may be restored to an original position by the restoring force of the damper 270.

Therefore, the display panel 100 may vertically vibrate based on an application direction and level of a current applied to the coil 260. A sound wave may be generated by the vibration.

Figure 4A:
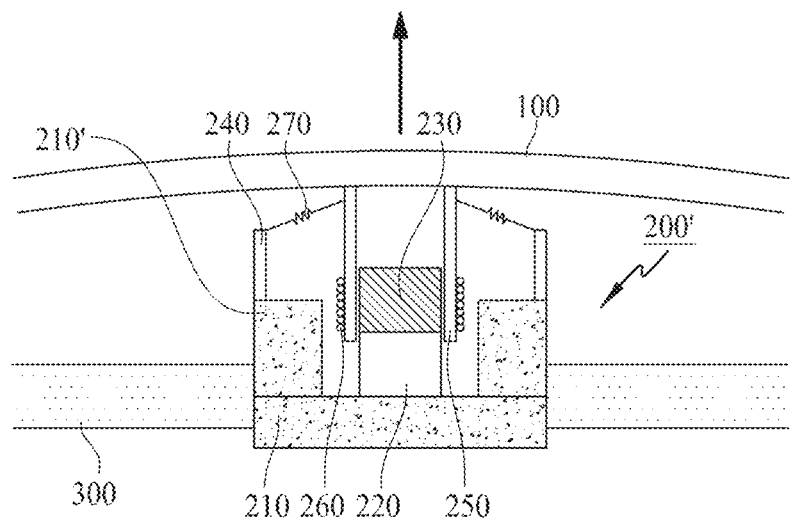
FIGS. 4A and 4B are diagrams for describing a sound generating operation performed by a sound generating device having a second structure according to an embodiment of the present disclosure.
Figure 4B:
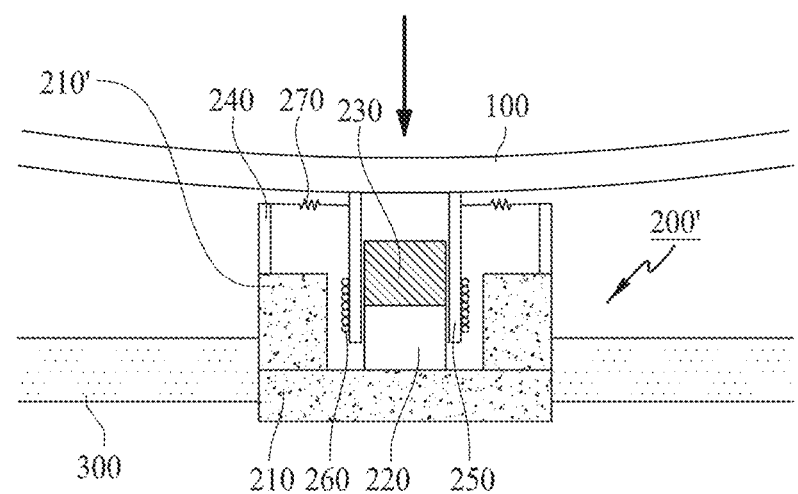

FIGS. 4A and 4B are diagrams for describing a sound generating operation performed by a sound generating device having a second structure according to an embodiment of the present disclosure.

FIG. 4A illustrates a state in which a current may be applied.

The second plate 210' may be an S-pole, and the center pole 230 connected to an upper surface of the magnet 220 may be an N-pole, whereby an external magnetic field may be generated around the coil 260. The S-pole and the N-pole may switch therebetween, and if the S-pole and the N-pole switches therebetween, the sound generating device may identically operate by correcting a winding direction of the coil 260. In this state, when a current for generating a sound is applied to the coil 260, an application magnetic field may be generated around the coil 260, and a force for moving the bobbin 250 to an upper side may be generated by the application magnetic field and an external magnetic field. For example, when a current is applied to the coil 260, an application magnetic field may be generated around the coil 260. Thus, the bobbin 250 may be guided by the center pole 230 and may move to the upper side according to Fleming's Left-Hand Rule for Motors based on the application magnetic field and the external magnetic field generated by the magnet 220.

Therefore, one surface of the bobbin 250 may contact a rear surface of the display panel 100. Thus, the bobbin 250 may vibrate the display panel 100 in an upward direction (illustrated by an arrow) according to whether a current is applied to the coil 260 or not, and a sound wave (or a sound) may be generated by the vibration of the display panel 100.

In this state, when the application of the current stops or a reverse current is applied, as illustrated in FIG. 4B, a force for moving the bobbin 250 to a lower side may be generated according to the principle similar to description given above with reference to FIG. 4A, and the display panel 100 may vibrate in a downward direction (illustrated by an arrow).

The damper 270 may be between a partial region of an upper portion of the bobbin 250 and the frame 240. The damper 270 may be provided in a creased structure having elasticity and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more or vibrates by a certain height or less, the bobbin 250 may be restored to an original position by the restoring force of the damper 270.

Therefore, the display panel 100 may vertically vibrate based on an application direction and level of a current applied to the coil 260. A sound wave may be generated by the vibration.

Figure 5:
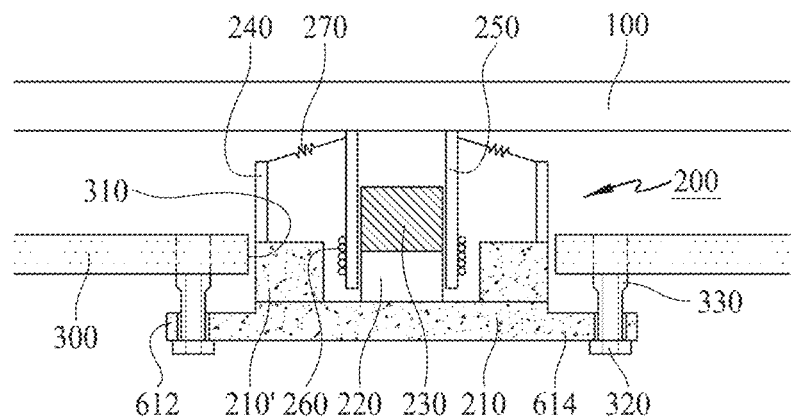
FIG. 5 illustrates a connection structure of a supporting member and a sound generating device according to an embodiment of the present disclosure.

FIG. 5 illustrates a connection structure of a supporting member and a sound generating device according to an embodiment of the present disclosure.

In an embodiment of the present disclosure, any of a sound generating device having the first structure and a sound generating device having the second structure may be applied. Hereinafter, a sound generating device having the second structure will be described as an example.

With reference to FIG. 5, a sound generating device 200 may include a diameter enlargement part 614. The diameter enlargement part 614 may be provided as one body with a first plate 210 of the sound generating device 200. One side of the first plate 210 may include a protrusion that may be greater than a diameter of the other portion of the first plate 210. A protrusion region having an enlarged diameter may be referred to as a "diameter enlargement part 614." The diameter enlargement part 614 may be provided in a ring shape. Also, an extension part 612 for fixing the sound generating device 200 may be provided in a portion of the diameter enlargement part 614.

A screw 320 and a nut 330 may be provided in the extension part 612. The sound generating device 200 may be coupled to a supporting member 300 by the screw 320 using the nut 330 fixed to the supporting member 300. The nut 330 may be, for example, a self-clinching nut. An example of the self-clinching nut may include PEM® nut, and the present embodiment is not limited thereto. Also, the sound generating device 200 may be accommodated into a supporting hole 310 provided in the supporting member 300.

If the self-clinching nut is used, a portion of a vibration generated by the sound generating device 200 may be absorbed by the self-clinching nut, which may be the nut 330. Thus, a vibration transferred to the supporting member 300 may be reduced. Also, the display panel 100 may be attached to the bobbin 250 of the sound generating device 200.

As described above with reference to FIG. 5, a sound generating device may be coupled or connected to a display panel through a supporting hole of a supporting member. However, there may be a problem in which a rear surface of the supporting member needs the supporting hole, and external particles may penetrate into the inside of the display panel through the supporting hole. Also, because the sound generating device may be exposed at the rear surface of the supporting member, a sense of beauty in appearance may be reduced by the sound generating device exposed at the rear surface of the supporting member. Also, since a protection cover for protecting the sound generating device may be needed for preventing damage of the sound generating device exposed at the rear surface of the supporting member, there may be a problem in which a process of adding the protection cover may be needed or a thickness of the sound generating device may be thickened by the protection cover.

Therefore, the present inventors have performed various experiments for configuring the sound generating device, which may be provided in the display panel without being coupled to the supporting member by the supporting hole of the supporting member. Through the various experiments, the present inventors have recognized that a thickness of the sound generating device should be reduced for configuring the sound generating device in the display panel. When the sound generating device is thick, the present inventors have recognized that there may be a problem in which a thickness of the display panel may be thickened, the image quality of the display panel or an image displayed by the display panel may be adversely affected, and a sense of beauty in appearance is reduced. Therefore, to reduce a thickness of the sound generating device, it may be required to reduce a thickness of element in the sound generating device. For example, when a thickness of a magnet may be reduced, a magnetic flux density may decrease, causing a problem in which a sound pressure may be lowered. Also, when a height (or a thickness) of a bobbin is lowered, a winding width of a coil wound around the bobbin may be reduced. Thus, a magnetic force of the sound generating device may be weakened, causing a problem in which an articulation of a tone may be reduced or a sound pressure may be lowered. Also, a line through which an electrical signal may be transferred to a coil may cause a problem in which an interference sound may occur in the sound generating device due to interference by a damper. Therefore, through various experiments, the present inventors have invented a sound generating device having a new structure, in which a thickness of the sound generating device may be reduced by widening an area of the sound generating device, and a sound is not affected. This will be described below with reference to FIG. 6.

Figure 6:
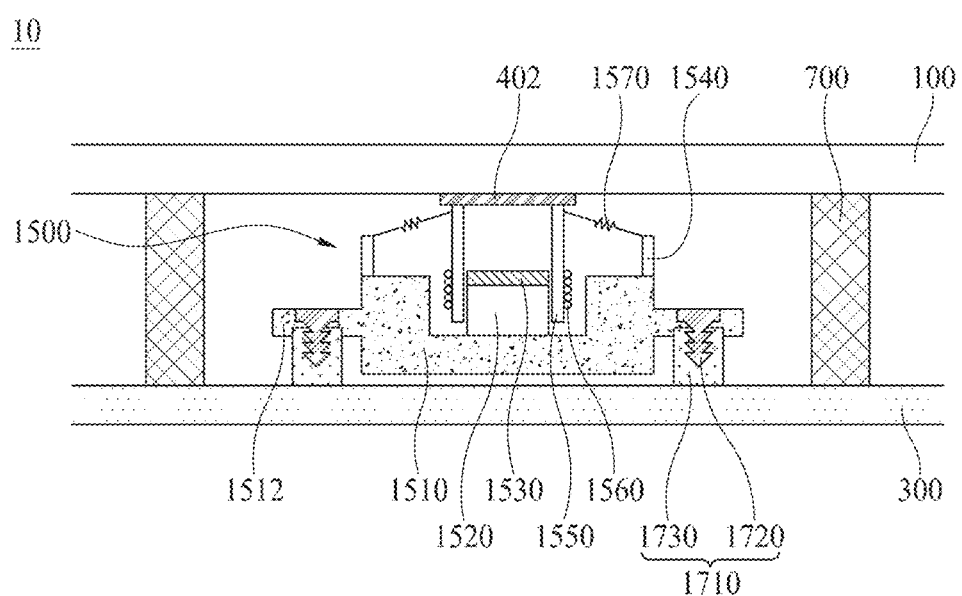
FIG. 6 illustrates a display apparatus including a sound generating device according to an embodiment of the present disclosure.

FIG. 6 illustrates a display apparatus including a sound generating device according to an embodiment of the present disclosure.

In an embodiment of the present disclosure, any of a sound generating device having the first structure and a sound generating device having the second structure may be applied. Hereinafter, the second structure will be described as an example.

With reference to FIG. 6, a display apparatus 10 according to an embodiment of the present disclosure may include a display panel 100 and a sound generating device 1500. The sound generating device 1500 may be in the display panel 100. For example, the sound generating device 1500 may be between the display panel 100 and a supporting member 300.

The sound generating device 1500 may include a magnet 1520 on a plate 1510, a center pole 1530 on the magnet 1520, a bobbin 1550 near the magnet 1520 and the center pole 1530, and a coil 1560 wound around an outer portion of the bobbin 1550. A frame 1540 may be on the plate 1510. Also, a damper 1570 may be between the frame 1540 and the bobbin 1550. A description of the sound generating device 1500 may be substantially similar to description given above with reference to FIG. 2, and thus, may be omitted.

The display panel 100 may be attached to the bobbin 1550 of the sound generating device 1500 by an adhesive member 402. The adhesive member 402 may include a double-sided tape, a single-sided tape, an adhesive, a bond, and/or the like, but is not limited thereto. Also, as illustrated in the FIG. 6, the adhesive member 402 may be provided in a portion in which the sound generating device 1500 may be attached to the display panel 100, but is not limited thereto. For example, the adhesive member 402 may be provided on a whole rear surface of the display panel 100. For example, the adhesive member 402 may be provided on a whole surface between the display panel 100 and the sound generating device 1500.

A coupling or connection member 1710 may be in an extension part 1512 of the plate 1510. For example, the coupling or connection member 1710 may be in the supporting member 300. The coupling member 1710 may include a screw 1720 and a nut 1730. The screw 1720 and the nut 1730 may be in the supporting member 300, and the sound generating device 1500 may be fixed to the supporting member 300 by the screw 1720 and the nut 1730. The nut 1730 may be, for example, a self-clinching nut. An example of the self-clinching nut may include PEM® nut, but embodiments are not limited thereto.

For example, in the sound generating device 1500, the supporting member 300 may be coupled or connected to the nut 1730 by a press-fitting manner without a supporting hole of the supporting member 300. The press-fitting manner may use a saw-toothed press-fitting manner, and embodiments are not limited to a coupling manner or a coupling shape. Therefore, the sound generating device 1500 may be in the display panel 100. For example, the sound generating device 1500 may be between the display panel 100 and the supporting member 300 by the coupling or connection member 1710. Therefore, a sound generating device may be in the display panel, and thus, a supporting hole of a supporting member may not be provided, thereby preventing penetration of external particles through the supporting hole of the supporting member. Also, when the sound generating device is not exposed at a rear surface of the supporting member, a display apparatus having an aesthetic appearance may be provided, and damage of the sound generating device may be reduced or prevented.

The present inventors have recognized that, when the sound generating device 1500 is between the display panel 100 and the supporting member 300 by the coupling member 1710, sound quality is degraded. That will be described below with reference to FIG. 7.

Figure 7:
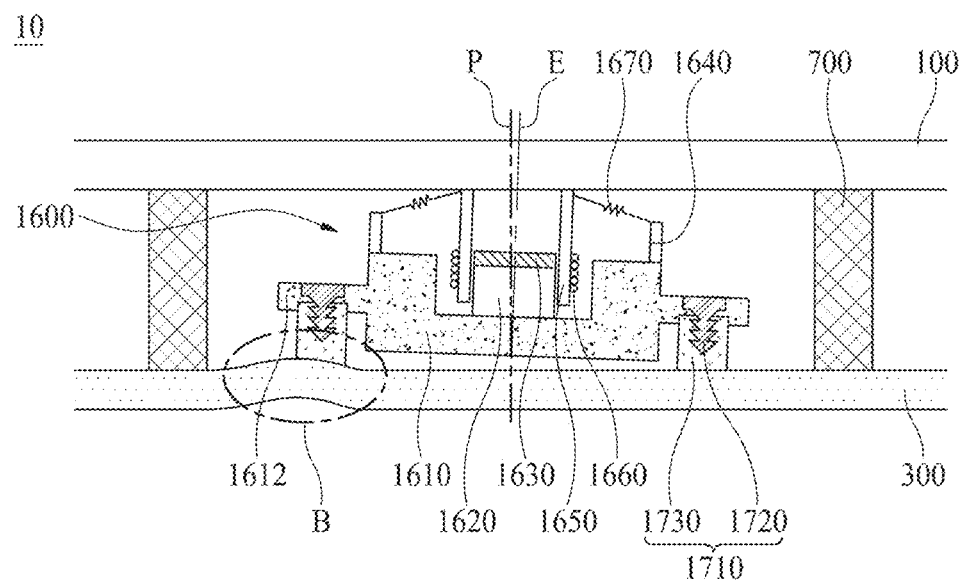
FIG. 7 illustrates a display apparatus including a sound generating device according to an embodiment of the present disclosure.

FIG. 7 illustrates a display apparatus including a sound generating device according to an embodiment of the present disclosure.

The sound generating device 1500 may perform a vertical motion based on a signal (for example, an audio signal) applied to the sound generating device 1500, and a display panel 100 may vibrate based on a vibration of a bobbin 1550 to generate a sound or a voice. When the sound generating device 1500 is fixed to a supporting member 300 by a coupling or connection member 1710, the inventors have recognized that bending (referred to by B) of the supporting member 300 occurs in manufacturing of a nut 1730 (for example, a PEM® nut). The misalignment of a vibration axis P of the display panel 100 may occur due to the bending of the supporting member 300. For example, the inventors have recognized that the vibration axis P of the display panel 100 does not match a center E of the sound generating device 1500 due to the bending of the supporting member 300. A phenomenon where the vibration axis P of the display panel 100 does not match the center E of the sound generating device 1500 may be referred to as a rolling phenomenon. The present inventors have recognized that the sound quality of the sound generating device 1500 is degraded and the reliability of the display apparatus is reduced, due to the rolling phenomenon. Therefore, through various experiments, the present inventors have implemented a sound generating device having a new structure, which is provided in a display panel and prevents the occurrence of the rolling phenomenon. This will be described below with reference to FIG. 8.

Figure 8A:
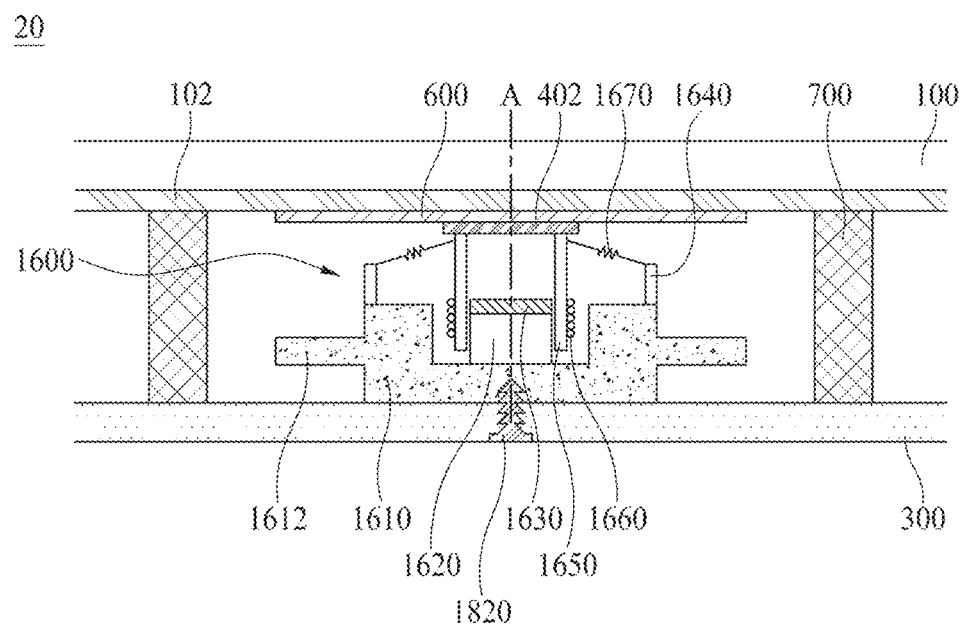
FIGS. 8A and 8B are diagrams illustrating a display apparatus including a sound generating device according to another embodiment of the present disclosure.
Figure 8B:
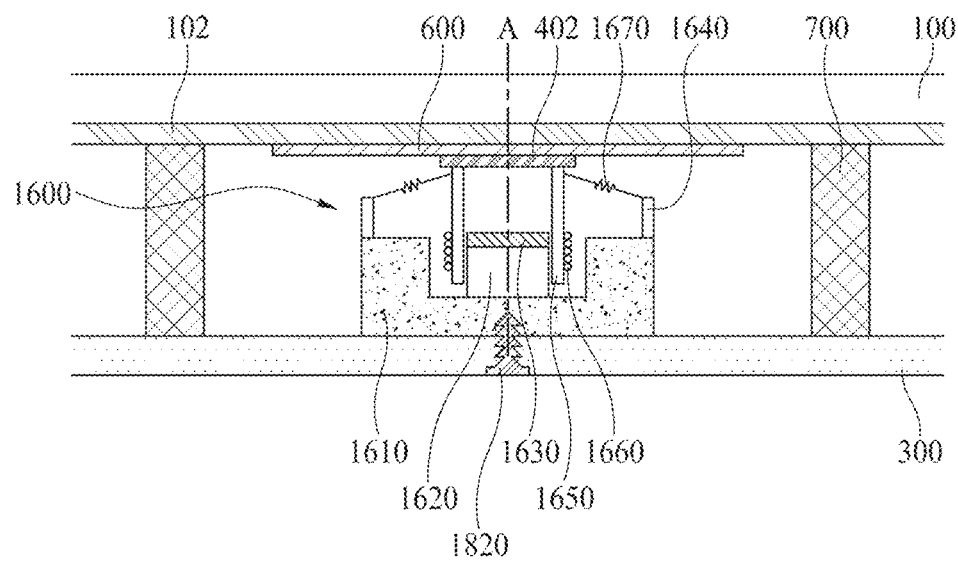
Figure 8C:
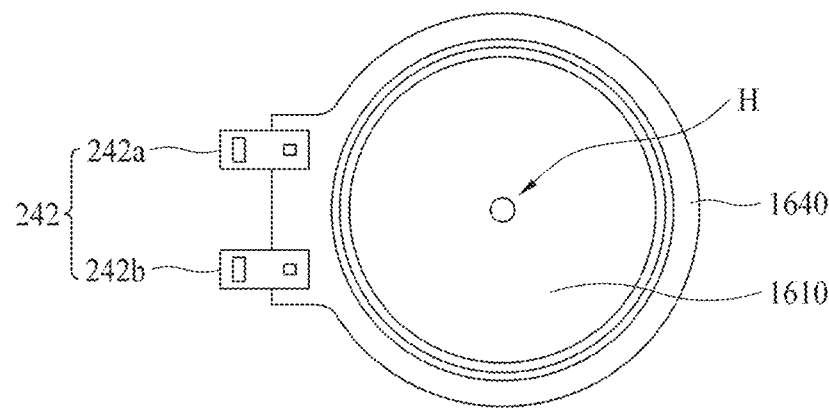
FIGS. 8C and 8D illustrate a sound generating device according to another embodiment of the present disclosure.
Figure 8D:
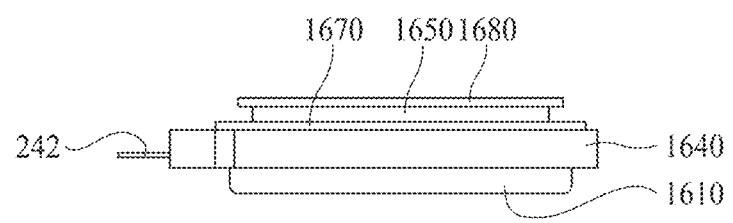

FIGS. 8A and 8B illustrate a display apparatus including a sound generating device according to another embodiment of the present disclosure. FIG. 8C is a bottom view of a sound generating device according to another embodiment of the present disclosure. FIG. 8D is a front view of the sound generating device according to another embodiment of the present disclosure.

In an embodiment of the present disclosure, any of a sound generating device having the first structure and a sound generating device having the second structure may be applied. Hereinafter, the second structure will be described as an example.

With reference to FIGS. 8A and 8B, a display apparatus 20 according to an embodiment of the present disclosure may include a display panel 100 and a sound generating device 1600. The sound generating device 1600 may be in the display panel 100. For example, the sound generating device 1600 may be between the display panel 100 and a supporting member 300.

The sound generating device 1600 may include a magnet 1620 on a plate 1610, a center pole 1630 on the magnet 1620, a bobbin 1650 near the magnet 1620 and the center pole 1630, and a coil 1660 wound around an outer portion of the bobbin 1650. A frame 1640 may be outside the plate 1610. Also, a damper 1670 may be between the frame 1640 and the bobbin 1650. A description of the sound generating device 1600 may be substantially similar to description given above with reference to FIG. 2, and thus, may be omitted.

The plate 1610 may include an extension portion 1612. As another example, as illustrated in the FIG. 8B example, a sound generating device may be configured without an extension portion. When there is no extension portion, an injection molding process for manufacturing a sound generating device may be reduced, thereby decreasing the manufacturing cost of the sound generating device.

As described with reference to the FIG. 7 example, the inventors have recognized that, in order to prevent bending of the supporting member 300 from occurring in manufacturing of a nut, fixing of the sound generating device 1600 should be implemented without a nut, and a vibration axis of the display panel 100 matches a center of the sound generating device in order for the vibration axis of the display panel 100 not to move due to bending of the supporting member 300. Through various experiments, by inserting a screw tap into the plate 1610, the plate 1610 may be equipped in the supporting member 300 without a nut, and thus, the inventors have invented a display apparatus having a new structure, in which a vibration of a display panel does not move. With reference to FIGS. 8A and 8B, a connection member 1820 may be under the supporting member 300. For example, the connection member 1820 may be between the supporting member 300 and the sound generating device 1600. For example, the connection member 1820 may be between the supporting member 300 and the plate 1610 of the sound generating device 1600. For example, the connection member 1820 may be disposed to pass through the supporting member 300. For example, the connection member 1820 may pass through a lower portion of the supporting member 300 and may extend to the inside of the plate 1610. The connection member 1820 may be disposed to correspond to a middle portion or a center of at least one sound generating device 1600. The connection member 1820 may correspond to a middle axis or a center axis of the at least one sound generating device 1600. For example, the connection member 1820 may be disposed to correspond to a center of the magnet 1620 and the center pole 1630. The connection member 1820 may be disposed to correspond to a middle axis or a center axis of the magnet 1620 and the center pole 1630. The connection member 1820 may include a screw. Therefore, the sound generating device 1600 may be fixed to the supporting member 300 by the connection member 1820. A position at which the connection member 1820 is disposed may be within a range corresponding to a center of the sound generating device 1600 (for example, a size of the magnet 1620) and may be disposed within a range which is less than or equal to a size of the magnet 1620 or the center pole 1630. Therefore, the connection member 1820 may be disposed to correspond to a center of the sound generating device 1600, and thus, the vibration axis of the display panel 100 may be prevented from moving due to bending of the supporting member 300 caused by a nut. For example, the connection member 1820 may enable the vibration axis of the display panel 100 to match (referred to by A) the center of the sound generating device 1600. Accordingly, the rolling phenomenon where the vibration axis of the display panel 100 does not match the center of the sound generating device 1600 may be prevented, thereby providing a display apparatus where sound quality is prevented from being degraded by the rolling phenomenon (for example, the quality of a high-pitched sound is prevented from being degraded) and reliability is enhanced.

With reference to FIG. 8C, a hole H for fixing the connection member 1820 may be in the plate 1610, and a screw thread may be in the hole H. The plate 1610 and the supporting member 300 may be fixed by the connection member 1820 through the hole H. A line 242 through which a sound signal (for example, a voice signal) is supplied from the outside may be in one portion of the frame 1640. The sound signal may be supplied to the sound generating device 1600. The line 242 may include a first line 242a and a second line 242b. Positive (+) power may be applied to the first line 242a and negative (−) power may be applied to the second line 242b, but embodiments are not limited thereto.

The sound generating device 1600 may be coupled or connected to the supporting member 300 without a supporting hole of the supporting member 300. Therefore, the sound generating device 1600 may be in the display panel 100 or in the display apparatus 20. For example, the sound generating device 1600 may be between the display panel 100 and the supporting member 300 by the connection member 1820. Therefore, a sound generating device may be provided in the display panel or in the display apparatus, and thus, a supporting hole may not be provided in a supporting member, thereby preventing external particles from flowing in through the supporting hole of the supporting member. Also, the sound generating device may not be exposed at a rear surface of the supporting member, thereby providing a display apparatus which prevents the damage of the sound generating device and has a sense of beauty in external appearance.

The display panel 100 may be attached to the bobbin 1650 of the sound generating device 1600 by an adhesive member 402. The adhesive member 402 may include a double-sided tape, a single-sided tape, an adhesive, a bond, and/or the like, but is not limited thereto. Also, as illustrated in the FIGS. 8A and 8B, the adhesive member 402 may be provided in a portion where the sound generating device 1600 is attached to the display panel 100, but is not limited thereto. In other embodiments, the adhesive member 402 may be on a whole rear surface of the display panel 100. For example, the adhesive member 402 may be on a whole surface between the display panel 100 and the sound generating device 1600.

An encapsulation substrate 102 may be on a rear surface of the display panel 100. For example, the encapsulation substrate 102 may protect a thin film transistor (TFT) and a light emitting device layer provided in the display panel 100 against an external impact and may prevent water or moisture, or oxygen from penetrating into the light emitting device layer. The encapsulation substrate 102 may be referred to as an "encapsulation substrate." Also, the encapsulation substrate 102 may be formed of a ferromagnetic material, for example, a material such as invar which is a Fe—Ni alloy, but is not limited thereto.

A heat dissipation member 600 may be further on the rear surface of a display panel 100, for decreasing heat occurring when a sound generating device 1600 is vibrating. For example, the heat dissipation member 600 may be on the rear surface of the display panel 100 by using an adhesive member. The heat dissipation member 600 may be configured to overlap the sound generating device 1600 or to have a size which is greater than that of the sound generating device 1600 and may have a polygonal plate shape or a circular plate shape having a certain thickness, but is not limited thereto. For example, the heat dissipation member 600 may be a heat dissipation sheet or a heat dissipation tape formed of a metal material which has high thermal conductivity like aluminum (Al), copper (Cu), or silver (Ag) and an alloy thereof, but is not limited thereto. Accordingly, since the heat dissipation member 600 is provided, an influence of heat occurring when the sound generating device is vibrating may be reduced on the image quality of the display panel 100.

A partition 700 may be between the supporting member 300 and the display panel 100. The partition 700 may be an air gap or a space where a sound is output when the display panel 100 vibrates. An air gap or a space which generates or transfers a sound may be referred to as a "partition." A partition may be referred to as an "enclosure" or a "baffle," but the term is not limited thereto.

A thickness of the sound generating device 1600 should be thin for the sound generating device 1600 to be disposed in the display panel 100 or in the display apparatus 20. Therefore, the present inventors have designed a structure in which an area of a damper near a bobbin is wide, for solving a problem in which a height (or a thickness) of the bobbin may be lowered. The present inventors have recognized that, when an area of the damper is wide, a space of a line through which a current may be applied to a coil may be narrowed. Thus, interference between the line and the damper may occur. Therefore, through various experiments, the damper has been formed of a conductor to perform a function of the line and the damper. For example, the damper may be formed of metal, but embodiments are not limited thereto. For example, the damper may include stainless steel, copper (Cu), and/or the like, but the present embodiment is not limited thereto.

With reference to FIG. 8D, it may be seen that an area of the damper 1670 is almost similar to that of the frame 1640. Therefore, a height or a thickness of the bobbin 1650 may be lowered or reduced. Also, the damper 1670 may act as a line so as to prevent interference between a line and the damper 1670. This will be described below with reference to FIG. 9.

A bobbin ring 1680 may be further on an upper surface of the bobbin 1650. The bobbin ring 1680 may cover the upper surface of the bobbin 1650 to protect the bobbin 1650, thereby preventing the bobbin 1650 from being deformed by an external impact. An adhesive member may be further provided between the bobbin 1650 and the bobbin ring 1680, and the bobbin 1650 may be attached to the bobbin ring 1680 by the adhesive member. The adhesive member may be configured with one of a double-sided tape, a double-sided foam pad, a single-sided tape, a single-sided foam pad, an adhesive, and/or a bond, but is not limited thereto. An adhesive member 402 may be further provided between the bobbin 1650 or the bobbin ring 1680 and the display panel 100, and the sound generating device 1600 may be attached to the display panel 100 by the adhesive member 402.

FIGS. 9A to 9D illustrate a sound generating device according to another embodiment of the present disclosure.

Figure 9A:
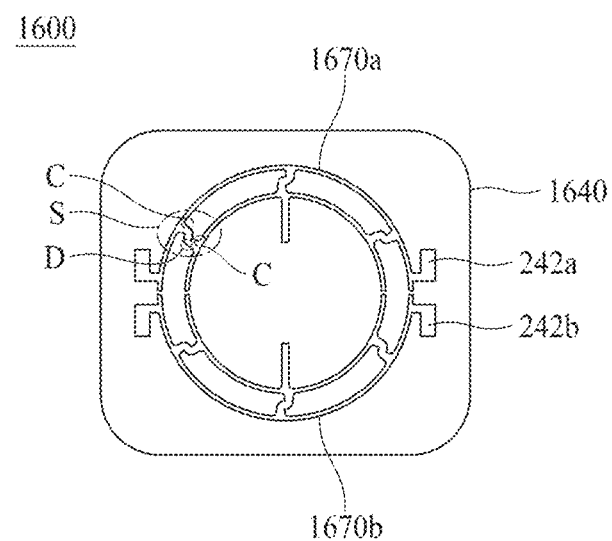
FIGS. 9A to 9D illustrate a sound generating device according to another embodiment of the present disclosure.
Figure 9B:
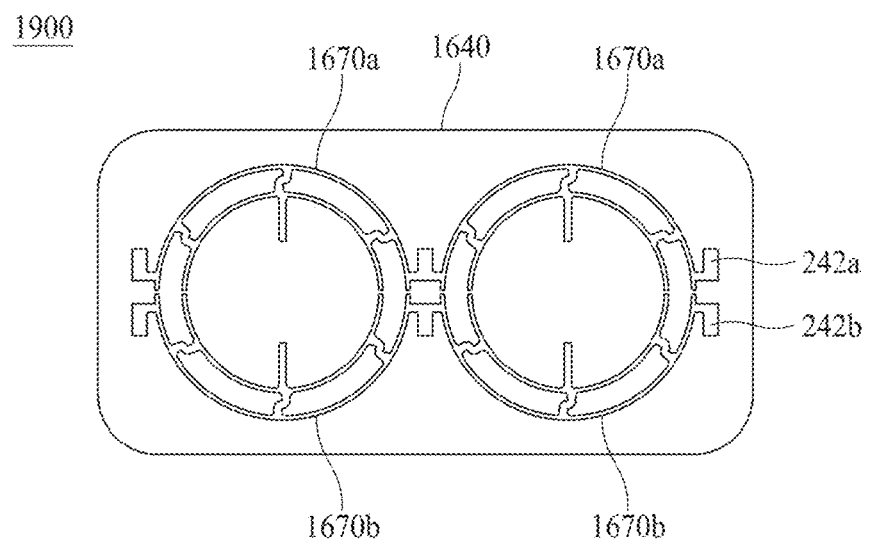

FIG. 9A is a rear view of a sound generating device according to an embodiment of the present disclosure. FIG. 9B is a front view of the sound generating device according to an embodiment of the present disclosure.

Figure 9C:
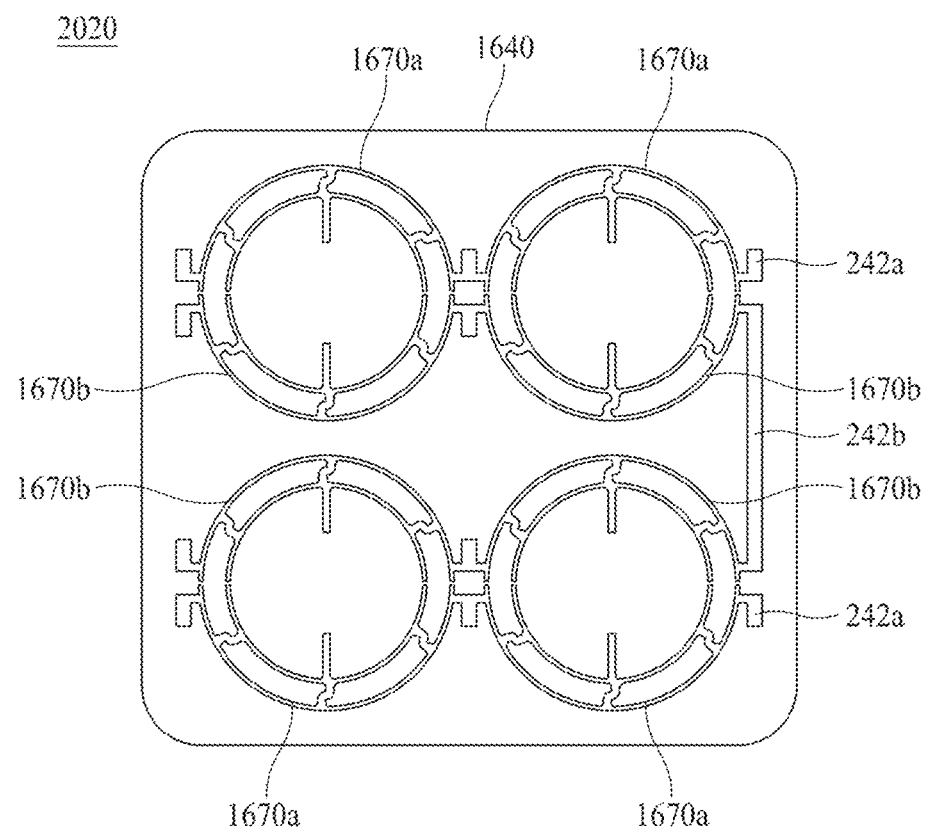
Figure 9D:
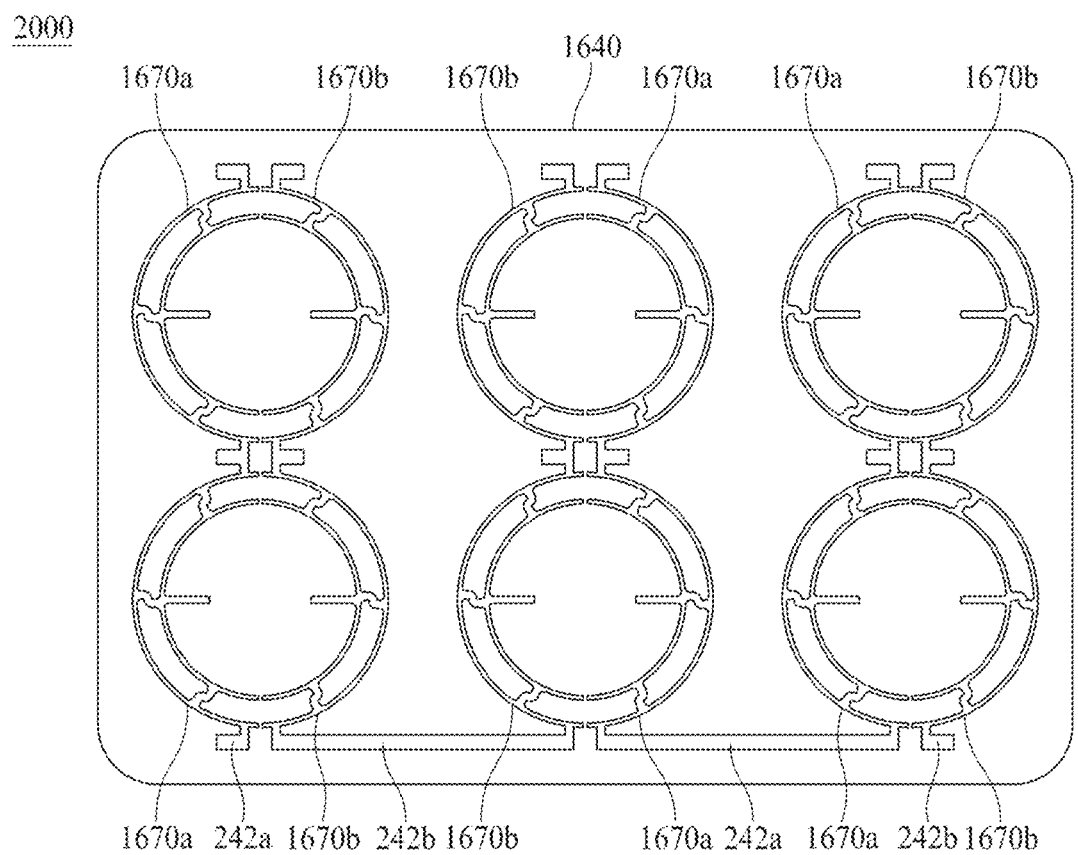

FIG. 9A illustrates one sound generating device. FIG. 9B illustrates a two-device array where two sound generating devices may be provided. FIG. 9C illustrates a four-device array where four sound generating devices may be provided. FIG. 9D illustrates a six-device array where six sound generating devices may be provided. The sound generating device according to an embodiment of the present disclosure may be configured as one sound generating device or a sound generating device having two or more-device array structure, but is not limited thereto. The sound generating device having the first structure or the second structure described above with reference to FIG. 2 may be applied to the sound generating device according to an embodiment of the present disclosure.

With reference to FIGS. 9A to 9D, an area of a damper may be widely set for decreasing a thickness of a sound generating device and for enhancing the performance of a magnet. Also, the damper may include stainless steel, Cu, and/or the like, and thus, may be a line for applying a sound signal to the sound generating device.

With reference to FIG. 9A, in a one sound generating device 1600, a damper 1670 may be on a frame 1640. The one sound generating device 1600 may be referred to as a "single type."

The damper 1670 may be configured to perform a function of a line, and thus, may include a first damper 1670a to which positive (+) power (or a sound signal) may be applied, and a second damper 1670b to which negative (−) power (or a sound signal) may be applied. The damper 1670 may be divided with respect to a widthwise direction. For example, the first damper 1670a to which the positive power may be applied, may be an upper portion with respect to the front of the drawing, and the second damper 1670b to which the negative power may be applied, may be a lower portion with respect to the front of the drawing. For example, the first damper 1670a may be connected to a first line 242a, and the second damper 1670b may be connected to a second line 242b. Also, a shape 'S' of the damper 1670 may be provided as a zigzag shape. When the damper 1670 may be configured diagonally, disconnection may occur due to a vertical motion of the damper 1670, and when a length of the damper 1670 is long, the damper 1670 may affect a resonance frequency. For example, a portion illustrated by 'C' and a portion illustrated by 'D' may be configured to have the same thickness and different widths, and disconnection may be avoided or prevented from occurring in an overlapping portion therebetween.

With reference to FIG. 9B, in a two-device array sound generating device 1900, a damper 1670 may be on a frame 1670. The two-device array sound generating device 1900 may be referred to as a "twin type."

Damper may be connected to each other in parallel. The damper 1670 may be configured to perform a function of a line, and thus, may include a first damper 1670a to which positive (+) power may be applied, and a second damper 1670b to which negative (−) power may be applied. The damper 1670 may be divided with respect to a widthwise direction. For example, the first damper 1670a to which the positive power may be applied, may be an upper portion with respect to the front of the drawing and the second damper 1670b, to which the negative power may be applied may be a lower portion with respect to the front of the drawing. For example, the first damper 1670a may be connected to a first line 242a, and the second damper 1670b may be connected to a second line 242b. For example, two first dampers 1670a may be connected as one body, and may be connected to the first line 242a, and two second dampers 1670b may be connected as one body, and may be connected to the second line 242b. A description of a shape of the damper 1670 may be the same as or similar to the description give above with respect to FIG. 9A.

With reference to FIG. 9C, in a four-device array sound generating device 2020, a damper 1670 may be on a frame 1670. The four-device array sound generating device 2020 may be referred to as a "quad type."

Damper may be connected to one another in parallel and in series. The damper 1670 may be configured to perform a function of a line, and thus, may include a first damper 1670a to which positive (+) power may be applied and a second damper 1670b to which negative (−) power may be applied. The damper 1670 may be divided with respect to a widthwise direction. For example, the first damper 1670a, to which the positive power may be applied, may be an upper portion with respect to the front of the drawing, and the second damper 1670b, to which the negative power may be applied, may be a lower portion with respect to the front of the drawing. Each of a plurality of first dampers 1670a may be connected to a first line 242a, and each of a plurality of second dampers 1670b may be connected to a second line 242b. For example, two first dampers 1670a may be connected as one body, and may be connected to the first line 242a, and two second dampers 1670b may be connected as one body, and may be connected to the second line 242b. A description of a shape of the damper 1670 may be the same as or similar to description give above with respect to FIG. 9A.

With reference to FIG. 9D, in a six-device array sound generating device 2000, a damper 1670 may be on a frame 1640. The six-device array sound generating device 2000 may be referred to as a "hexa type."

Damper may be connected to one another in parallel and serially. The damper 1670 may be configured to perform a function of a line, and thus, may include a first damper 1670a to which positive (+) power may be applied, and a second damper 1670b to which negative (−) power may be applied. The damper 1670 may be divided with respect to a widthwise direction. For example, in dampers disposed in a left portion and a right portion of the drawing, the first damper 1670a to which the positive power may be applied, may be a left portion with respect to the front of the drawing, and the second damper 1670b to which the negative power may be applied, may be a right portion with respect to the front of the drawing. It should be appreciated that the terms "left" and "right" are used herein for convenience of description and are interchangeable, and embodiments are not limited to these positions or terms. Each of a plurality of first dampers 1670a may be connected to a first line 242a, and each of a plurality of second dampers 1670b may be connected to a second line 242b. For example, two first dampers 1670a may be connected as one body, and may be connected to the first line 242a, and two second dampers 1670b may be connected as one body, and may be connected to the second line 242b. A description of a shape of the damper 1670 may be the same as or similar to description give above with respect to FIG. 9A.

Therefore, according to the present embodiment, the sound generating device may be disposed without a supporting hole of a supporting member, and thus, a degree of freedom in disposition of the sound generating device may be enhanced.

As described with reference to FIGS. 8A and 8B, to prevent bending of the supporting member 300 from occurring in manufacturing of a nut, fixing of the sound generating device 1600 may be implemented without a nut, and a vibration axis of the display panel 100 may match a center of the sound generating device in order for the vibration axis of the display panel 100 not to move due to bending of the supporting member 300. Also, as described above with reference to FIGS. 9A to 9D, in a case where a sound generating device having a small area is implemented, a display panel may move, and thus, an edge or periphery of the display panel should be strongly fixed for preventing movement of the display panel. When the edge or periphery of the display panel is too strongly fixed, the present inventors have recognized that a vibration of the display panel is weakened, and when the vibration of the display panel is weakened, a sound pressure level is lowered, causing a problem where a sound is reduced in a low-pitched sound band. Therefore, through various experiments, the present inventors have invented a display apparatus having a new structure for improving a sound of the low-pitched sound band. This will be described below with reference to FIGS. 10A and 10B.

Figure 10A:
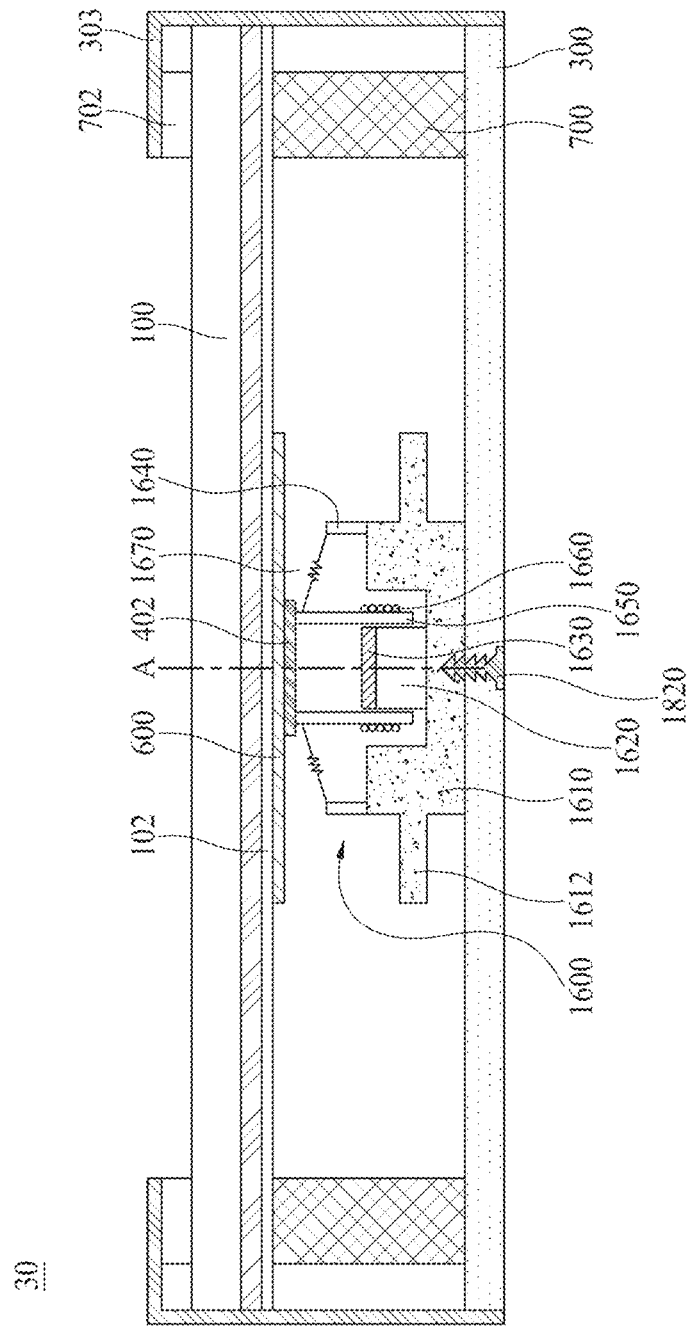
FIGS. 10A and 10B illustrate a display apparatus including a sound generating device according to another embodiment of the present disclosure.
Figure 10B:
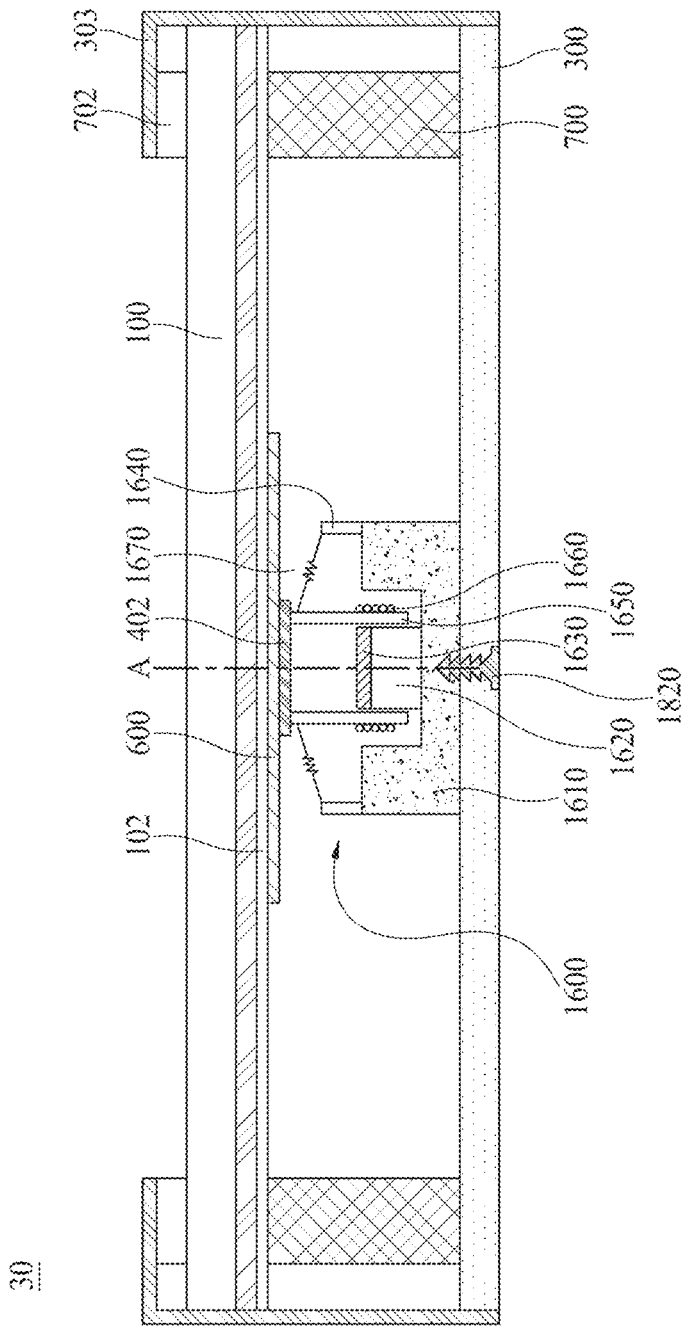

FIGS. 10A and 10B illustrate a display apparatus including a sound generating device according to another embodiment of the present disclosure.

In an embodiment of the present disclosure, any of a sound generating device having the first structure and a sound generating device having the second structure may be applied. Hereinafter, the second structure will be described as an example.

With reference to FIGS. 10A and 10B, the display apparatus 30 according to another embodiment of the present disclosure may include a display panel 100 and a sound generating device 1600. The sound generating device 1600 may be in the display panel 100 or in the display apparatus 30. For example, the sound generating device 1600 may be between the display panel 100 and a supporting member 300. Descriptions of the sound generating device 1600 and a heat dissipation member may be substantially similar to as descriptions given above with reference to FIGS. 8A to 8D, and thus, may be omitted. The sound generating device 1600 of FIG. 10B may be configured without an extension portion as described above with reference to FIG. 8B. When there is no extension portion, an injection molding process for manufacturing a sound generating device may be reduced, thereby decreasing the manufacturing cost of the sound generating device.

The display apparatus 30 according to an embodiment of the present disclosure may include a cover 303 which is on an upper surface and a side surface of the display panel 100. The cover 303 may protect and support the display panel 100. The cover 303 may be a "case top," and the term is not limited thereto. The cover 303 according to an embodiment of the present disclosure may be formed of one or more of a plastic material, a metal material, and a mixed material of the plastic material and the metal material, but is not limited thereto. A pad 702 may be further provided between the cover 303 and the display panel 100. For example, the pad 702 may be between a lower surface of the cover 303 and an upper surface of the display panel 100. Since an area of the display panel 100 is reduced when the cover 303 is provided, the pad 702 may be provided, thereby preventing a rolling phenomenon which occurs while the display panel 100 having a small area is moving. Therefore, the pad 702 may fix the display panel 100, and thus, may prevent movement of the display panel 100. The pad 702 may prevent a vibration of the display panel 100 from being weakened based on movement of the display panel 100, thereby improving a low-pitched sound of the sound generating device 1600. The pad 702 may be configured with a foam pad or a foam tape, but is not limited thereto. The pad 702 may be a partition, but the term is not limited thereto. The pad 702 may be formed of the same material as that of the partition 700, but is not limited thereto. As another example, the pad 702 may be formed of a material differing from that of the partition 700. For example, the pad 702 and the partition 700 may be formed of materials having different stiffness. The pad 702 may be configured with a single-sided tape, and the partition 700 may be configured with a double-sided tape. As another example, the pad 702 may be configured with a double-sided tape, and the partition 700 may be configured with a single-sided tape.

FIGS. 11A to 11D illustrate a sound generating device and a partition according to an embodiment of the present disclosure.

With reference to FIGS. 11A to 11D, a display panel 100 may include a first region L, a second region R, and a third region C. The first region L may be a left region of a rear surface of the display panel 100, the second region R may be a right region of the rear surface of the display panel 100, and the third region C may be a center region of the rear surface of the display panel 100. Also, one or more sound generating devices may be in at least one of the first region L, the second region R, and the third region C. The one or more sound generating devices may include one or more of a circular sound generating device, an oval sound generating device, a pair of sound generating devices, and a two or more-device array sound generating device. The oval sound generating device may have an elliptical shape, a rectangular shape with rounded corners, or non-circular curved shape having a width different from its height, but is not limited thereto. The one or more sound generating devices may vibrate the display panel 100 to generate sound. For example, the one or more sound generating devices may directly vibrate the display panel 100 to generate sound.

Figure 11A:
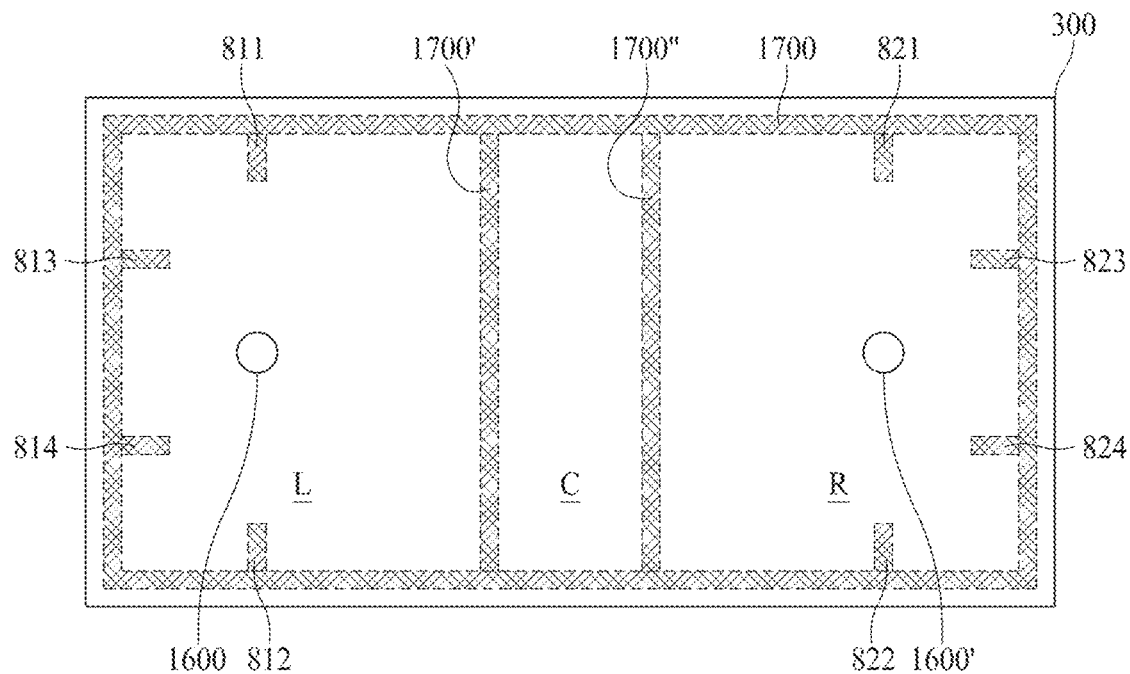
FIGS. 11A to 11D illustrate a sound generating device and a partition according to an embodiment of the present disclosure.
Figure 11B:
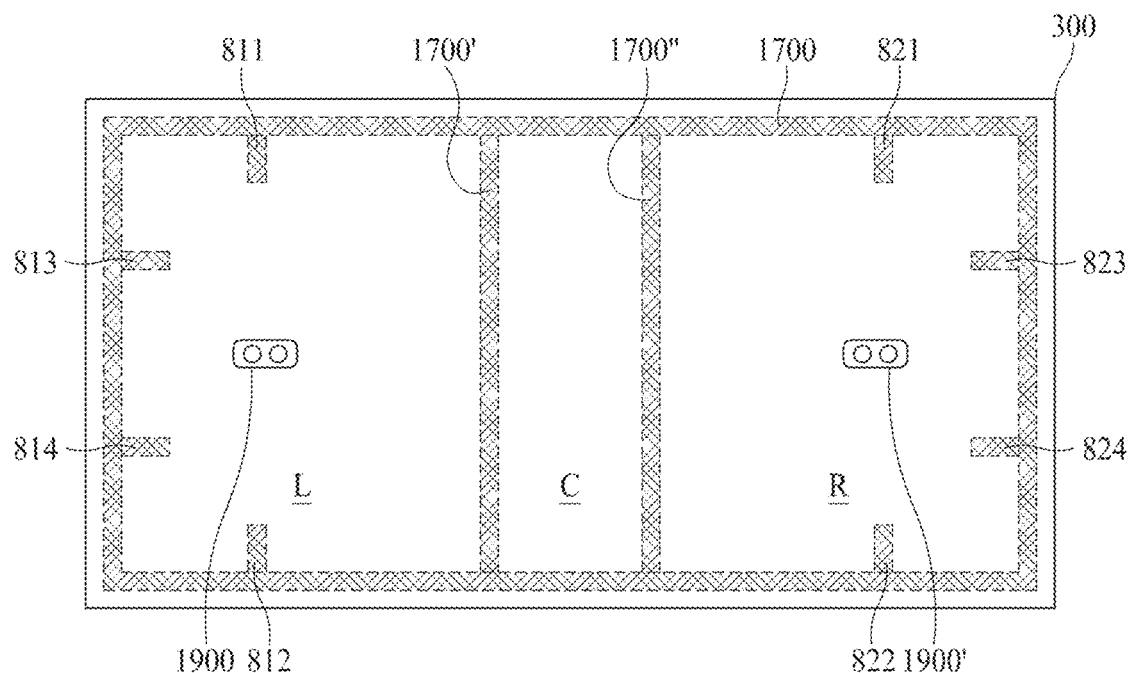
Figure 11C:
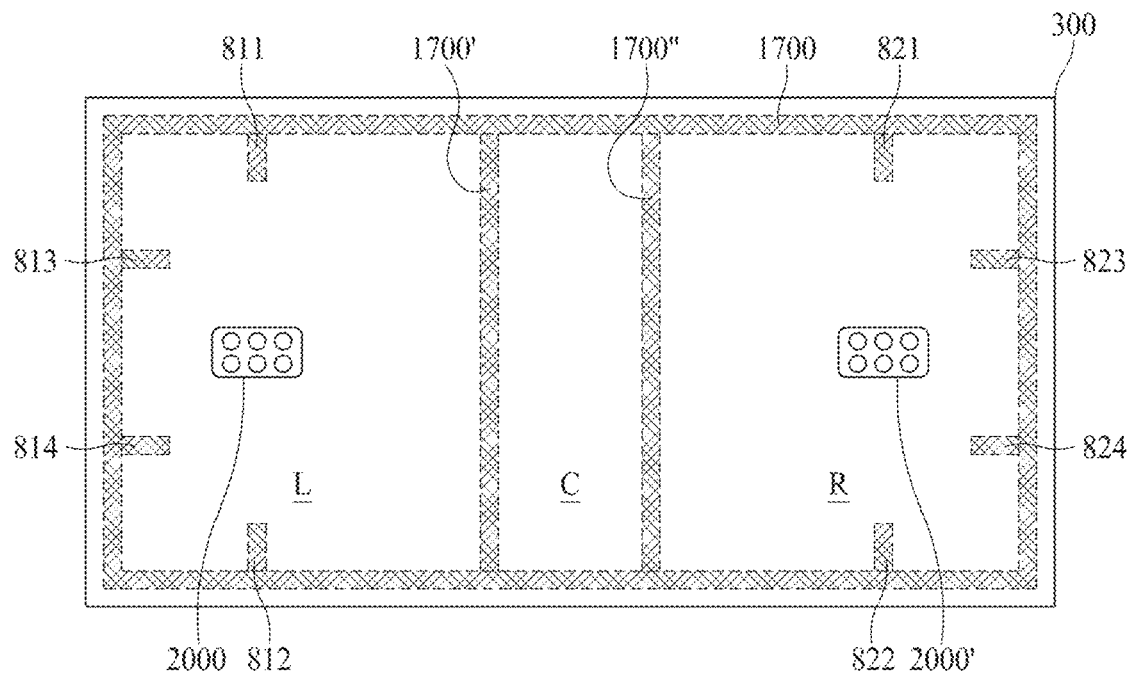
Figure 11D:
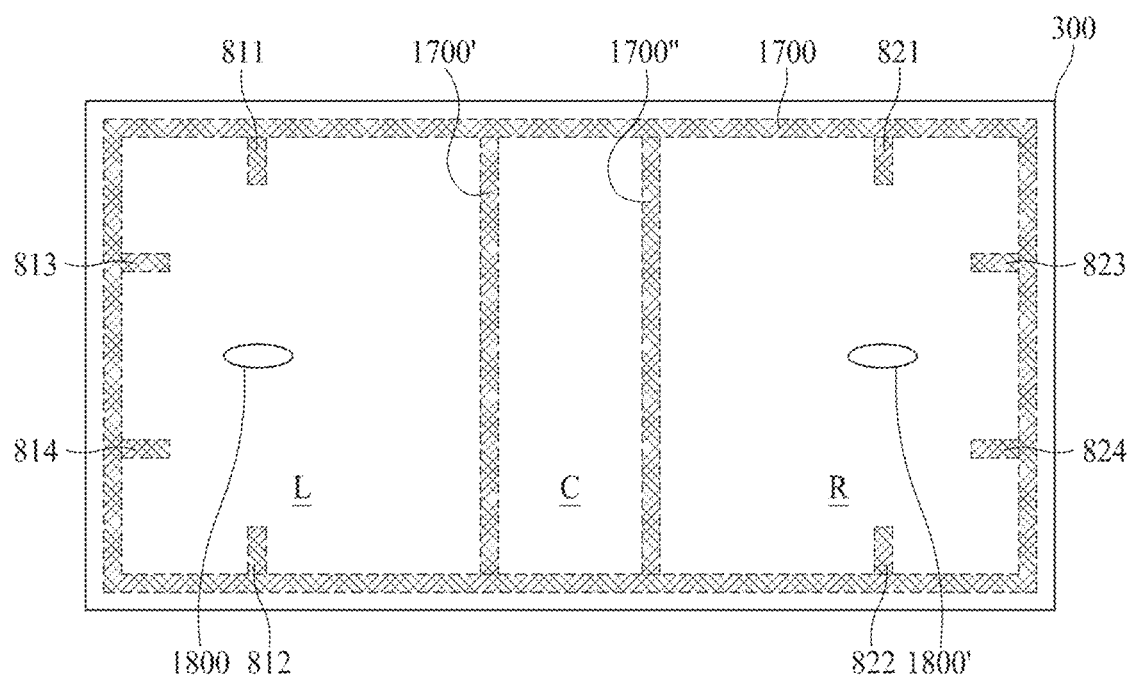

In FIG. 11A, a first sound generating device 1600 and a second sound generating device 1600' may be configured as a circular sound generating device described above with reference to FIG. 9A. In FIG. 11B, a first sound generating device 1900 and a second sound generating device 1900' may be configured as the sound generating device described above with reference to FIG. 9B. For example, the first sound generating device 1900 and the second sound generating device 1900' may be configured with two sound generating devices. The first sound generating device 1900 and the second sound generating device 1900' may output sound of different middle-high-pitched sound bands in the first region L and the second region R. For example, the first sound generating device 1900 and the second sound generating device 1900' may output sound corresponding to a range of about 300 Hz to about 20 kHz, but a range is not limited thereto. In FIG. 11C, a first sound generating device 2000 and a second sound generating device 2000' may be configured as the sound generating device described above with reference to FIG. 9D. For example, the first sound generating device 2000 and the second sound generating device 2000' may be configured with six sound generating devices. The first sound generating device 2000 and the second sound generating device 2000' may output sound of different middle-high-pitched sound bands in the first region L and the second region R. For example, the first sound generating device 2000 and the second sound generating device 2000' may output sound corresponding to a range of about 300 Hz to about 20 kHz, but a range is not limited thereto. In FIG. 11D, a first sound generating device 1800 and a second sound generating device 1800' may be applied as an oval sound generating device, instead of a circular sound generating device described above with reference to FIG. 9A.

With reference to FIG. 11A, the first sound generating device 1600 may be in the first region L, and the second sound generating device 1600' may be in the second region R. For example, the first sound generating device 1600 may be in the first region L of the rear surface of the display panel 100, and the second sound generating device 1600' may be in the second region R of the rear surface of the display panel 100. Also, as described above with reference to FIGS. 8 and 10, the first sound generating device 1600 and the second sound generating device 1600' may be in the display panel 100.

Therefore, the first sound generating device 1600 may be in the first region L, which is the left region of the rear surface of the display panel 100 and may vibrate the left region L of the display panel 100, and the second sound generating device 1600' may be in the second region R, which is the right region of the rear surface of the display panel 100 and may vibrate the right region R of the display panel 100. The first sound generating device 1600 and the second sound generating device 1600' may receive different vibration signals and may be independently driven. For example, the first sound generating device 1600 may generate a sound by using the left region L of the display panel 100 as a vibration plate, and the second sound generating device 1600' may generate a sound by using the right region R of the display panel 100 as a vibration plate. Such descriptions may be applied to FIGS. 11B to 18D similarly or identically. Also, descriptions given above with reference to FIGS. 8 to 10 may be applied identically or similarly.

A partition and a pad will be described below with reference to FIG. 11A for example, and such descriptions may be applied to FIGS. 11B to 11D similarly or identically.

With reference to FIGS. 11A to 11D, a first partition 1700 may be between a display panel and a supporting member 300. The first partition 1700 may be between a rear surface of the display panel and an upper surface of the supporting member 300. For example, the first partition 1700 may be at the supporting member 300. The first partition 1700 may be at an edge or periphery of the supporting member 300 or an edge or periphery of an upper surface of the supporting member 300. For example, the first partition 1700 may be at an edge or periphery of the display panel. The first partition 1700 may be at an edge or periphery of the rear surface of the display panel. Also, the first partition 1700 may be a whole region of the rear surface of the display panel or the supporting member 300. The first partition 1700 may be a whole region of four outer sides of the supporting member 300 or the whole region of the rear surface of the display panel. The first partition 1700 may have a sealed structure, or may have an unsealed structure.

The first partition 1700 may be an air gap or a space where a sound is output when the display panel 100 vibrates by a sound generating device. An air gap or a space which outputs or transfers a sound may be referred to as a "partition." The first partition 1700 may be referred to as an "enclosure" or a "baffle," but the term is not limited thereto.

With reference to FIG. 11A, at least two partitions, for example, a second partition 1700' and a third partition 1700" may be disposed between the first sound generating device 1600 and the second sound generating device 1600'. It may be considered that one of the second partition 1700' and the third partition 1700" is configured with two or more sub-partitions between the first sound generating device 1600 and the second sound generating device 1600'. For example, the second partition 1700' may be between the first region L and the third region C, and the third partition 1700" may be between the second region R and the third region C.

The first partition 1700 may surround the first region L, the second region R, and the third region C. The first partition 1700, the second partition 1700', and the third partition 1700" may be at the rear surface of the display panel 100. The first partition 1700, the second partition 1700', and the third partition 1700" may be at a rear surface or the upper surface of the supporting member 300. Also, the first partition 1700, the second partition 1700', and the third partition 1700" may be between the display panel 100 and the supporting member 300. For example, the first partition 1700, the second partition 1700', and the third partition 1700" may be between the rear surface of the display panel 100 and the upper surface of the supporting member 300.

The second partition 1700' and the third partition 1700" may be an air gap or a space where a sound is generated when the display panel 100 vibrates by the first sound generating device 1600 and the second sound generating device 1600'. An air gap or a space which generates or transfers a sound may be referred to as a partition. The second partition 1700' and the third partition 1700" may be referred to as an "enclosure" or a "baffle," but the term is not limited thereto. The second partition 1700' and the third partition 1700" may separate a left sound and a right sound respectively generated by the first sound generating device 1600 and the second sound generating device 1600'. Also, a vibration of the display panel 100 performed in a space or an air gap defined as the partition 700 may be attenuated or absorbed by a center region of the display panel 100, and thus, a sound generated in the left region may be prevented from being transferred to a space of the right region. Therefore, the first sound generating device 1600 and the second sound generating device 1600' may output sounds of different middle-high-pitched sound bands and may output a stereo sound by separating left and right sounds, thereby providing a display apparatus having a two-channel sound output characteristic. Therefore, a partition may be provided in a center region of the display panel 100, thereby decreasing an influence of a sound characteristic caused by a resonance frequency difference of a middle-high-pitched sound in the left region and the right region of the display panel 100. Here, a middle-pitched sound band may be 200 Hz to 3 kHz, a high-pitched sound band may be 3 kHz or higher, and a low-pitched sound band may be 200 Hz or lower. However, embodiments are not limited thereto.

The first sound generating device 1600 may be in the first region L, which is the left region, the second sound generating device 1600' may be in the second region R, which is the right region, and a sound generating device may not be in a third region C, which is a center region. Accordingly, the degradation in sound quality caused by interference in the first region L and the second region R may be reduced. Also, a sound characteristic corresponding to the low, middle, and high-pitched sound bands may be further enhanced.

An area of the first region L and an area of the second region R may be greater than that of the third region C. Since the area of the first region L and the area of the second region R increases, a sound of the low-pitched sound band may be enhanced, and the third region C may decrease the degradation in sound quality caused by interference in the first region L and the second region R. Accordingly, the quality of sounds of the low, middle, and high-pitched sound bands may be enhanced.

In FIGS. 11A to 18D, the first partition 1700 may be the adhesive member described above with reference to FIG. 1. Also, the adhesive member for attaching the supporting member to the display panel may be further provided between the display panel and the supporting member described above with reference to FIG. 1. For example, the adhesive member may be further provided at an edge or periphery of the display panel or an edge or periphery of the supporting member.

FIGS. 11A to 12B illustrate an example where the sound generating device is disposed in the left region or the right region, or toward a side of the left region or toward a side of the right region without being disposed in a center of the left region (the first region L) or the right region (the second region R) of the display panel 100, but embodiments are not limited thereto. For example, the sound generating device may be disposed in the center of the left region (the first region L) or the right region (the second region R) of the display panel 100. Alternatively, the sound generating device may be asymmetrically disposed in the first region L and the second region R of the display panel 100. A stereo sound characteristic may be more enhanced in a case, where the sound generating device is disposed in the left region or the right region, or toward a side of the left region or toward a side of the right region, than a case where the sound generating device is disposed in the center of the left region (the first region L) or the right region (the second region R) of the display panel 100.

To implement a display apparatus having a thin thickness, a thickness of the glass substrate may be thin. When the thickness of the substrate is thinned, and when the partition is provided on the rear surface of the display panel 100 or an upper surface of a supporting member, a problem in which the display panel 100 may not be flat and a step height may be formed in the display panel 100 may occur due to the partition when the supporting member is attached to the display panel 100. For example, a problem in which the display panel 100 may not be flat and a screen is unevenly seen may occur due to a shape of the bent portion bouncing on a screen of the display panel 100 or a separated portion of the bent part, for example, a portion in which the two rectilinear portions contact each other. Such a phenomenon may be referred to as an uneven phenomenon or a wave phenomenon of the display panel 100, and the term is not limited thereto. Therefore, the present inventors have performed various experiments on a shape of a pad and a shape of another partition. Through the various experiments, the present inventors have recognized that the first partition 1700 should be disposed based on a shape of the display panel 100. For example, the first partition 1700 may have a tetragonal shape, but is not limited thereto. In other embodiments, a shape of the first partition 1700 may be modified based on a shape of the display panel 100. If the display panel 100 is a curved display panel having a curve shape or the like, the first partition 1700 may have a curved shape or a curve shape. Accordingly, the first partition 1700 may be disposed along a shape of the display panel 100, and thus, a degree to which the display panel 100 is pulled is reduced in a process of attaching the supporting member to the display panel 100, thereby preventing the wave phenomenon.

A sound wave, which may be generated when a display panel vibrates by a vibration generating device, may be spread radially from a center of the vibration generating device and may travel. The sound wave may be referred to as a "progressive wave." The progressive wave may be reflected by one side of a partition to generate a reflected wave, and the reflected wave may travel in a direction opposite to the progressive wave. The reflected wave may overlap and interfere with the progressive wave, and may not travel, thereby generating a standing wave that may stand at a certain position. A sound pressure may be reduced by the standing wave, thus, a sound output characteristic is reduced.

However, if the first partition 1700 is provided, it is unable to control the peak and the dip caused by the standing wave, and thus, the present inventors have recognized that the first partition 1700 should have a structure for controlling the peak and the dip caused by the standing wave. The peak may be a phenomenon where a sound pressure bounces in a specific frequency, and the dip may be a phenomenon where generating of sound in a specific frequency is suppressed, and thus, a low sound pressure is generated. A sound output characteristic of the display apparatus is reduced by the peak or the dip. The structure is not implemented through a simple procedure but has been implemented through various experiments. Therefore, a pad may be provided in the first partition 1700 to decrease a peak and dipping which are caused by a standing wave occurring in a lengthwise direction of the first and second sound generating devices 1600 and 1600'. Therefore, the degree of reduction in sound pressure caused by the standing wave generated by interference between the reflected wave and the progressive wave may be reduced. Also, the standing wave which causes the sound pressure to be reduced is much generated at a position at which a level of the progressive wave and the reflected wave is high. Accordingly, the pad may be disposed at a position at which a level of a sound wave transferred from the vibration generating device may be highest. For example, the pad may be on one or more sides of the first partition 1700. The pad may be on one or more sides, which a strongest sound wave reaches, of four sides of the first partition 1700 and may be configured to face the first and second sound generating devices 1600 and 1600'.

A shape of a pad may be implemented to prevent the wave phenomenon from occurring when the display panel 100 is pulled in a process of attaching a pad, disposed on the supporting member, to the display panel 100. Alternatively, a shape of the pad may be implemented to prevent the wave phenomenon from occurring when the display panel 100 is pulled in a process of attaching the pad, disposed on the display panel 100, to the supporting member. For example, a shape of the pad should be implemented to prevent the wave phenomenon and to enable the peak and the dip caused by the standing wave to be easily controlled. The pad has been implemented in a tetragonal (e.g., quadrilateral) shape or a corner-rounded tetragonal shape through various experiments.

With reference to FIG. 11A, at least one pad may be provided on at least one side of the first partition 1700, for decreasing the peak and the dipping caused by the standing wave. For example, the first partition 1700 may include a first side and a second side vertical to the first side, and at least one first pad 811 and at least one seventh pad 821 may be on the first side. The at least one first pad 811 may be in the first region L, and the at least one seventh pad 821 may be in the second region R. The first pad 811 and the seventh pad 821 may be provided as one or as a plurality. The first side may be a widthwise direction of the display panel 100 or the supporting member 300, and the second side may be a lengthwise direction of the display panel 100 or the supporting member 300. The widthwise direction and the lengthwise direction may be interchangeable.

At least one second pad 812 may be disposed to face the at least one first pad 811. For example, the at least one second pad 812 may be on a side facing the at least one first pad 811. The at least one second pad 812 may be in the first region L. The at least one second pad 812 may be provided as one or as a plurality.

At least one eighth pad 822 may be disposed to face the at least one seventh pad 821. For example, the at least one eighth pad 822 may be in a side facing the at least one seventh pad 821. The at least one eighth pad 822 may be in the second region R. The at least one eighth pad 822 may be provided as one or as a plurality.

The second pad 812 and the eighth pad 822 may be further provided on a side facing the first side of the first partition 1700. The second pad 812 may be on a side facing the first side of the first partition 1700 in the first region L, and the eighth pad 822 may be on a side facing the first side of the first partition 1700 in the second region R. The second pad 812 may be provided to face the first pad 811. The eighth pad 822 may be provided to face the seventh pad 821. The second pad 812 and the eighth pad 822 may be provided as one or as a plurality.

The at least one first pad 811 and the at least one second pad 812 may be provided to face the first sound generating device 1600. The at least one seventh pad 821 and the at least one eighth pad 822 may be provided to face the second sound generating device 1600'. For example, the first pad 811 and the second pad 812 may be in the first region L to face the first sound generating device 1600, and the seventh pad 821 and the eighth pad 822 may be in the second region R to face the second sound generating device 1600'. Therefore, the pads 811, 812, 821, and 822 may decrease the peak or the dipping caused by the standing wave which occurs in a lengthwise direction of the first sound generating device 1600 and the second sound generating device 1600' and may allow a vibration to laterally or left-right transferred, thereby enhancing a sound output characteristic.

At least one third pad 813, at least one fourth pad 814, at least one ninth pad 823, and at least one tenth pad 824 may be further provided in the second side of the first partition 1700. As another example, one of the at least one third pad 813 and the at least one fourth pad 814 may be provided. As another example, one of the at least one ninth pad 823 and the at least one tenth pad 824 may be provided. The third pad 813, the fourth pad 814, the ninth pad 823, and the tenth pad 824 may be provided as one or as a plurality in one or more sides of the first partition 1700. The third pad 813, the fourth pad 814, the ninth pad 823, and the tenth pad 824 may be in at least one of a first region L and a second region R. For example, the third pad 813 and the fourth pad 814 may be disposed in the first region L, and the ninth pad 823 and the tenth pad 824 may be in the second region R. For example, the third pad 813 and the fourth pad 814 may be disposed to be symmetrical with respect to the first sound generating device 1600, and the ninth pad 823 and the tenth pad 824 may be disposed to be symmetrical with respect to the second sound generating device 1600'.

A shape of the first to fourth pads 811 to 814 and a shape of the seventh to tenth pads 821 to 824 may be a tetragonal (e.g., quadrilateral) shape or an end-rounded tetragonal shape, but are not limited thereto and may have various shapes such as a circular shape.

The first partition 1700 may be formed of a double-sided tape, a double-sided foam pad, a single-sided tape, a single-sided foam pad, an adhesive, and/or a bond, but is not limited thereto. When the first partition 1700 is formed of the double-sided tape or the double-sided foam pad, an adhesive force may be enhanced in a process of attaching the upper surface of the supporting member to the rear surface of the display panel 100. Also, the first partition 1700 may be formed of a material having an elastic force which enables compression to be made to a certain degree, and for example, may be formed of polyurethane, polyolefin, polyethylene, and/or the like, but is not limited thereto.

One of the second partition 1700' and the third partition 1700" may be formed of the same material as that of the first partition 1700. For example, the second partition 1700' and the third partition 1700" may be formed of one of a double-sided tape, a double-sided foam pad, a single-sided tape, a single-sided foam pad, an adhesive, and/or a bond, but is not limited thereto.

The at least one first pad 811 or the at least one second pad 812 may be formed of the same material as that of the first partition 1700. The at least one third pad 813 or the at least one fourth pad 814 may be formed of the same material as that of the first partition 1700. The at least one seventh pad 821 or the at least one eighth pad 822 may be formed of the same material as that of the first partition 1700. The at least one ninth pad 823 or the at least one tenth pad 824 may be formed of the same material as that of the first partition 1700. For example, the pads may be formed of a double-sided tape, a double-sided foam pad, a single-sided tape, a single-sided foam pad, an adhesive, and/or a bond, but is not limited thereto.

The first to fourth pads 811 to 814 and the seventh to tenth pads 821 to 824 may be formed of the same material as that of the first partition 1700. The first to fourth pads 811 to 814 and the seventh to tenth pads 821 to 824 may be formed of the same material as that of the second partition 1700' or the third partition 1700". For example, the first to fourth pads 811 to 814 and the seventh to tenth pads 821 to 824 may be formed of a double-sided tape, a double-sided foam pad, a single-sided tape, a single-sided foam pad, an adhesive, and/or a bond, but is not limited thereto.

As another example, the at least one first pad 811 may be formed of the different material as that of the first partition 1700. The first partition 1700 may be formed of a double-sided tape. In comparison with a single-sided tape, when the first partition 1700 is formed of the double-sided tape, the wave phenomenon is not reduced, but an adhesive force between the display panel and the supporting member may be enhanced and sound quality may be enhanced. The at least one first pad 811 may be formed of a material differing from that of at least one of the first partition 1700, the second partition 1700', and the third partition 1700". The at least one first pad 811 or the at least one second pad 812 may be formed of a material differing from that of the first partition 1700. The at least one first pad 811 or the at least one second pad 812 may be formed of a material differing from that of at least one of the first partition 1700, the second partition 1700', and the third partition 1700". The at least one second pad 812 may be formed of the same material as that of the at least one first pad 811. The at least one third pad 813 or the at least one fourth pad 814 may be formed of a material differing from that of the first partition 1700. The at least one third pad 813 or the at least one fourth pad 814 may be formed of a material differing from that of at least one of the first partition 1700, the second partition 1700', and the third partition 1700". The at least one third pad 813 or the at least one fourth pad 814 may be formed of the same material as that of the at least one first pad 811.

The at least one seventh pad 821 or the at least one eighth pad 822 may be formed of a material differing from that of the first partition 1700. The at least one seventh pad 821 or the at least one eighth pad 822 may be formed of a material differing from that of at least one of the first partition 1700, the second partition 1700', and the third partition 1700". The at least one seventh pad 821 or the at least one eighth pad 822 may be formed of the same material as that of the at least one first pad 811. The at least one eighth pad 822 may be formed of the same material as that of the at least one seventh pad 821.

The at least one ninth pad 823 or the at least one tenth pad 824 may be formed of a material differing from that of the first partition 1700. The at least one ninth pad 823 or the at least one tenth pad 824 may be formed of a material differing from that of at least one of the first partition 1700, the second partition 1700', and the third partition 1700". The at least one ninth pad 823 or the at least one tenth pad 824 may be formed of the same material as that of the at least one first pad 811. The at least one ninth pad 823 or the at least one tenth pad 824 may be formed of the same material as that of the at least one seventh pad 821.

The first to fourth pads 811 to 814 and the seventh to tenth pads 821 to 824 may be formed of a material differing from that of the first partition 1700. The first to fourth pads 811 to 814 and the seventh to tenth pads 821 to 824 may be formed of a material differing from that of the second partition 1700' or the third partition 1700". For example, the first to fourth pads 811 to 814 and the seventh to tenth pads 821 to 824 may be formed of a single-sided tape. The single-sided tape may include a foam material which absorbs an impact when contacting the display panel 100. When the single-sided tape does not include the foam material, an undesired abnormal sound may occur due to contacting the display panel 100. For example, the single-sided tape may be formed of polyurethane, polyolefin, polyethylene, and/or the like, but is not limited thereto. When the first partition 1700, the first to fourth pads 811 to 814, and the seventh to tenth pads 821 to 824 are formed of different materials, the materials may be the same materials and have different adhesive forces. Alternatively, the materials may be different materials and may have different adhesive forces, but are not limited thereto. For example, a degree to which the display panel 100 is pulled may be reduced in a process of attaching the display panel 100 and the supporting member 300 to the first to fourth pads 811 to 814 and the seventh to tenth pads 821 to 824 in the first partition 1700, thereby preventing the wave phenomenon.

Therefore, since a partition is configured based on a shape of a display panel and one or more pads are on at least one side of the partition, the wave phenomenon may decrease, and the peak or the dip caused by the standing wave may be reduced, thereby enhancing a sound output characteristic. Also, a first sound generating device and a second sound generating device may output different sound of the middle-pitched sound band and a sound of the high-pitched sound band, and may output a stereo sound by separating the left and right sounds, thereby providing a display apparatus having a two-channel sound output characteristic.

FIGS. 12A to 12D illustrate a sound generating device and a partition according to an embodiment of the present disclosure.

In FIGS. 12A to 12D, the same descriptions as descriptions given above with reference to FIGS. 11A to 11D are omitted or will be briefly given below. For example, descriptions of a sound generating device, a partition, and a pad may be omitted or may be briefly given below. A partition and a pad will be described below with reference to FIG. 12A, and their descriptions may be identically applied to FIGS. 12B and 12D.

In describing the sound generating device, the partition, and the pad with reference to FIGS. 12A to 18D, the same descriptions as descriptions given above with reference to FIGS. 11A to 11D may be omitted or may be briefly given. In FIGS. 12A to 18D, one sound generating device, a two-device array sound generating device, and a four-device array sound generating device will be described below as an example of a sound generating device, but the four-device array sound generating device of FIG. 9C may also be applied.

With reference to FIGS. 12A to 12D, a pad may be in at least one side of a first partition 1700 so as to decrease a peak and dipping which are caused by a standing wave occurring in a lengthwise direction of first and second sound generating devices. For example, the first partition 1700 may include a first side and a second side vertical to the first side, and a first pad 811 and a seventh pad 821 may be in the first side. A second pad 812 and an eighth pad 822 may be further on a side facing the first side of the first partition 1700. A third pad 813, a fourth pad 814, a ninth pad 823, and a tenth pad 824 may be in the second side of the first partition 1700. As another example, one of the at least one third pad 813 and the at least one fourth pad 814 may be provided. As another example, one of the at least one ninth pad 823 and the at least one tenth pad 824 may be provided. The third pad 813, the fourth pad 814, the ninth pad 823, and the tenth pad 824 may be provided as one or as a plurality in one or more sides of the first partition 1700. Descriptions of the first to fourth pads 811 to 814 and the seventh to tenth pads 821 to 824 are the same as descriptions given above with reference to FIGS. 11A to 11D, and thus, may be omitted but may be simply given below.

Figure 12A:
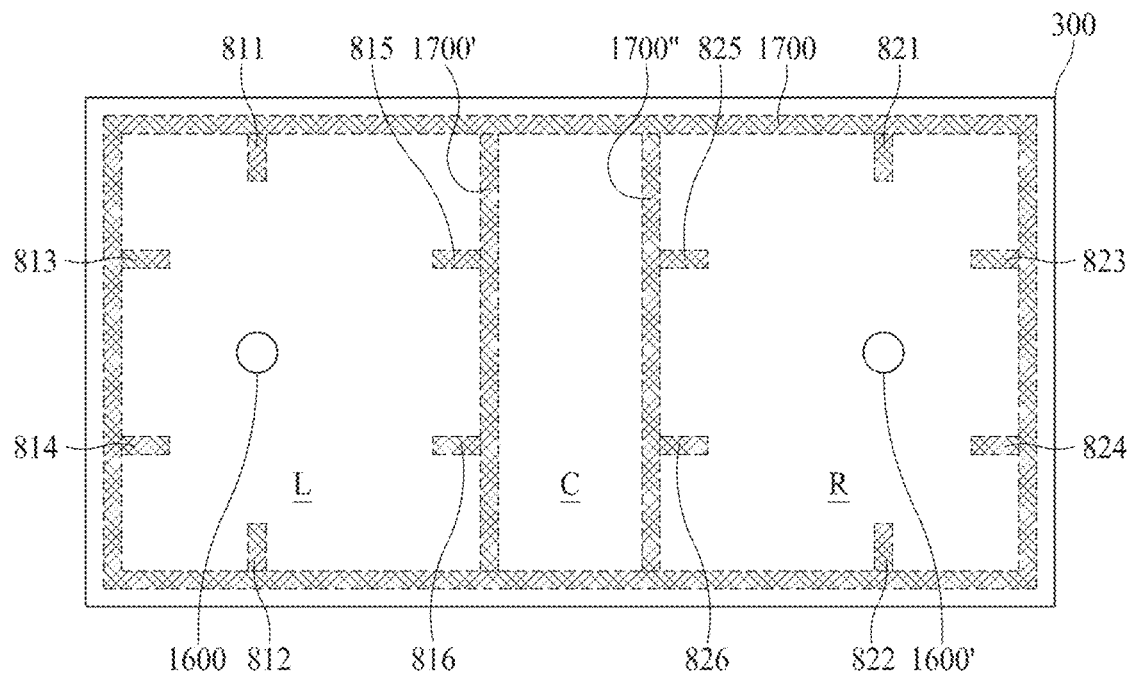
FIGS. 12A to 12D illustrate a sound generating device and a partition according to an embodiment of the present disclosure.
Figure 12B:
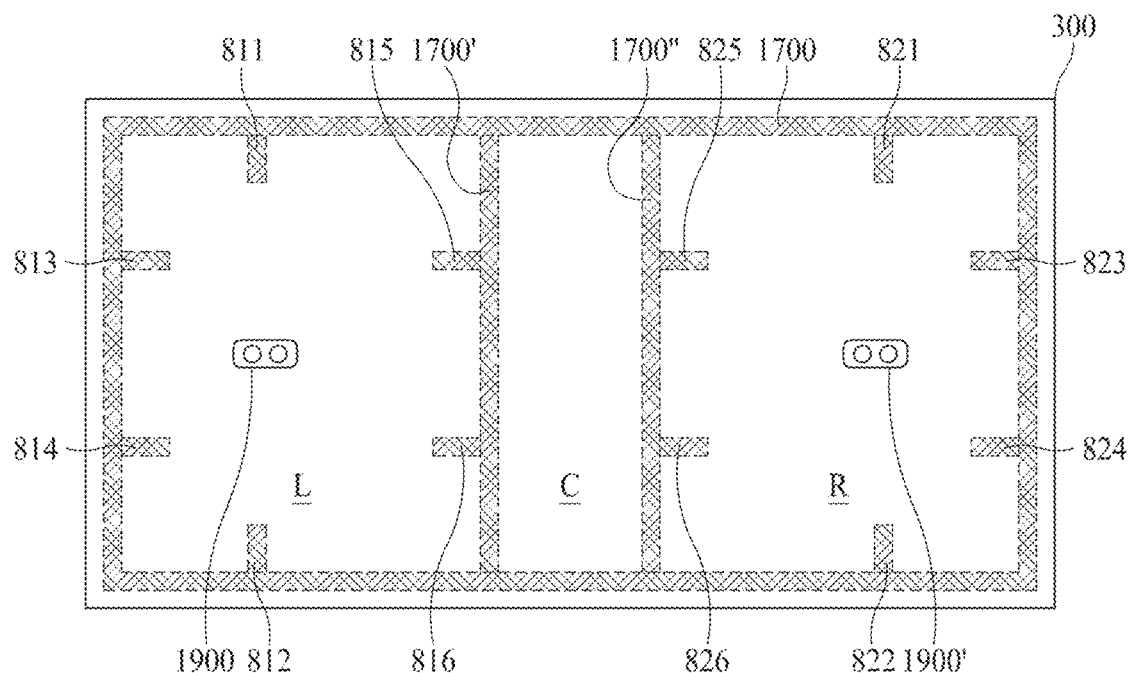
Figure 12C:
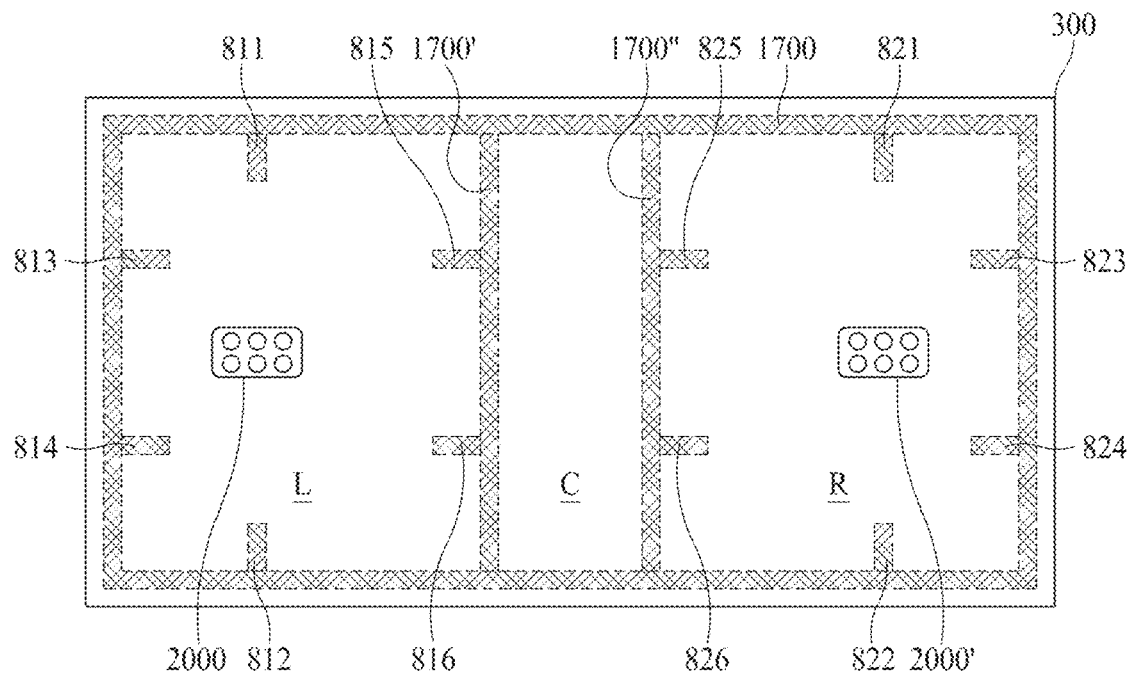
Figure 12D:
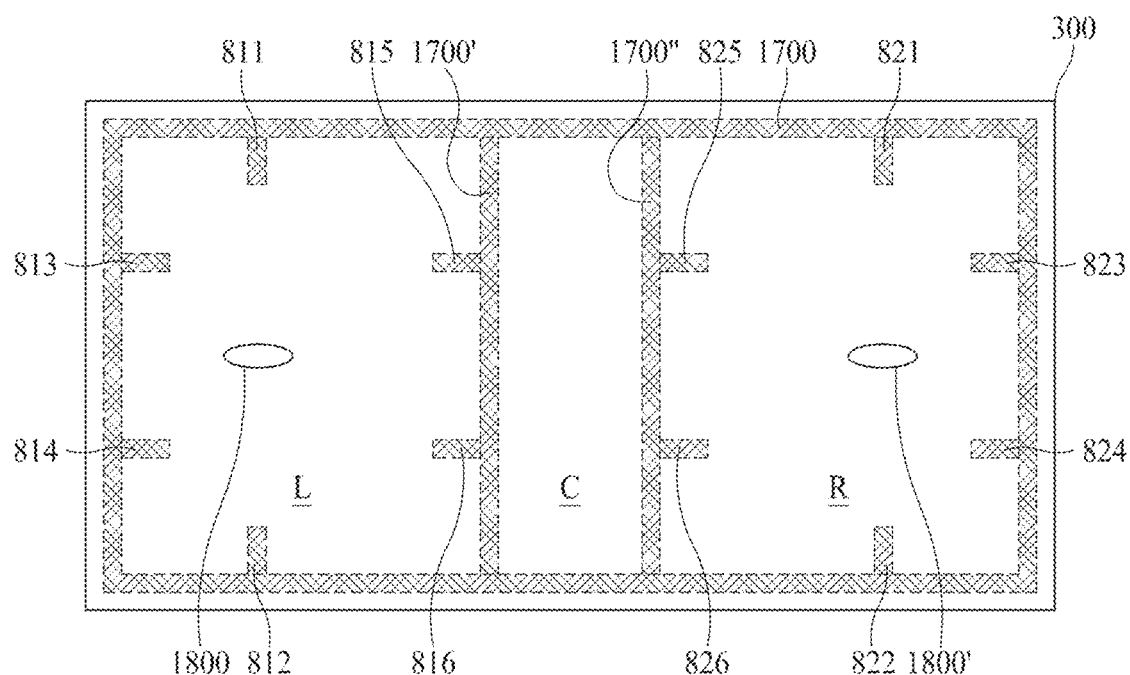

With reference to FIG. 12A, at least one fifth pad 815, sixth pad 816, eleventh pad 825, and twelfth pad 826 may be further provided on a side facing the second side of the first partition 1700. For example, the at least one fifth pad 815 and the at least one sixth pad 816 may be in a side, facing the second side of the first partition 1700 of a first region L, and the at least one fifth pad 815 and the at least one sixth pad 816 may be on at least one side of a second partition 1700'. As another example, one of the at least one fifth pad 815 and the at least one sixth pad 816 may be provided. For example, the at least one eleventh pad 825 and the at least one twelfth pad 826 may be on a side, facing the second side of the first partition 1700 of a second region R, and the at least one eleventh pad 825 and the at least one twelfth pad 826 may be on at least one side of the third partition 1700". As another example, one of the at least one eleventh pad 825 and the at least one twelfth pad 826 may be provided. The fifth pad 815 and the sixth pad 816 may be provided to face the third pad 813 and the fourth pad 814. For example, the fifth pad 815 and the sixth pad 816 may be disposed to be symmetrical with respect to a first sound generating device 1600. The eleventh pad 825 and the twelfth pad 826 may be provided to face the ninth pad 823 and the tenth pad 824. For example, the eleventh pad 825 and the twelfth pad 826 may be disposed to be symmetrical with respect to a second sound generating device 1600'.

The at least one fifth pad 815 or the at least one sixth pad 816 may be formed of the same material as that of the first partition 1700. For example, the at least one fifth pad 815 or the at least one sixth pad 816 may be formed of one of a double-sided tape, a double-sided foam pad, a single-sided tape, a single-sided foam pad, an adhesive, and/or a bond, but is not limited thereto. As another example, the at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one eleventh pad 825 or the at least one twelfth pad 826 may be formed of the same material as that of the first partition 1700. For example, the at least one eleventh pad 825 or the at least one twelfth pad 826 may be formed of one of a double-sided tape, a double-sided foam pad, a single-sided tape, a single-sided foam pad, an adhesive, and/or a bond, but is not limited thereto. As another example, the at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700".

Therefore, since a partition is configured based on a shape of a display panel and one or more pads are provided on at least one side of the partition, the wave phenomenon may decrease, and the peak or the dip caused by the standing wave may be reduced, thereby enhancing a sound output characteristic. Also, a first sound generating device and a second sound generating device may output a different sound of the middle-pitched sound band and a sound of the high-pitched sound band, and may output a stereo sound by separating the left and right sounds, thereby providing a display apparatus having a two-channel sound output characteristic.

Figure 13A:
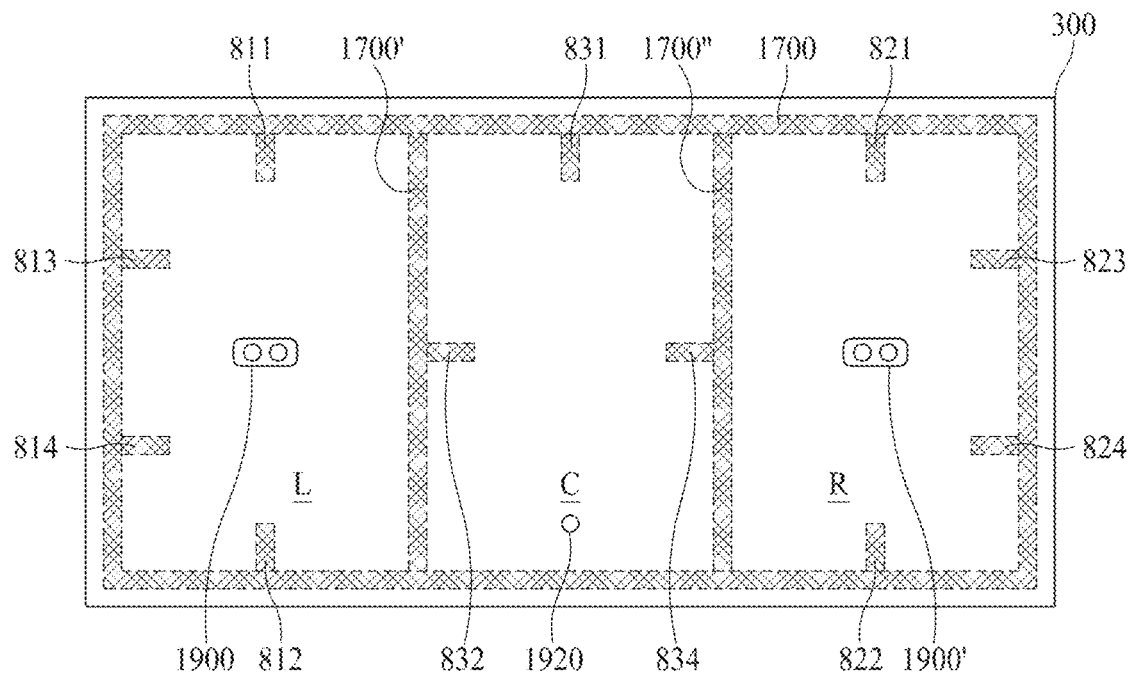
FIGS. 13A and 13B illustrate a sound generating device and a partition according to an embodiment of the present disclosure.
Figure 13B:
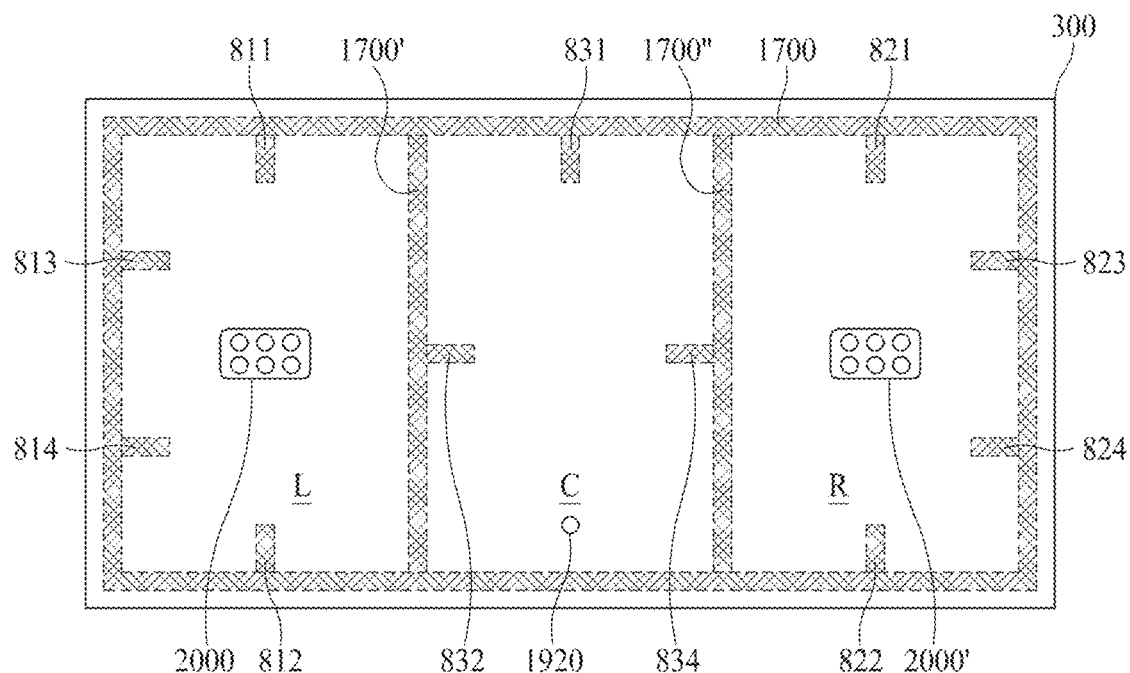

FIGS. 13A and 13B illustrate a sound generating device and a partition according to an embodiment of the present disclosure.

In FIGS. 13A and 13B, the same descriptions as descriptions given above with reference to FIGS. 11A to 11D may be omitted or may be briefly given below. For example, descriptions of a sound generating device, a partition, and a pad may be omitted or may be briefly given below.

With reference to FIGS. 13A and 13B, a first partition 1700 may be between a display panel and a supporting member 300. For example, the first partition 1700 may be between a rear surface of the display panel and an upper surface of the supporting member 300. The first partition 1700 may be at the supporting member 300. For example, the first partition 1700 may be at an edge or periphery of the supporting member 300 or an edge or periphery of an upper surface of the supporting member 300. The first partition 1700 may be at an edge or periphery of the display panel. For example, the first partition 1700 may be at the rear surface of the display panel or the edge or periphery of the supporting member 300. The first partition 1700 may be at a whole region of four outer sides of the supporting member 300 or the whole region of the rear surface of the display panel.

Therefore, the first partition 1700 may be disposed along a shape of the display panel 100. For example, the first partition 1700 may have a tetragonal (e.g., quadrilateral) shape, but is not limited thereto. In other embodiments, a shape of the first partition 1700 may be modified based on a shape of the display panel 100. If the display panel 100 is a curved display panel having a curve shape or the like, the first partition 1700 may have a curved shape or a curve shape. Accordingly, the first partition 1700 may be disposed along a shape of the display panel 100, thereby preventing the wave phenomenon.

With reference to FIG. 13A, a first sound generating device 1900 may be in a first region L, and a second sound generating device 1900' may be in a second region R. The first sound generating device 1900 and the second sound generating device 1900' may be configured as the sound generating device described above with reference to FIG. 9B. For example, the first sound generating device 1900 and the second sound generating device 1900' may be configured with two sound generating devices. The first sound generating device 1900 and the second sound generating device 1900' may output sounds of different middle-high-pitched sound bands in the first region L and the second region R. For example, the first sound generating device 1900 and the second sound generating device 1900' may output a sound corresponding to a range of about 300 Hz to about 20 kHz, but a range is not limited thereto.

A third sound generating device 1920 may be in a third region C. The third sound generating device 1920 may be configured as the sound generating device described above with reference to FIG. 9A. For example, the third sound generating device 1920 may be configured with one sound generating device. The third sound generating device 1920 may output a sound of a middle-low-pitched sound band in the third region C. For example, the third sound generating device 1920 may output a sound corresponding to a range of about 100 Hz to about 10 kHz, but a range is not limited thereto.

Therefore, the first sound generating device 1900 and the second sound generating device 1900' may output sound of different middle-high-pitched sound bands, and the third sound generating device 1920 may output a sound of the middle-low-pitched sound band. Accordingly, a stereo sound may be output by separating left and right sounds, thereby providing a display apparatus having a three-channel sound output characteristic.

With reference to FIG. 13B, a first sound generating device 2000 may be in a first region L, and a second sound generating device 2000' may be in a second region R. The first sound generating device 2000 and the second sound generating device 2000' may be configured as the sound generating device described above with reference to FIG. 9D. For example, the first sound generating device 2000 and the second sound generating device 2000' may be configured with six sound generating devices. The first sound generating device 2000 and the second sound generating device 2000' may output sounds of different middle-high-pitched sound bands in the first region L and the second region R. For example, the first sound generating device 2000 and the second sound generating device 2000' may output a sound corresponding to a range of about 200 Hz to about 20 kHz, but a range is not limited thereto.

A third sound generating device 1920 may be in a third region C. The third sound generating device 1920 may be configured as the sound generating device described above with reference to FIG. 9A. For example, the third sound generating device 1920 may be configured with one sound generating device. The third sound generating device 1920 may output a sound of a middle-low-pitched sound band in the third region C. For example, the third sound generating device 1920 may output a sound corresponding to a range of about 100 Hz to about 10 kHz, but a range is not limited thereto.

Therefore, the first sound generating device 2000 and the second sound generating device 2000' may output sounds of different middle-high-pitched sound bands, and the third sound generating device 1920 may output a sound of the middle-low sound band. Accordingly, a stereo sound may be output by separating left and right sounds, thereby providing a display apparatus having a three-channel sound output characteristic.

With reference to FIGS. 13A and 13B, a first sound generating device of a first region L and a second sound generating device of a second region R may be disposed asymmetrically with a third sound generating device of a third region C. For example, in FIG. 13A, the first sound generating device 1900 of the first region L and the second sound generating device 1900' of the second region R may be disposed on a line differing from the third sound generating device 1920 of the third region C. The first sound generating device 1900 of the first region L and the second sound generating device 1900' of the second region R may be disposed symmetrically, and the third sound generating device 1920 of the third region C may be disposed asymmetrically with the first sound generating device 1900 of the first region L and the second sound generating device 1900' of the second region R. The third sound generating device 1920 of the third region C may be lower in position than the first sound generating device 1900 of the first region L and the second sound generating device 1900' of the second region R, but embodiments are not limited thereto.

With reference to FIGS. 13A and 13B, one member may be further provided on at least one side of a first partition 1700, a second partition 1700', and a third partition 1700''. This will be described below with reference to FIG. 13A for example, and the description may be applied to FIG. 13B identically or similarly. A first member 831 may be on a first side of the first partition 1700. For example, the first member 831 may face the third sound generating device 1920. A second member 832 may be on a side of the second partition 1700'. For example, the second member 832 may be in the third region C. A third member 834 may be disposed on a side of the third partition 1700''. For example, the third member 834 may be in the third region C. The second member 832 may face the third member 834. The first member 831, the second member 832, and the third member 834 may decrease or prevent the transfer of a vibration(s), generated by the first region L and/or the second region R, to the third region C, thereby providing a display apparatus for realizing a sharp or clean or refined sound. The first member 831 may decrease a peak or a dip caused by a standing wave which occurs in a lengthwise direction of a sound generating device, and thus, may be referred to as a pad. However, the terms are not limited thereto.

One of the second member 832 and the third member 834 may be disposed symmetrically with respect to the first sound generating device 1900 and/or the second sound generating device 1900'. For example, one of the second member 832 and the third member 834 may be disposed on the same plane or line as the first sound generating device 1900 and/or the second sound generating device 1900', but the present embodiment is not limited thereto. One of the second member 832 and the third member 834 may be disposed asymmetrically with respect to the first sound generating device 1900 and/or the second sound generating device 1900'. For example, one of the second member 832 and the third member 834 may be on a plane or a line differing from the first sound generating device 1900 and/or the second sound generating device 1900', but embodiments are not limited thereto. The second member 832 may be between the third pads 813 and the fourth pad 814 on at least one side of the first partition 1700, but is not limited thereto. The third member 834 may be between the ninth pad 823 or the tenth pad 824 on at least one side of the first partition 1700, but is not limited thereto. For example, the second member 832 may be above or under the third pad 813 or the fourth pad 814, and the third member 834 may be above or under the ninth pad 823 or the tenth pad 824. However, embodiments are not limited thereto.

The first member 831, the second member 832, and the third member 834 may be formed of one of a double-sided tape, a double-sided foam pad, a single-sided tape, a single-sided foam pad, an adhesive, and/or a bond. When the first member 831, the second member 832, and the third member 834 are formed of materials which differ from those of the first pad 811, the second pad 812, the third pad 813, the fourth pad 814, the seventh pad 821, the eighth pad 822, the ninth pad 823, and the tenth pad 824, the wave phenomenon may occur due to different adhesive forces when contacting the display panel 100. Therefore, when the first member 831, the second member 832, and the third member 834 are formed of the same material as that of the first pad 811, the second pad 812, the third pad 813, the fourth pad 814, the seventh pad 821, the eighth pad 822, the ninth pad 823, and the tenth pad 824, the wave phenomenon may be reduced, and the occurrence of an abnormal sound may be reduced. Therefore, the first member 831, the second member 832, and the third member 834 may be formed of the same material as that of the first pad 811, the second pad 812, the third pad 813, the fourth pad 814, the seventh pad 821, the eighth pad 822, the ninth pad 823, and the tenth pad 824. For example, the first member 831, the second member 832, and the third member 834 may be formed of a double-sided tape or a single-sided tape. The double-sided tape or the single-sided tape may include a foam material which absorbs an impact when contacting the display panel 100. When the double-sided tape or the single-sided tape does not include the foam material, it may be seen that an undesired abnormal sound occurs due to contacting the display panel 100. The single-sided tape may be formed of, for example, polyurethane, polyolefin, polyethylene, and/or the like, but is not limited thereto. A shape of the first member 831, the second member 832, and the third member 834, as described above with reference to FIGS. 11A to 11D, may be adjusted to be equal or similar to that of the first pad 811, the second pad 812, the third pad 813, the fourth pad 814, the seventh pad 821, the eighth pad 822, the ninth pad 823, and the tenth pad 824.

In FIGS. 13A to 18D, the first region L, the second region R, and the third region C are illustrated as having the same area, but embodiment of the present disclosure is not limited thereto. For example, an area of the first region L and the second region R may be greater than that of the third region C. When the first region L, the second region R, and the third region C have the same area, a sound of a relatively lower sound band may be output. For example, when an area of the third region C which outputs sound of the middle-low-pitched sound band is greater than that of the first region L and the second region R, a reproduction range corresponding to the low-pitched sound band may further increase.

Figure 14A:
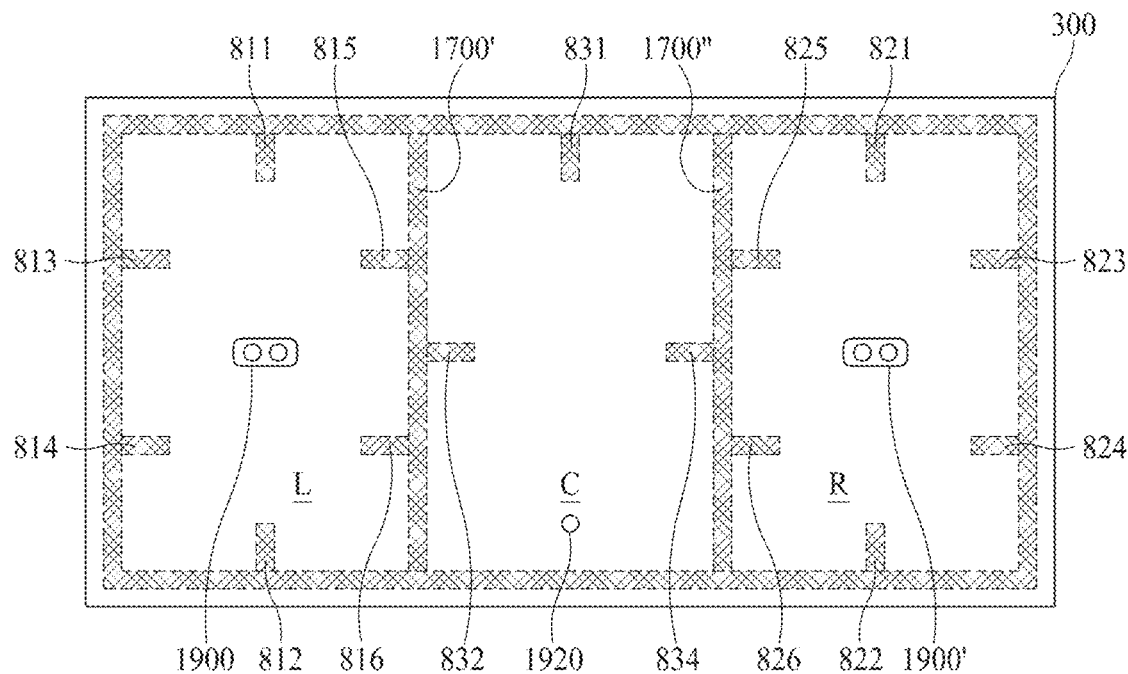
FIGS. 14A and 14B illustrate a sound generating device and a partition according to an embodiment of the present disclosure.
Figure 14B:
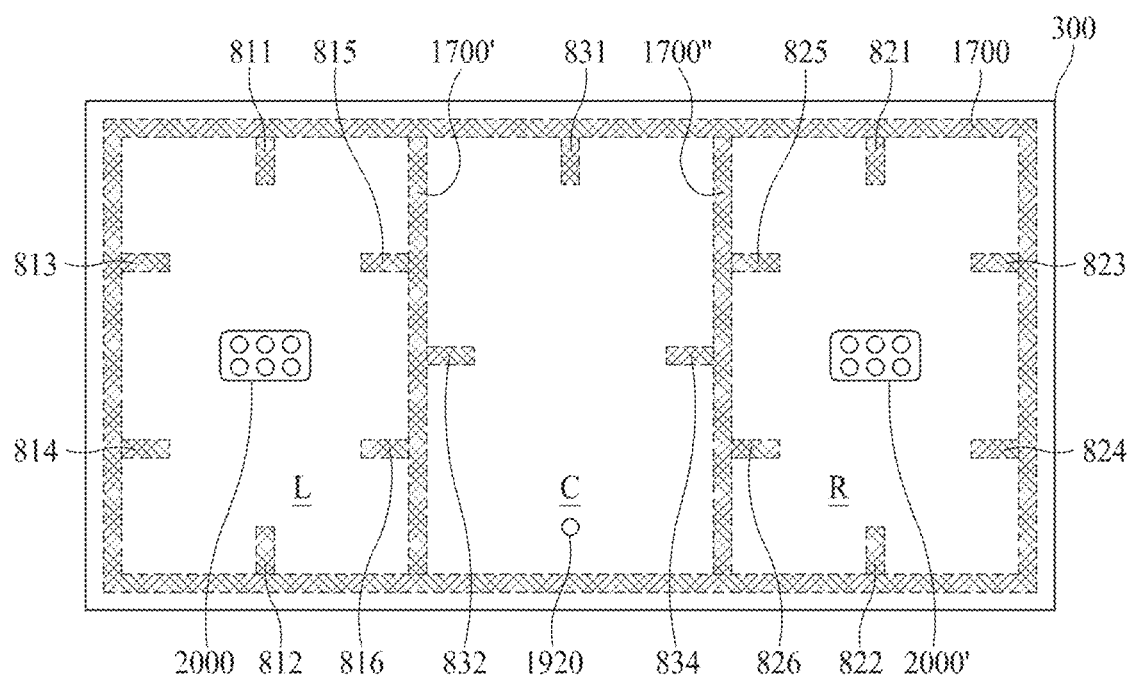

FIGS. 14A and 14B illustrate a sound generating device and a partition according to the present disclosure.

In FIGS. 14A and 14B, the same descriptions as descriptions given above with reference to FIGS. 11A to 11D, 13A, and 13B may be omitted or may be briefly given below. For example, descriptions of a sound generating device, a partition, and a pad may be omitted or may be briefly given below.

With reference to FIG. 14A, at least one fifth pad 815, sixth pad 816, eleventh pad 825, and twelfth pad 826 may be further provided on a side facing the second side of the first partition 1700. For example, the at least one fifth pad 815 and the at least one sixth pad 816 may be in a side, facing the second side of the first partition 1700 of a first region L, and the at least one fifth pad 815 and the at least one sixth pad 816 may be on at least one side of a second partition 1700'. As another example, one of the at least one fifth pad 815 and the at least one sixth pad 816 may be provided. For example, the at least one eleventh pad 825 and the at least one twelfth pad 826 may be on a side, facing the second side of the first partition 1700 of a second region R, and the at least one eleventh pad 825 and the at least one twelfth pad 826 may be on at least one side of the third partition 1700". As another example, one of the at least one eleventh pad 825 and the at least one twelfth pad 826 may be provided. The fifth pad 815 and the sixth pad 816 may be provided to face the third pad 813 and the fourth pad 814. For example, the fifth pad 815 and the sixth pad 816 may be disposed to be symmetrical with respect to a first sound generating device 1900. The eleventh pad 825 and the twelfth pad 826 may be provided to face the ninth pad 823 and the tenth pad 824. For example, the eleventh pad 825 and the twelfth pad 826 may be disposed to be symmetrical with respect to a second sound generating device 1900'.

The at least one fifth pad 815 or the at least one sixth pad 816 may be formed of the same material as that of the first partition 1700. For example, the at least one fifth pad 815 or the at least one sixth pad 816 may be formed of one of a double-sided tape, a double-sided foam pad, a single-sided tape, a single-sided foam pad, an adhesive, and/or a bond, but embodiments are not limited thereto. As another example, the at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one eleventh pad 825 or the at least one twelfth pad 826 may be formed of the same material as that of the first partition 1700. For example, the at least one eleventh pad 825 or the at least one twelfth pad 826 may be formed of one of a double-sided tape, a double-sided foam pad, a single-sided tape, a single-sided foam pad, an adhesive, and/or a bond, but is not limited thereto. As another example, the at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700".

Therefore, since a partition is configured based on a shape of a display panel and one or more pads are provided on at least one side of the partition, the wave phenomenon may decrease, and the peak or the dip caused by the standing wave may be reduced, thereby enhancing a sound output characteristic. Also, a first sound generating device and a second sound generating device may output a sound of the different middle-high-pitched sound band and may output a stereo sound by separating the left and right sounds, thereby providing a display apparatus having a two-channel sound output characteristic.

Figure 15A:
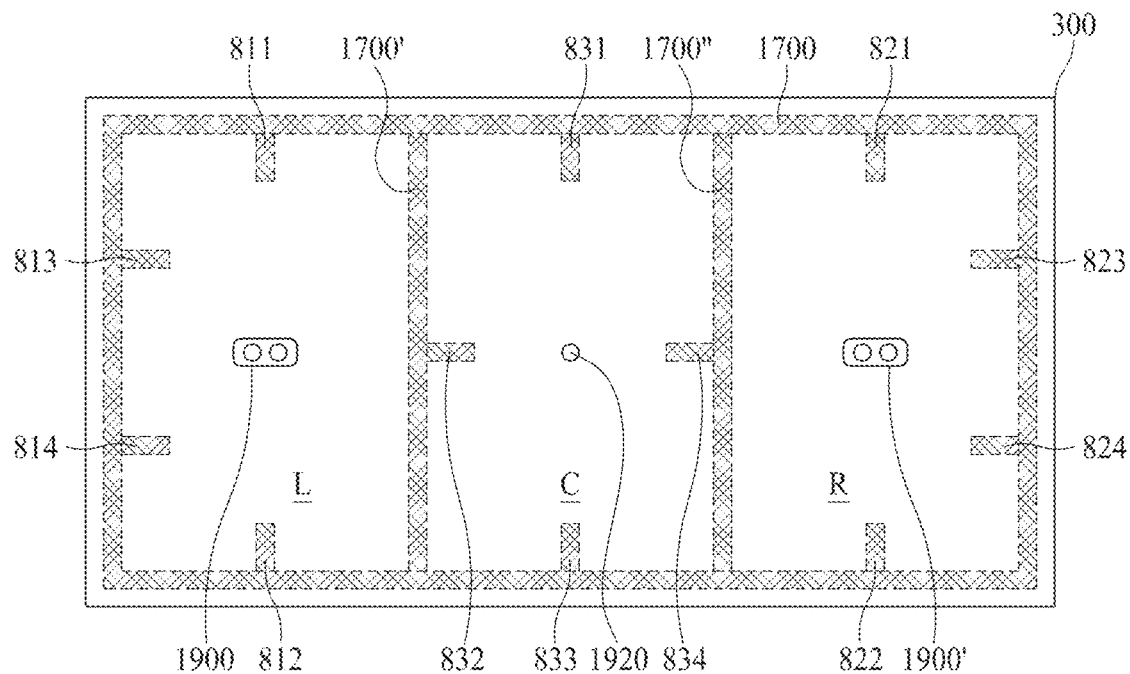
FIGS. 15A and 15B illustrate a sound generating device and a partition according to an embodiment of the present disclosure.
Figure 15B:
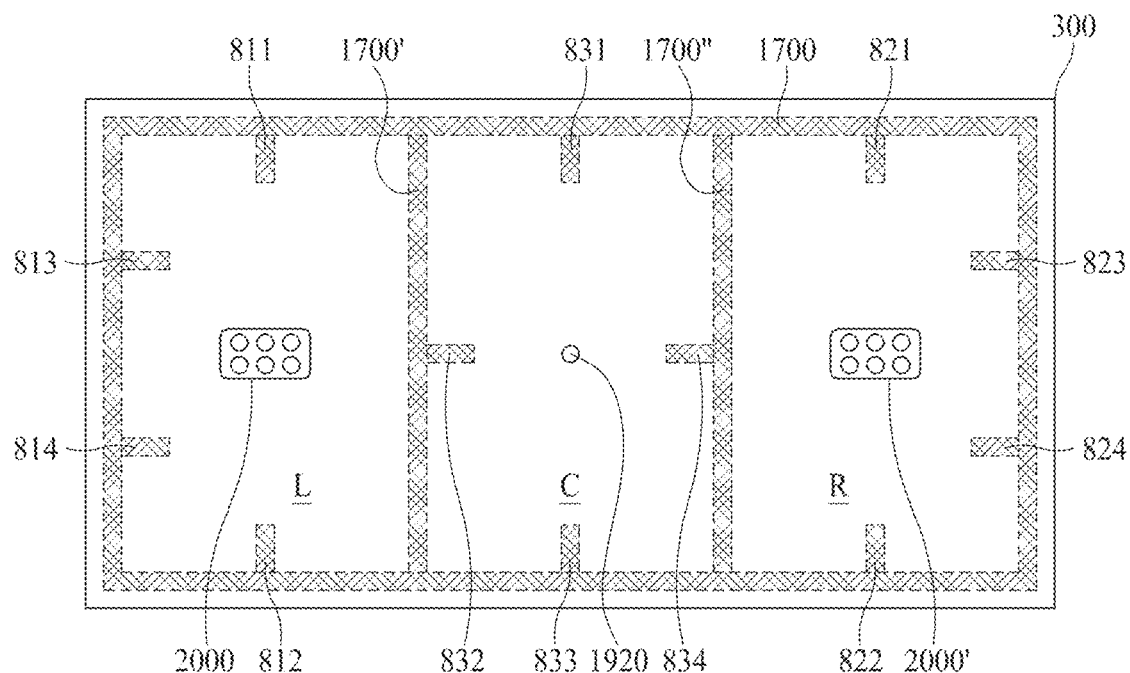

FIGS. 15A and 15B illustrate a sound generating device and a partition according to an embodiment of the present disclosure.

In FIGS. 15A and 15B, the same descriptions as descriptions given above with reference to FIGS. 11A to 11D, 13A, and 13B may be omitted or may be briefly given below. For example, descriptions of a sound generating device, a partition, and a pad may be omitted or may be briefly given below.

With reference to FIG. 15A, a first sound generating device 1900 may be disposed in a first region L, and a second sound generating device 1900' may be disposed in a second region R. The first sound generating device 1900 and the second sound generating device 1900' may be configured as the sound generating device described above with reference to FIG. 9B. For example, the first sound generating device 1900 and the second sound generating device 1900' may be configured with two sound generating devices. The first sound generating device 1900 and the second sound generating device 1900' may output sound of different middle-high-pitched sound bands in the first region L and the second region R. For example, the first sound generating device 1900 and the second sound generating device 1900' may output sound corresponding to a range of about 300 Hz to about 20 kHz, but a range is not limited thereto.

A third sound generating device 1920 may be in a third region C. The third sound generating device 1920 may be configured as the sound generating device described above with reference to FIG. 9A. For example, the third sound generating device 1920 may be configured with one sound generating device. The third sound generating device 1920 may output a sound of a middle-low-pitched sound band in the third region C. For example, the third sound generating device 1920 may output a sound corresponding to a range of about 100 Hz to about 10 kHz, but a range is not limited thereto.

Therefore, the first sound generating device 1900 and the second sound generating device 1900' may output sound of different middle-high-pitched sound bands, and the third sound generating device 1920 may output a sound of the middle-low-pitched sound band. Accordingly, a stereo sound may be output by separating left and right sounds, thereby providing a display apparatus having a three-channel sound output characteristic.

With reference to FIG. 15B, a first sound generating device 2000 may be in a first region L, and a second sound generating device 2000' may be in a second region R. The first sound generating device 2000 and the second sound generating device 2000' may be configured as the sound generating device described above with reference to FIG. 9D. For example, the first sound generating device 2000 and the second sound generating device 2000' may be configured with six sound generating devices. The first sound generating device 2000 and the second sound generating device 2000' may output sound of different middle-high-pitched sound bands in the first region L and the second region R. For example, the first sound generating device 2000 and the second sound generating device 2000' may output sound corresponding to a range of about 200 Hz to about 20 kHz, but a range is not limited thereto.

A third sound generating device 1920 may be in a third region C. The third sound generating device 1920 may be configured as the sound generating device described above with reference to FIG. 9A. For example, the third sound generating device 1920 may be configured with one sound generating device. The third sound generating device 1920 may output a sound of a middle-low-pitched sound band in the third region C. For example, the third sound generating device 1920 may output a sound corresponding to a range of about 100 Hz to about 10 kHz, but a range is not limited thereto.

Therefore, the first sound generating device 2000 and the second sound generating device 2000' may output sounds of different middle-high-pitched sound bands, and the third sound generating device 1920 may output a sound of the middle-low-pitched sound band. Accordingly, a stereo sound may be output by separating left and right sounds, thereby providing a display apparatus having a three-channel sound output characteristic.

With reference to FIGS. 15A and 15B, a first sound generating device of a first region L and a second sound generating device of a second region R may be disposed symmetrically with a third sound generating device of a third region C. For example, in FIG. 15A, the first sound generating device 1900 of the first region L, the second sound generating device 1900' of the second region R, and the third sound generating device 1920 of the third region C may be disposed on the same line. For example, heights of sound sources which generate sounds may become equal or similar, and thus, when reproducing a stereo sound which expresses a position of a sound based on a difference between left and right sounds, sound image localization where a sound image is realized at a normal position may be enhanced.

With reference to FIGS. 15A and 15B, one member may be further disposed on at least one side of a first partition 1700, a second partition 1700', and a third partition 1700". This will be described below with reference to FIG. 15A for example, and the description may be applied to FIG. 15B identically or similarly. A first member 831 may be on a first side of the first partition 1700. For example, the first member 831 may be disposed to face the third sound generating device 1920. A second member 832 may be on a side of the second partition 1700'. For example, the second member 832 may be in the third region C. A third member 834 may be on a side of the third partition 1700". For example, the third member 834 may be in the third region C. The second member 832 may be disposed to face the third member 834. A fourth member 833 may be on the first side of the first partition 1700. For example, the fourth member 833 may be disposed to face the third sound generating device 1920. The first member 831 may be disposed to face the fourth member 833. The first member 831, the second member 832, the third member 834, and the fourth member 833 may decrease or prevent the transfer of a vibration(s), generated by the first region L and/or the second region R, to the third region C, thereby providing a display apparatus for realizing a sharp or clean or refined sound. The first member 831 and the fourth member 833 may decrease a peak or a dip caused by a standing wave which occurs in a lengthwise direction of a sound generating device, and thus, may be referred to as a pad.

One of the second member 832 and the third member 834 may be disposed symmetrically with respect to the first sound generating device 1900 and/or the second sound generating device 1900'. For example, one of the second member 832 and the third member 834 may be on the same plane or line as the first sound generating device 1900 and/or the second sound generating device 1900', but embodiments are not limited thereto. One of the second member 832 and the third member 834 may be disposed asymmetrically with respect to the first sound generating device 1900 and/or the second sound generating device 1900'. For example, one of the second member 832 and the third member 834 may be on a plane or a line differing from the first sound generating device 1900 and/or the second sound generating device 1900', but embodiments are not limited thereto. The second member 832 may be between the third pad 813 and the fourth pad 814 on at least one side of the first partition 1700, but is not limited thereto. The third member 834 may be between the ninth pad 823 and the tenth pad 824 on at least one side of the first partition 1700, but is not limited thereto. For example, the second member 832 may be above or under the third pad 813 or the fourth pad 814, and the third member 834 may be above or under the ninth pad 823 or the tenth pad 824. However, embodiments are not limited thereto.

The first member 831, the second member 832, the third member 834, and the fourth member 833 may be formed of one of a double-sided tape, a double-sided foam pad, a single-sided tape, a single-sided foam pad, an adhesive, and/or a bond. When the first member 831, the second member 832, the third member 834, and the fourth member 833 are formed of materials which differ from those of the first pad 811, the second pad 812, the third pad 813, the fourth pad 814, the seventh pad 821, the eighth pad 822, the ninth pad 823, and the tenth pad 824, the wave phenomenon may occur due to different adhesive forces when contacting the display panel 100. Therefore, when the first member 831, the second member 832, the third member 834, and the fourth member 833 are formed of the same material as that of the first pad 811, the second pad 812, the third pad 813, the fourth pad 814, the seventh pad 821, the eighth pad 822, the ninth pad 823, and the tenth pad 824, the wave phenomenon may be reduced, and the occurrence of an abnormal sound may be reduced. Therefore, the first member 831, the second member 832, the third member 834, and the fourth member 833 may be formed of the same material as that of the first pad 811, the second pad 812, the third pad 813, the fourth pad 814, the seventh pad 821, the eighth pad 822, the ninth pad 823, and the tenth pad 824. For example, the first member 831, the second member 832, the third member 834, and the fourth member 833 may be formed of a double-sided tape or a single-sided tape. The double-sided tape or the single-sided tape may include a foam material which absorbs an impact when contacting the display panel 100. When the double-sided tape or the single-sided tape does not include the foam material, it may be seen that an undesired abnormal sound occurs due to contacting the display panel 100. The single-sided tape may be formed of, for example, polyurethane, polyolefin, polyethylene, and/or the like, but is not limited thereto. A shape of the first member 831, the second member 832, the third member 834, and the fourth member 833, as described above with reference to FIGS. 11A to 11D, may be adjusted to be equal or similar to that of the first pad 811, the second pad 812, the third pad 813, the fourth pad 814, the seventh pad 821, the eighth pad 822, the ninth pad 823, and the tenth pad 824.

Figure 16A:
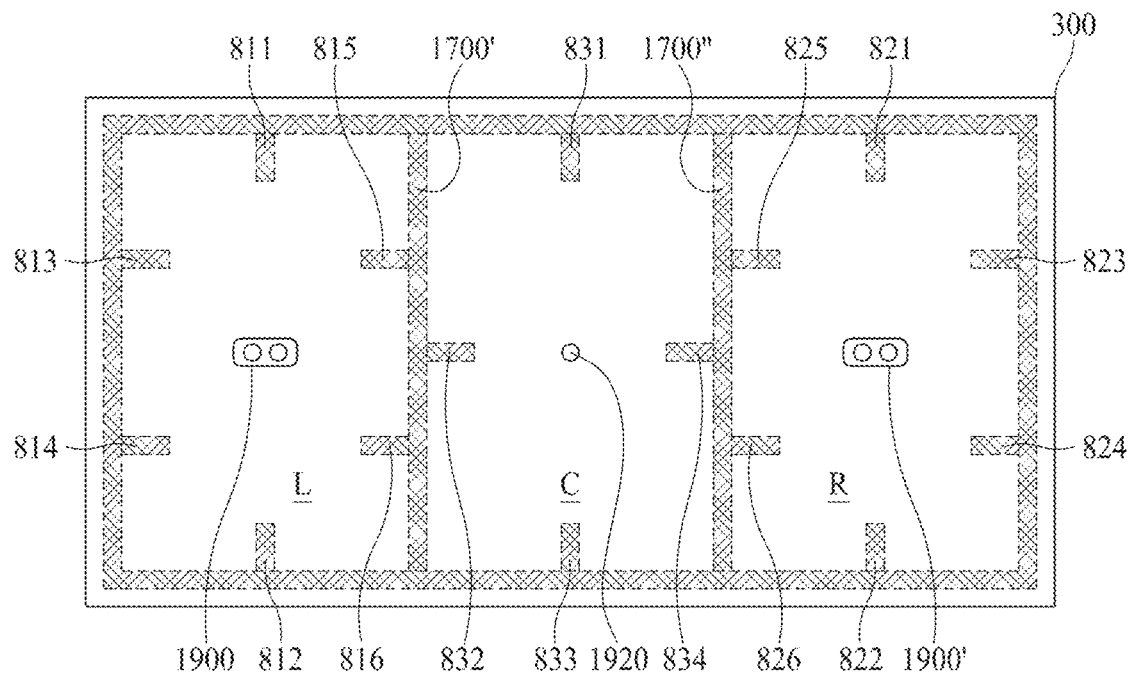
FIGS. 16A and 16B illustrate a sound generating device and a partition according to an embodiment of the present disclosure.
Figure 16B:
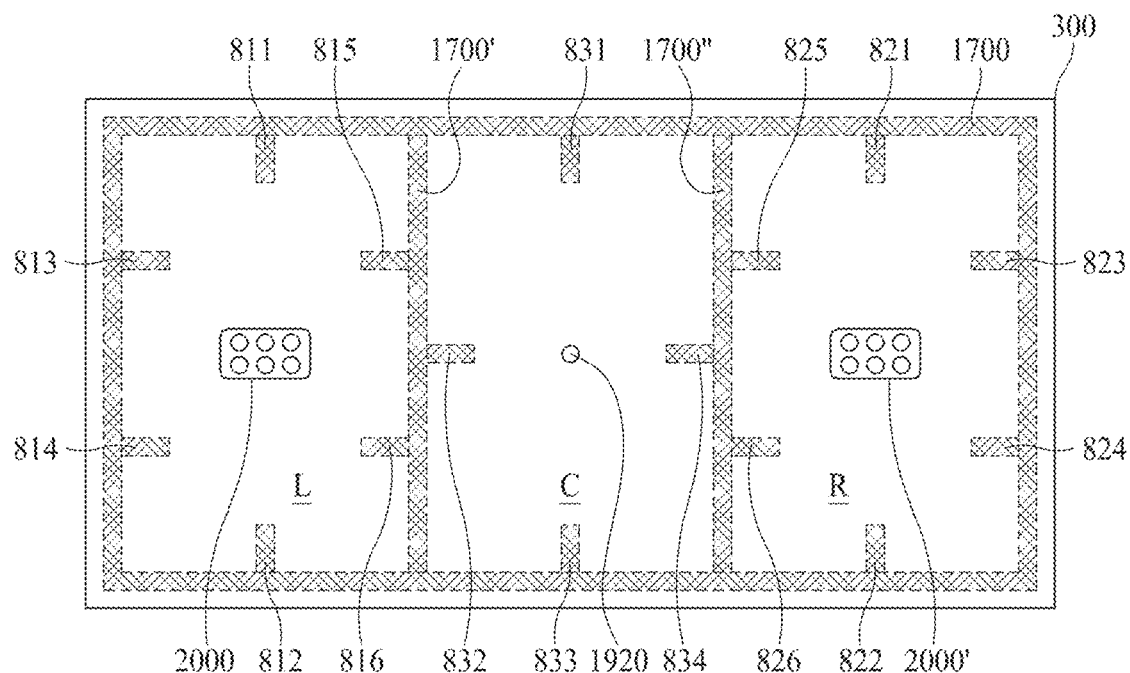

FIGS. 16A and 16B illustrate a sound generating device and a partition according to an embodiment of the present disclosure.

In FIGS. 16A and 16B, the same descriptions as descriptions given above with reference to FIGS. 11A to 11D, 15A, and 15B may be omitted or may be briefly given below. For example, descriptions of a sound generating device, a partition, and a pad may be omitted or may be briefly given below.

With reference to FIG. 16A, at least one fifth pad 815, sixth pad 816, eleventh pad 825, and twelfth pad 826 may be further provided on a side facing the second side of the first partition 1700. For example, the at least one fifth pad 815 and the at least one sixth pad 816 may be in a side, facing the second side of the first partition 1700 of a first region L, and the at least one fifth pad 815 and the at least one sixth pad 816 may be on at least one side of a second partition 1700'. As another example, one of the at least one fifth pad 815 and the at least one sixth pad 816 may be provided. For example, the at least one eleventh pad 825 and the at least one twelfth pad 826 may be on a side, facing the second side of the first partition 1700 of a second region R, and the at least one eleventh pad 825 and the at least one twelfth pad 826 may be on at least one side of the third partition 1700". As another example, one of the at least one eleventh pad 825 and the at least one twelfth pad 826 may be provided. The fifth pad 815 and the sixth pad 816 may be provided to face the third pad 813 and the fourth pad 814. For example, the fifth pad 815 and the sixth pad 816 may be disposed to be symmetrical with respect to a first sound generating device 1900. The eleventh pad 825 and the twelfth pad 826 may be provided to face the ninth pad 823 and the tenth pad 824. For example, the eleventh pad 825 and the twelfth pad 826 may be disposed to be symmetrical with respect to a second sound generating device 1900'.

The at least one fifth pad 815 or the at least one sixth pad 816 may be formed of the same material as that of the first partition 1700. For example, the at least one fifth pad 815 or the at least one sixth pad 816 may be formed of one of a double-sided tape, a double-sided foam pad, a single-sided tape, a single-sided foam pad, an adhesive, and/or a bond, but is not limited thereto. As another example, the at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one eleventh pad 825 or the at least one twelfth pad 826 may be formed of the same material as that of the first partition 1700. For example, the at least one eleventh pad 825 or the at least one twelfth pad 826 may be formed of one of a double-sided tape, a double-sided foam pad, a single-sided tape, a single-sided foam pad, an adhesive, and/or a bond, but is not limited thereto. As another example, the at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700".

Therefore, since a partition is configured based on a shape of a display panel and one or more pads are provided on at least one side of the partition, the wave phenomenon may decrease, and the peak or the dip caused by the standing wave may be reduced, thereby enhancing a sound output characteristic. Also, a first sound generating device and a second sound generating device may output a sound of different sound of the middle-high-pitched sound band and may output a stereo sound by separating the left and right sounds, thereby providing a display apparatus having a two-channel sound output characteristic.

FIGS. 17A to 17D illustrate a sound generating device and a partition according to an embodiment of the present disclosure.

In FIGS. 17A to 17D, the same descriptions as descriptions given above with reference to FIGS. 11A to 11D may be omitted or may be briefly given below. For example, descriptions of a sound generating device, a partition, and a pad may be omitted or may be briefly given below.

With reference to FIGS. 17A to 17D, a first region L and a second region R may include at least two regions, and a sound generating device may be in each of the at least two regions of the first region L and the second region R. A fourth partition 1704 may be further between the two regions of the first region L. A fifth partition 1705 may be further between the two regions of the second region R.

Figure 17A:
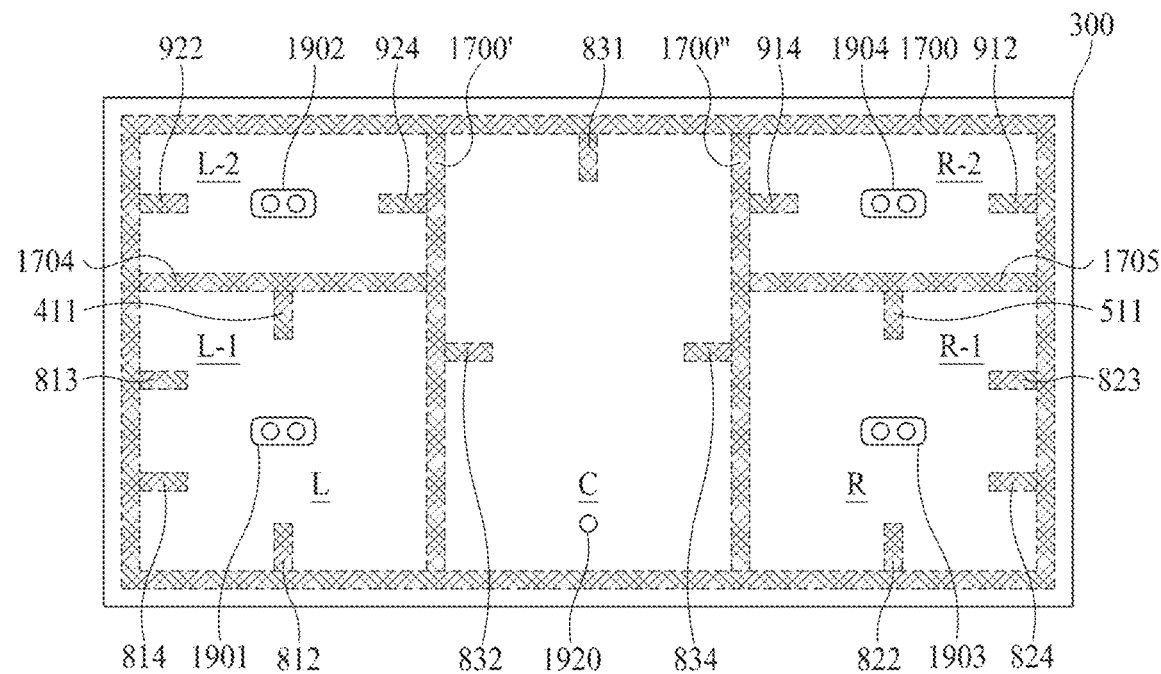
FIGS. 17A to 17D illustrate a sound generating device and a partition according to an embodiment of the present disclosure.

With reference to FIG. 17A, the first region L may be divided into a 1—$1^{st}$ region L-1 and a 1—$2^{nd}$ region L-2, a first sound generating device 1901 may be in the 1—$1^{st}$ region L-1, and a second sound generating device 1902 may be in the 1—$2^{nd}$ region L-2. The first sound generating device 1901 and the second sound generating device 1902 may be provided as sound generating devices having the same structure. When the first sound generating device 1901 and the second sound generating device 1902 are disposed in different structures, for example, when the first sound generating device 1901 is configured with two sound generating devices and the second sound generating device 1902 is configured with six sound generating devices, the first region L may output sounds of different sound bands, and due to this, it may be difficult to output a clean sound. Even when the first sound generating device 1901 is configured with two sound generating devices and the second sound generating device 1902 is configured with six sound generating devices, when the first sound generating device 1901 is configured with sound generating devices for outputting sounds of the same sound band and the second sound generating device 1902 is configured with sound generating devices for outputting sounds of the same sound band, a clean sound may be output. The 1—$1^{st}$ region L-1 may be greater than the 1—$2^{nd}$ region L-2, but embodiments are not limited thereto. For example, the 1—$2^{nd}$ region L-2 may be in a region corresponding to one-third of the 1—$1^{st}$ region L-1, but is not limited thereto. For example, when a sound of the middle-pitched sound band is adjusted to be higher than a sound of the high-pitched sound band, the 1—$1^{st}$ region L-1 may be greater than the 1—$2^{nd}$ region L-2, but is not limited thereto. For example, the 1—$2^{nd}$ region L-2 may have the same area as that of the 1—$1^{st}$ region L-1. The first sound generating device 1900 of the 1—$1^{st}$ region L-1 may output a sound of the middle-pitched sound band, and the second sound generating device 1902 of the 1—$2^{nd}$ region L-2 may output a sound of the high-pitched sound band. For example, the second sound generating device 1902 of the 1—$2^{nd}$ region L-2 may output a high-pitched sound based on a surround algorithm. For example, the second sound generating device 1902 of the 1—$2^{nd}$ region L-2 may output a surround sound to which a sound field effect algorithm for increasing a sense of space of a sound is applied.

The second region R may be divided into a 2—1$^{st}$ region R-1 and a 2—2$^{nd}$ region R-2, a third sound generating device 1903 may be in the 2—1$^{st}$ region R-1, and a fourth sound generating device 1904 may be in the 2—2$^{nd}$ region R-2. The 2-1st region R-1 may be greater than the 2—2$^{nd}$ region R-2, but is not limited thereto. The third sound generating device 1903 of the 2—1$^{st}$ region R-1 may output a sound of the middle-pitched sound band, and the fourth sound generating device 1904 of the 2—2$^{nd}$ region R-2 may output a sound of the high-pitched sound band. For example, the fourth sound generating device 1904 of the 2—2$^{nd}$ region R-2 may output a sound of the high-pitched sound band based on the surround algorithm. For example, the fourth sound generating device 1904 of the 2—2$^{nd}$ region R-2 may output a surround sound to which a sound field effect algorithm for increasing a sense of space of a sound is applied.

The first sound generating device 1901, the second sound generating device 1902, the third sound generating device 1903, and the fourth sound generating device 1904 may be provided as sound generating devices having the same structure. For example, the first sound generating device 1901, the second sound generating device 1902, the third sound generating device 1903, and the fourth sound generating device 1904 may be configured with two sound generating devices described above with reference to FIG. 9B. When the first sound generating device 1901 and the second sound generating device 1902 is configured with two sound generating devices and the third sound generating device 1903 and the fourth sound generating device 1904 is configured with six sound generating devices, the first region L and the second region R may output sounds of different sound bands, and due to this, it may be difficult to output a clean sound.

A fifth sound generating device 1920 may be in a third region C. The fifth sound generating device 1920 may be configured as the sound generating device described above with reference to FIG. 9A. For example, the fifth sound generating device 1920 may be configured with one sound generating device. The fifth sound generating device 1920 may output a sound of the middle-low sound band in the third region C. For example, the fifth sound generating device 1920 may output sound corresponding to a range of about 100 Hz to about 10 kHz, but a range is not limited thereto.

Figure 17B:
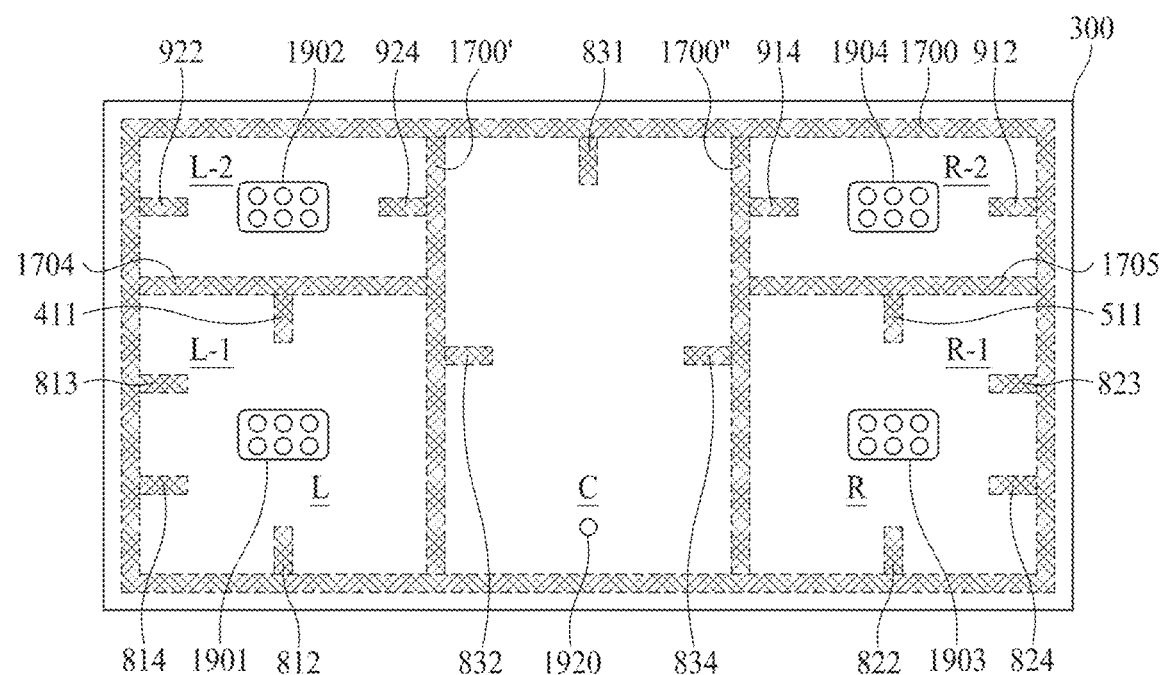

With reference to FIGS. 17A and 17B, the fourth partition 1704 may be between the 1—1$^{st}$ region L-1 and the 1—2$^{nd}$ region L-2 of the first region L. At least one pad may be on at least one side of a first partition 1700 in the 1—1$^{st}$ region L-1. For example, at least one second pad 812 may be on a first side of the first partition 1700, and at least one third pad 813 and at least one fourth pad 814 may be on a second side vertical to the first side of the first partition 1700. As another example, one of the at least one third pad 813 and the at least one fourth pad 814 may be provided. For example, the at least one second pad 812, the at least one third pad 813, or the at least one fourth pad 814 may be disposed to face the first sound generating device 1901.

At least one thirteenth pad 411 may be on at least one side of the fourth partition 1704. For example, the at least one thirteenth pad 411 may be disposed to face the first sound generating device 1901. The at least one thirteenth pad 411 may be disposed to face the at least one second pad 812, but embodiments are not limited thereto.

At least one pad may be on at least one side of the first partition 1700 and a second partition 1700' in the 1—2$^{nd}$ region L-2. For example, at least one fourteenth pad 922 may be on the second side of the first partition 1700. At least one fifteenth pad 924 may be on one side of the second partition 1700'. The at least one fourteenth pad 922 and the at least one fifteenth pad 924 may be disposed to face the second sound generating device 1902. Also, the at least one fourteenth pad 922 and the at least one fifteenth pad 924 may be disposed symmetrically with respect to the second sound generating device 1902, but embodiments are not limited thereto. For example, the at least one fourteenth pad 922 and the at least one fifteenth pad 924 may be on the same plane or line with respect to the second sound generating device 1902.

The fifth partition 1705 may be between the 2—1$^{st}$ region R-1 and the 2—2$^{nd}$ region R-2 of the second region R. At least one pad may be on at least one side of the first partition 1700 in the 2—1$^{st}$ region R-1. For example, at least one eighth pad 822 may be on the first side of the first partition 1700, and at least one ninth pad 823 and at least one tenth pad 824 may be on the second side vertical to the first side of the first partition 1700. For example, the at least one eighth pad 822, the at least one ninth pad 823, or the at least one tenth pad 824 may be disposed to face the third sound generating device 1903.

At least one sixteenth pad 511 may be on at least one side of the fifth partition 1705. For example, the at least one sixteenth pad 511 may be disposed to face the third sound generating device 1903. The at least one sixteenth pad 511 may be disposed to face the at least one eighth pad 822, but embodiments are not limited thereto.

At least one pad may be on at least one side of the first partition 1700 and a third partition 1700" in the 2—2$^{nd}$ region R-2. For example, at least one seventeenth pad 912 may be on the second side of the first partition 1700. At least one eighteenth pad 914 may be on one side of the third partition 1700". The at least one seventeenth pad 912 and the at least one eighteenth pad 914 may be disposed to face the fourth sound generating device 1904. Also, the at least one seventeenth pad 912 and the at least one eighteenth pad 914 may be disposed symmetrically with respect to the fourth sound generating device 1904, but embodiments are not limited thereto. For example, the at least one seventeenth pad 912 and the at least one eighteenth pad 914 may be on the same plane or line with respect to the fourth sound generating device 1904.

The fourth partition 1704 and the fifth partition 1705 may be formed of the same material as that of the first partition 1700. When the fourth partition 1704 and the fifth partition 1705 are formed of the same material, an adhesive force may be enhanced in a process of attaching a supporting member to the display panel 100. For example, the fourth partition 1704 and the fifth partition 1705 may be formed of the same material as that of the first partition 700, the second partition 1700', and the third partition 1700". The fourth partition 1704 and the fifth partition 1705 may be formed of one of a double-sided tape, a double-sided foam pad, a single-sided tape, a single-sided foam pad, an adhesive, and/or a bond, but is not limited thereto. For example, the fourth partition 1704 and the fifth partition 1705 may include a foam material which absorbs an impact when contacting the display panel 100. When the double-sided tape or the single-sided tape does not include the foam material, it may be seen that an undesired abnormal sound occurs due to contacting the display panel 100. The fourth partition 1704 and the fifth partition 1705 may be formed of a material having an elastic force which enables compression to be made to a certain degree, and for example, may be formed of polyurethane, polyolefin, polyethylene, and/or the like, but are not limited thereto.

With reference to FIG. 17B, the first sound generating device 1901, the second sound generating device 1902, the third sound generating device 1903, and the fourth sound generating device 1904 may be configured with six sound generating devices described above with reference to FIG. 9D. Descriptions relevant thereto are the same as descriptions given above with reference to FIG. 17A, and thus, may be omitted. Descriptions of a member and a pad are the same as or similar to descriptions given above with reference to FIGS. 13A to 16B, and thus, may be omitted.

With reference to FIGS. 17A and 17B, the first and second sound generating devices of the first region L, the third and fourth sound generating devices of the second region R, and the fifth sound generating device of the third region C may be disposed asymmetrically. For example, in FIG. 17A, the first and second sound generating devices 1901 and 1902 of the first region L and the third and fourth sound generating devices 1903 and 1904 of the second region R may be disposed on a line differing from the fifth sound generating device 1920 of the third region C. The first and second sound generating devices 1901 and 1902 of the first region L and the third and fourth sound generating devices 1903 and 1904 of the second region R may be disposed symmetrically, and the fifth sound generating device 1920 of the third region C may be disposed asymmetrically with the first and second sound generating devices 1901 and 1902 of the first region L and the third and fourth sound generating devices 1903 and 1904 of the second region R. The fifth sound generating device 1920 of the third region C may be disposed at a position which is lower than the first and second sound generating devices 1901 and 1902 of the first region L and the third and fourth sound generating devices 1903 and 1904 of the second region R.

Figure 17C:
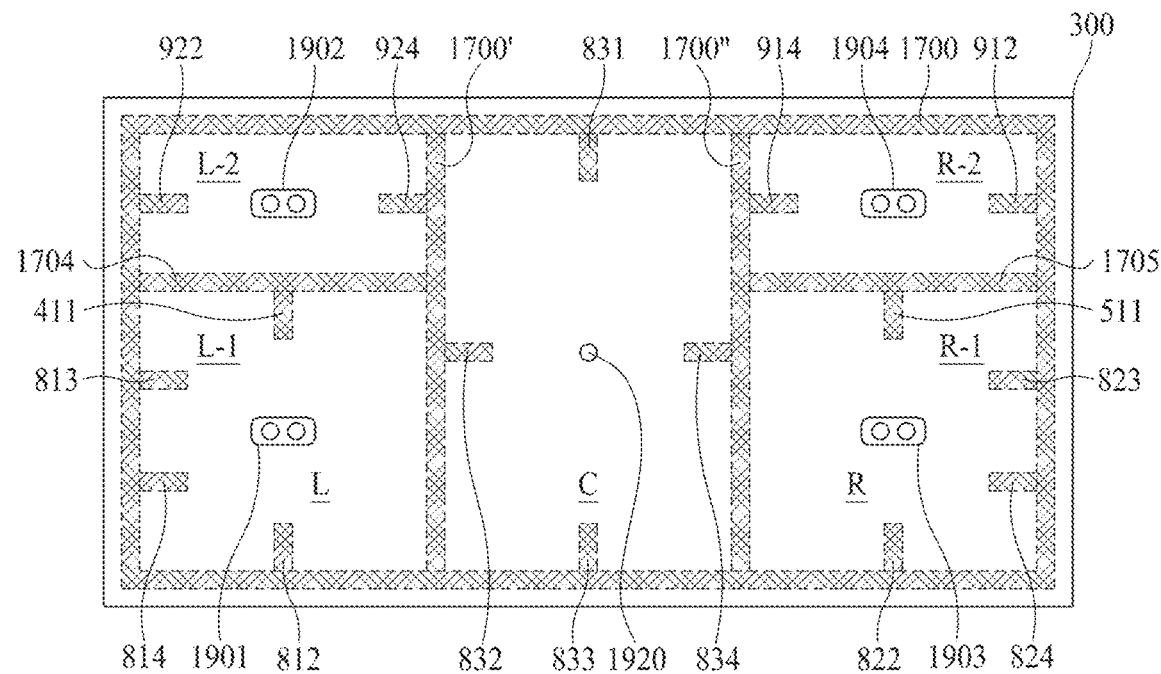
Figure 17D:
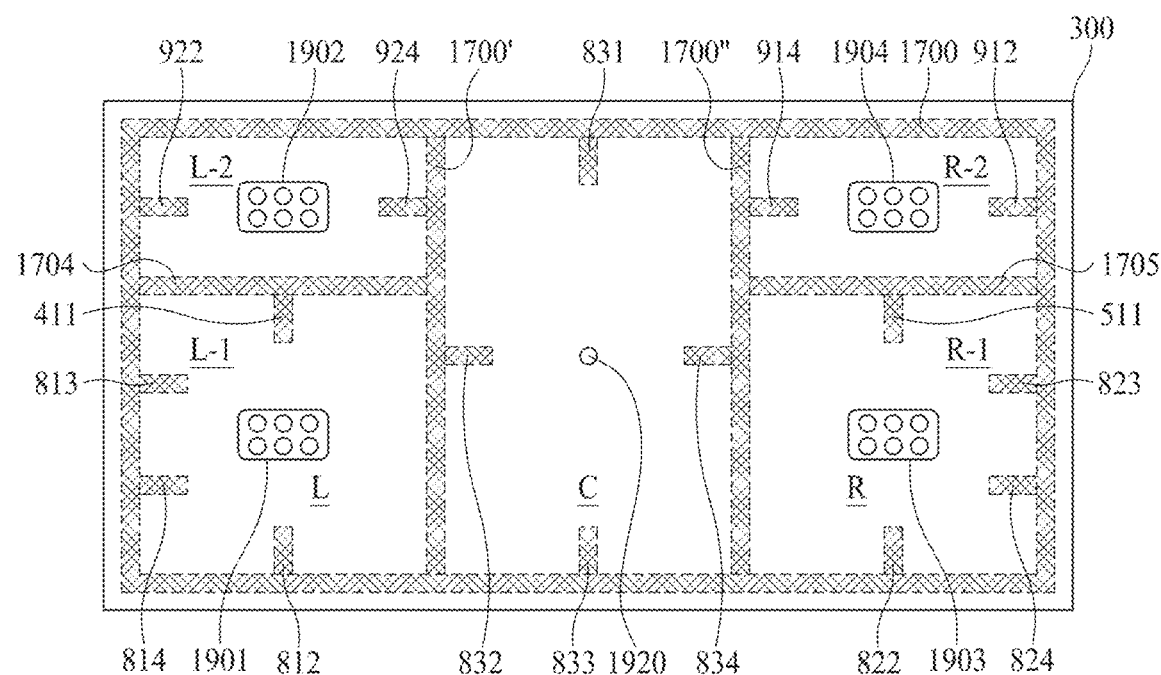

FIGS. 17C and 17D are similar to descriptions given above with reference to FIGS. 15A, 15B, 17A, and 17B, and thus, detailed descriptions may be omitted. With reference to FIGS. 17C and 17D, a fourth member 833 may be on the first side of the first partition 1700. For example, the fourth member 833 may be disposed to face the third sound generating device 1920. The first member 831 may be disposed to face the fourth member 833. The first member 831, the second member 832, the third member 834, and the fourth member 833 may decrease or prevent the transfer of a vibration(s), generated by the first region L and/or the second region R, to the third region C, thereby providing a display apparatus for realizing a sharp or clean or refined sound. The first member 831 and the fourth member 833 may decrease a peak or a dip caused by a standing wave which occurs in a lengthwise direction of a sound generating device, and thus, may be referred to as a pad.

With reference to FIGS. 17C and 17D, the first and second sound generating devices 1901 and 1902 of the first region L, the third and fourth sound generating devices 1903 and 1904 of the second region R, and the fifth sound generating device 1920 of the third region C may be disposed symmetrically. For example, in FIG. 17C, the first and second sound generating devices 1901 and 1902 of the first region L and the third and fourth sound generating devices 1903 and 1904 of the second region R may be on the same line as the fifth sound generating device 1920 of the third region C. For example, heights of sound sources which generate sounds may become equal or similar, and thus, when reproducing a stereo sound which expresses a position of a sound based on a difference between left and right sounds, sound image localization where a sound image is realized at a normal position may be enhanced.

Therefore, the first sound generating device 1901 and the third sound generating device 1903 may output sounds of different middle-pitched sound bands, and the second sound generating device 1902 and the fourth sound generating device 1904 may output sounds of different high-pitched sound bands, and the fifth sound generating device 1920 may output a sound of the middle-low-pitched sound band. Accordingly, a display apparatus having a five-channel sound output characteristic may be provided.

FIGS. 18A to 18D illustrate a sound generating device and a partition according to an embodiment of the present disclosure.

In FIGS. 18A to 18D, the same descriptions as descriptions given above with reference to FIGS. 11A to 11D and 17A to 17D may be omitted or may be briefly given below. For example, descriptions of a sound generating device, a partition, and a pad may be omitted or may be briefly given below.

Figure 18A:
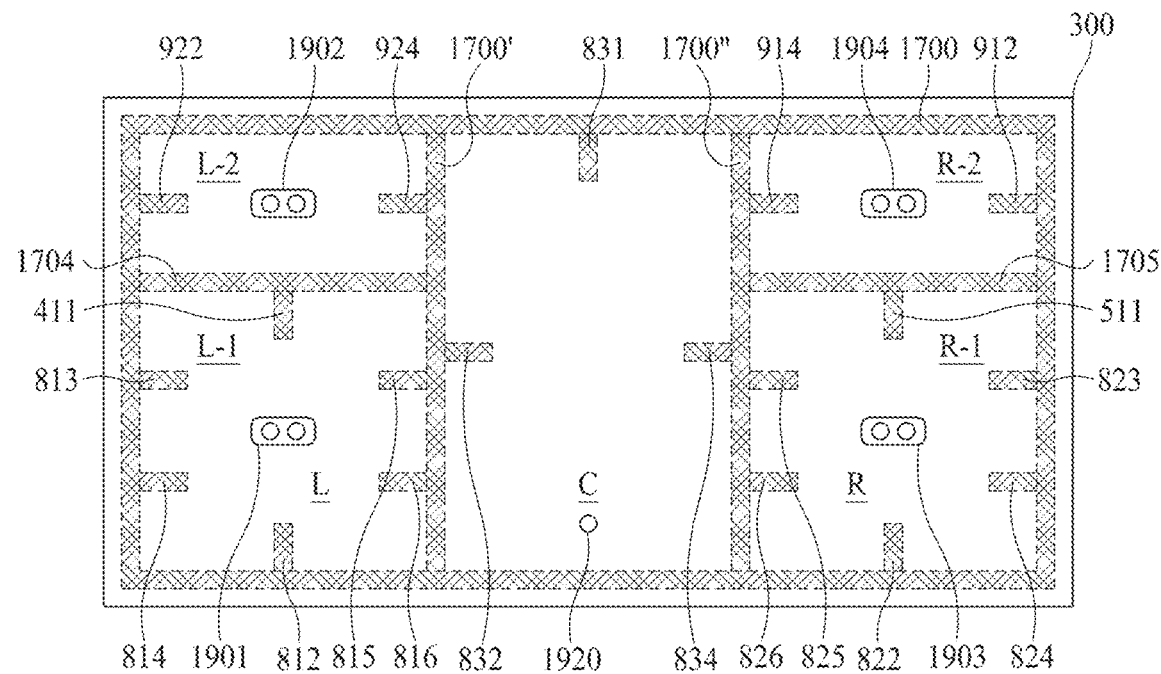
FIGS. 18A to 18D illustrate a sound generating device and a partition according to an embodiment of the present disclosure.
Figure 18B:
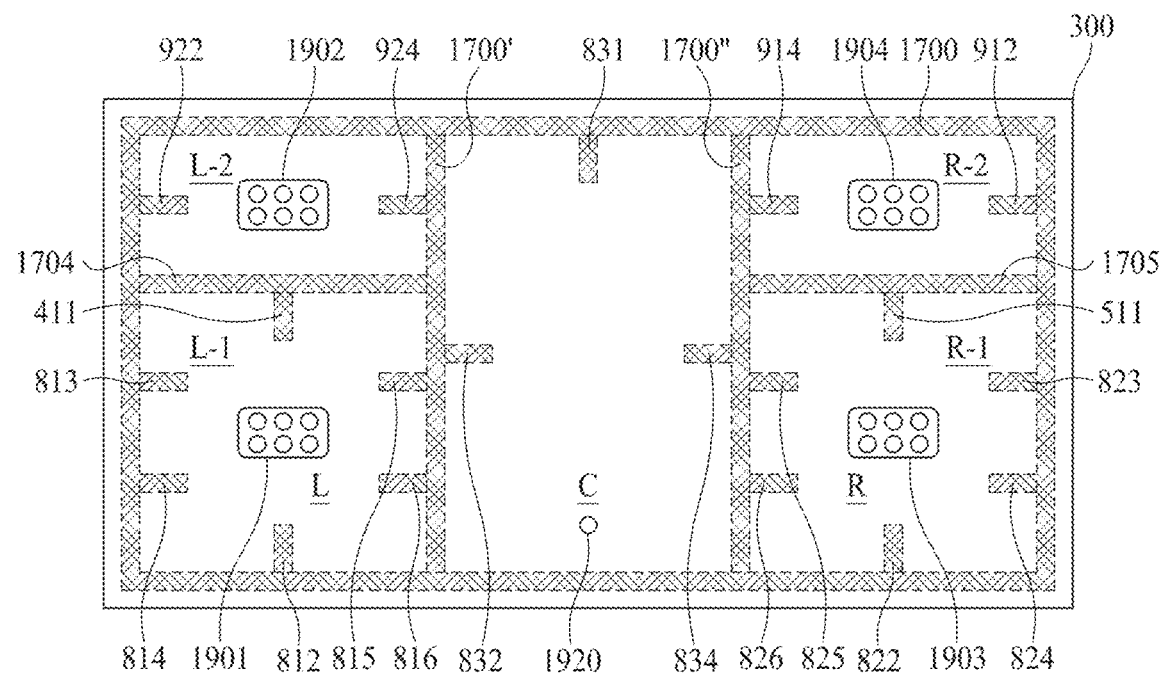
Figure 18C:
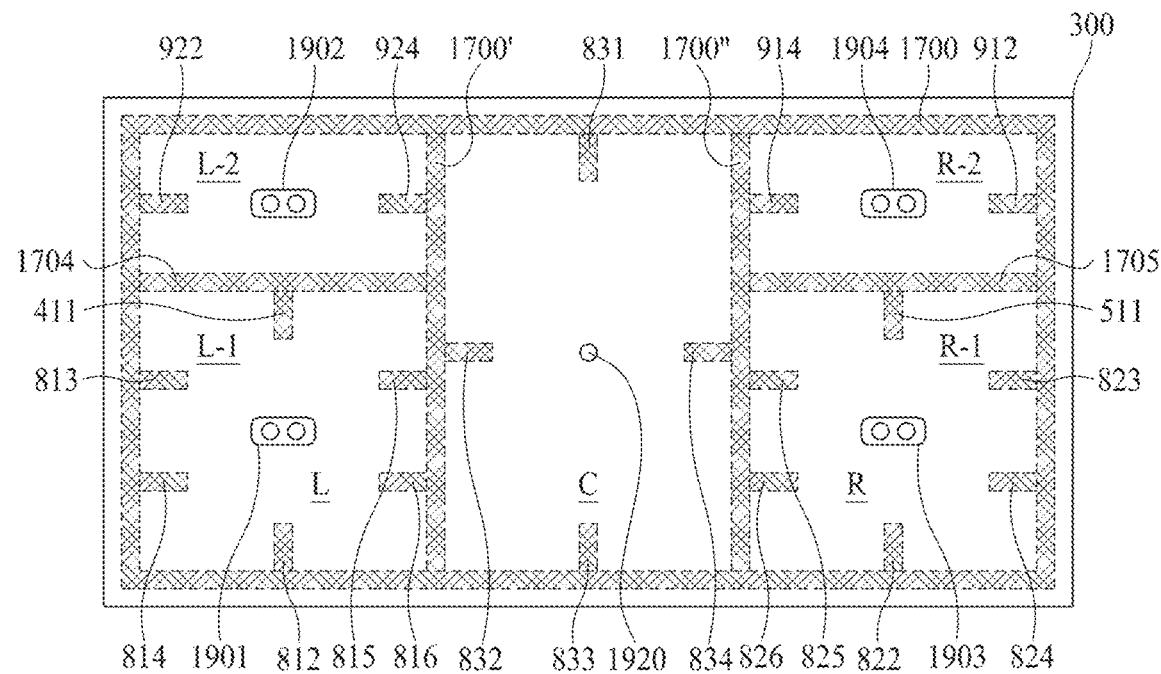
Figure 18D:
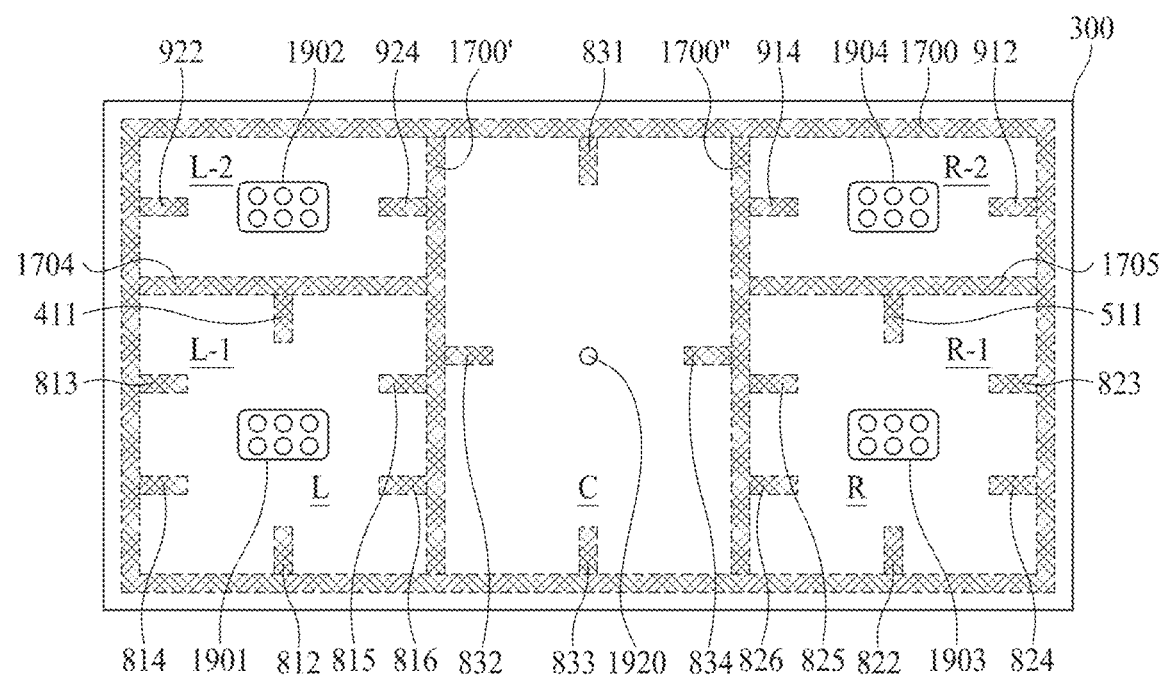

With reference to FIG. 18A, at least one fifth pad 815, sixth pad 816, eleventh pad 825, and twelfth pad 826 may be further provided on a side facing the second side of the first partition 1700. For example, the at least one fifth pad 815 and the at least one sixth pad 816 may be in a side, facing the second side of the first partition 1700 of a first region L, and the at least one fifth pad 815 and the at least one sixth pad 816 may be on at least one side of a second partition 1700'. As another example, one of the at least one fifth pad 815 and the at least one sixth pad 816 may be provided. For example, the at least one eleventh pad 825 and the at least one twelfth pad 826 may be on a side, facing the second side of the first partition 1700 of a second region R, and the at least one eleventh pad 825 and the at least one twelfth pad 826 may be on at least one side of the third partition 1700". As another example, one of the at least one eleventh pad 825 and the at least one twelfth pad 826 may be provided. The fifth pad 815 and the sixth pad 816 may be provided to face the third pad 813 and the fourth pad 814. For example, the fifth pad 815 and the sixth pad 816 may be disposed to be symmetrical with respect to a first sound generating device 1901. The eleventh pad 825 and the twelfth pad 826 may be provided to face the ninth pad 823 and the tenth pad 824. For example, the eleventh pad 825 and the twelfth pad 826 may be disposed to be symmetrical with respect to a third sound generating device 1903.

The at least one fifth pad 815 or the at least one sixth pad 816 may be formed of the same material as that of the first partition 1700. For example, the at least one fifth pad 815 or the at least one sixth pad 816 may be formed of one of a double-sided tape, a double-sided foam pad, a single-sided tape, a single-sided foam pad, an adhesive, and/or a bond, but is not limited thereto. As another example, the at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one eleventh pad 825 or the at least one twelfth pad 826 may be formed of the same material as that of the first partition 1700. For example, the at least one eleventh pad 825 or the at least one twelfth pad 826 may be formed of one of a double-sided tape, a double-sided foam pad, a single-sided tape, a single-sided foam pad, an adhesive, and/or a bond, but is not limited thereto. As another example, the at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700".

Therefore, the first sound generating device 1901 and the third sound generating device 1903 may output sounds of different middle-pitched sound bands, and the second sound generating device 1902 and the fourth sound generating device 1904 may output sounds of different high-pitched sound bands, and the fifth sound generating device 1920 may output a sound of the middle-low-pitched sound band. Accordingly, a display apparatus having a five-channel sound output characteristic may be provided.

Figure 19:
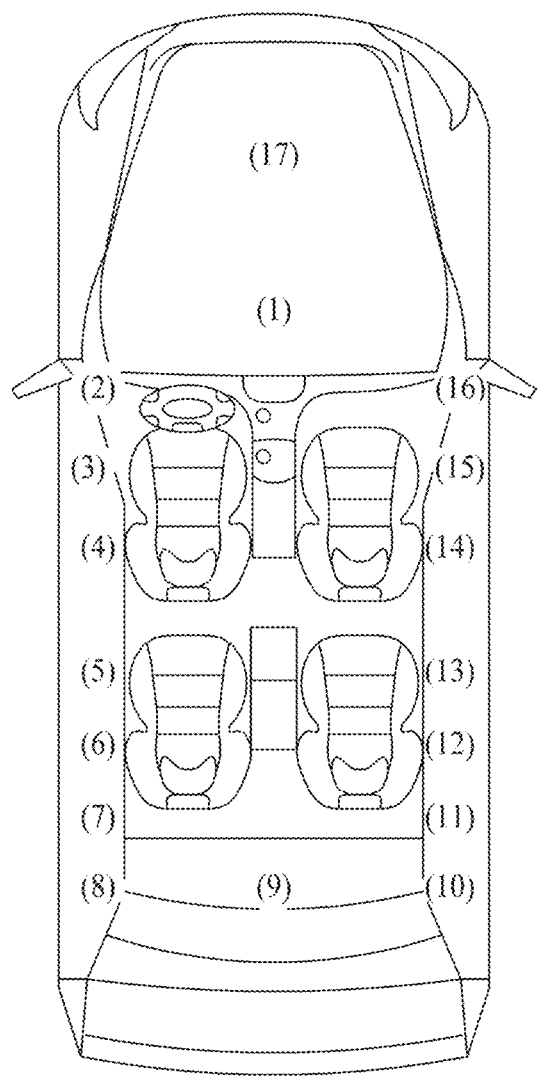
FIG. 19 illustrates an automotive apparatus according to an embodiment of the present disclosure.

FIG. 19 illustrates an automotive apparatus according to an embodiment of the present disclosure.

In the present disclosure, the display panel may be applied to vehicles as a user interface module such as a central control panel for automobiles. For example, the display panel may be between occupants sitting on two front seats in order for a vibration of the display panel to be transferred to the inside of a vehicle, but embodiments are not limited thereto. Therefore, an audio experience in a vehicle is improved in comparison with a case where speakers are disposed on interior sides of the vehicle.

With reference to FIG. 19, an automotive apparatus to which a sound generating device or a display apparatus is applied is illustrated as an example. Since an echo or reverberation is severe inside of vehicles and a number of flections or bending on which sound waves bump are in vehicles, it is difficult to output a desired sound. Therefore, when a sound generating device or a display apparatus according to an embodiment of the present disclosure is provided in a vehicle or a vehicle body, the sound generating device or the display apparatus may be implemented to have a small area compared to a general speaker installed in a vehicle, and an automotive apparatus including a sound generating device or a display apparatus outputting an enhanced sound may be implemented. In FIG. 19, (1) to (17) represent portions where a sound generating device or a display apparatus is provided in a vehicle or a vehicle body, but embodiments are not limited thereto.

With respect to a driver seat, a sound generating device implemented along with a display apparatus may be provided in front of the driver seat and a sound generating device with no display apparatus may be provided behind the driver seat, but the present embodiment is not limited thereto. As another example, with respect to two front seats, a sound generating device implemented along with a display apparatus may be provided in front of the two front seats and a sound generating device with no display apparatus may be provided behind the two front seats, but the present embodiment is not limited thereto. For example, a portion implemented along with a display apparatus may be implemented along with elements embedded into a vehicle or a display apparatus. For example, in FIG. 19, a sound generating device may be implemented along with a display apparatus in (1). The sound generating device disposed in (1) may be a tweeter or a center speaker, but is not limited thereto. The sound generating device disposed in (1) may output a sound of 150 Hz to 20 kHz, but is not limited thereto. A sound generating device disposed in (17) may output a sound of 150 Hz to 20 kHz within a mid-range or a full-range, but is not limited thereto. Also, a sound generating device may be disposed in all of (1) to (17). As another example, a sound generating device may be disposed in one of (1) to (17).

(2) to (4) and (14) to (16) may be a sound generating device disposed in a front door. As another example, a display apparatus including a sound generating device or a display apparatus may be disposed in (2) to (4) and (14) to (16). A sound generating device disposed in (2) and (16) may be a speaker corresponding to the mid-range, but is not limited thereto. The sound generating device disposed in (2) and (16) may output a sound of 150 Hz to 20 kHz within the mid-range, but is not limited thereto. A sound generating device disposed in (3) and (15) may be a tweeter, but is not limited thereto. The sound generating device disposed in (3) and (15) may output a sound of 2 kHz to 20 kHz, but is not limited thereto. The sounds output from the sound generating devices respectively disposed in (2), (16), (3), and (15) may be combined and output. A sound generating device disposed in (4) and (14) may be one of a speaker, a woofer, a mid-woofer, and a sub-woofer corresponding to the full-range, but is not limited thereto. The sound generating device disposed in (4) and (14) may output a sound of 150 Hz to 20 kHz within the full-range, but is not limited thereto. One of (2) to (4) and (14) to (16) may be provided. For example, a sound generating device may be disposed in (3), (4), (14), and (15).

(5) to (7) and (11) to (13) may be a sound generating device disposed in a rear door. As another example, a display apparatus including a sound generating device or a display apparatus may be disposed in (5) to (7) and (11) to (13). A sound generating device disposed in (5) and (13) may be a speaker corresponding to the mid-range, but is not limited thereto. A sound generating device disposed in (5) and (13) may be a tweeter, but is not limited thereto. The sound generating device disposed in (5) and (13) may output a sound of 150 Hz to 20 kHz within the full-range, but is not limited thereto. A sound generating device disposed in (6) and (12) may be a speaker corresponding to the full-range or a speaker corresponding to the mid-range, but is not limited thereto. The sound generating device disposed in (6) and (12) may output a sound of 150 Hz to 20 kHz within the full-range or the mid-range, but is not limited thereto. A sound generating device disposed in (7) and (11) may be one of a speaker, a woofer, a mid-woofer, and a sub-woofer corresponding to the full-range, but is not limited thereto. The sound generating device disposed in (7) and (11) may output a sound of 150 Hz to 20 kHz within the full-range, but is not limited thereto. One or more of (5) to (7) and (11) to (13) may be provided. For example, a sound generating device may be disposed in (5), (7), (11), and (13).

(8) to (10) may be a sound generating device disposed in a rear deck. As another example, a display apparatus including a sound generating device or a display apparatus may be disposed in (8) to (10). A sound generating device disposed in (8) and (10) may be one of a speaker corresponding to the full-range and a speaker corresponding to the mid-range, but is not limited thereto. The sound generating device disposed in (8) and (10) may output a sound of 150 Hz to 20 kHz within the full-range or the mid-range, but is not limited thereto. The sound generating device disposed in (8) and (10) may be configured with a sound generating device for outputting a surround sound of the full-range or the mid-range. A sound generating device disposed in (9) may output a sound of 60 Hz to 150 Hz, but is not limited thereto. As another example, the sound generating device disposed in (9) may be configured with one or more tweeters instead of one of a woofer and a sub-woofer. As another example, the sound generating device disposed in (9) may be configured with one of a woofer and a sub-woofer or one or more tweeters. Therefore, a sound generating device disposed in a vehicle body may be implemented to output one or more of a sound of 150 Hz to 20 kHz, a sound of 2 kHz to 20 kHz, and a sound of 60 Hz to 150 Hz.

With respect to a driver seat or two front seats, (2) to (4) and (14) to (16) may be referred to as a left side and a right side, and a sound generating device disposed in a left side and a sound generating device disposed in a right side may be configured to be symmetrical. As another example, a display apparatus including a sound generating device disposed in a left side and a sound generating device disposed in a right side may be configured to be symmetrical. For example, a frequency output from a sound generating device disposed in a left side with respect to the driver seat or the two front seats may be one or more of 150 Hz to 20 kHz and 2 kHz to 20 kHz, and a frequency output from a sound generating device disposed in a right side with respect to the driver seat or the two front seats may be one or more of 150 Hz to 20 kHz and 2 kHz to 20 kHz. In this case, the sound image localization of a sound output from a left side and a right side may be enhanced. For example, (2) to (4) and (14) to (16) may be implemented by applying the sound generating device illustrated in FIGS. 2, 5, 6, 8A to 8D, and 9A to 9D. (1) and (17) may be implemented by applying the sound generating device illustrated in FIGS. 2, 5, 6, 8A to 8D, and 9A to 9D. (1) to (17) may be implemented by applying the display apparatus illustrated in FIGS. 2, 5, 6, 8A to 8D, and 10A to 18D.

A sound generating device according to an embodiment of the present disclosure may be applied as a sound generating device in a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the sound generating device according to an embodiment of the present disclosure may be applied to organic light emitting lighting apparatuses or inorganic light emitting lighting apparatuses. When the sound generating device is applied to a lighting apparatus, the sound generating device may act as lighting and a speaker.

A display apparatus and an automotive apparatus according to an embodiment of the present disclosure will be described below.

According to an embodiment of the present disclosure, a display apparatus includes a display panel configured to display an image, a supporting member configured to support the display panel, at least one sound generating device in the display panel, the at least one sound generating device being configured to vibrate the display panel to generate sound, and a connection member at a lower portion of the supporting member, the connection member being disposed to correspond to a center of the at least one sound generating device.

For example, in a display apparatus according to an embodiment of the present disclosure, the connection member may be disposed to correspond to a vibration axis of the display panel.

For example, in a display apparatus according to an embodiment of the present disclosure, a center axis of the at least one sound generating device may correspond to a vibration axis of the display panel.

For example, in a display apparatus according to an embodiment of the present disclosure, the at least one sound generating device may include a plate, a magnet and a center pole on the plate, a bobbin around the center pole, a frame outside the plate, and a damper between the frame and the bobbin.

For example, in a display apparatus according to an embodiment of the present disclosure, the connection member may be between the plate and the supporting member.

For example, in a display apparatus according to an embodiment of the present disclosure, the connection member may correspond to a center of the center pole.

For example, in a display apparatus according to an embodiment of the present disclosure, wherein a portion of the supporting member at which the connection member is disposed may be within a range which is less than or equal to a size of the center pole.

For example, in a display apparatus according to an embodiment of the present disclosure, the connection member may pass through a lower portion of the supporting member and may extend to an inner portion of the plate.

For example, in a display apparatus according to an embodiment of the present disclosure, the damper may be a line that applies a sound signal to the at least one sound generating device.

For example, in a display apparatus according to an embodiment of the present disclosure, the damper may include a first damper to which positive power is applied, and a second damper to which negative power is applied For example, in a display apparatus according to an embodiment of the present disclosure, a shape of the damper may be provided as a zigzag shape which has a constant thickness and width.

For example, a display apparatus according to an embodiment of the present disclosure may further include a cover at an upper surface and a side surface of the display panel and a pad between a lower surface of the cover and the upper surface of the display panel.

According to an embodiment of the present disclosure, a display apparatus includes a display panel configured to display an image and including a first region, a second region, and a third region, a supporting member configured to support the display panel, at least one sound generating device in the display panel and at least one of the first region, the second region, and the third region, a connection member between the supporting member and the at least one sound generating device, a first partition between the display panel and the supporting member, the first partition including a first side and a second side vertical to the first side, a second partition between the first region and the third region, and a third partition between the second region and the third region.

For example, in a display apparatus according to an embodiment of the present disclosure, the connection member may be disposed to correspond to a center axis of the at least one sound generating device.

For example, in a display apparatus according to an embodiment of the present disclosure, a center axis of the at least one sound generating device may correspond to a vibration axis of the display panel.

For example, in a display apparatus according to an embodiment of the present disclosure, the at least one sound generating device may include a plate, a magnet and a center pole on the plate, a bobbin around the center pole, a frame outside the plate, and a damper between the frame and the bobbin.

For example, in a display apparatus according to an embodiment of the present disclosure, the connection member may be between the plate and the supporting member.

For example, in a display apparatus according to an embodiment of the present disclosure, the connection member may be disposed to correspond to a center of the magnet and the center pole.

For example, in a display apparatus according to an embodiment of the present disclosure, the connection member may pass through a lower portion of the supporting member and may extend to an inner portion of the plate.

For example, a display apparatus according to an embodiment of the present disclosure may further include a cover on an upper surface and a side surface of the display panel and a pad between a lower surface of the cover and the upper surface of the display panel.

For example, in a display apparatus according to an embodiment of the present disclosure, the at least one sound generating device may include one or more of a pair of sound generating devices, an oval sound generating device, a circular sound generating device, a single type sound generating device, and a two or more-device array sound generating device.

For example, in a display apparatus according to an embodiment of the present disclosure, the at least one sound generating device may be in each of the first region and the second region.

For example, a display apparatus according to an embodiment of the present disclosure may further include at least one first pad in the first region, the at least one first pad being at the first side, at least one second pad at a side facing the at least one first pad, and at least one third pad or at least one fourth pad at the second side.

For example, a display apparatus according to an embodiment of the present disclosure may further include at least one fifth pad or at least one sixth pad in the first region, the at least one fifth pad or at least one sixth pad being at at least one side of the second partition.

For example, a display apparatus according to an embodiment of the present disclosure may further include at least one seventh pad in the second region, the at least one seventh pad being at the first side, at least one eighth pad at a side facing the at least one seventh pad, and at least one ninth pad or at least one tenth pad at the second side.

For example, a display apparatus according to an embodiment of the present disclosure may further include at least one eleventh pad or at least one twelfth pad in the second region, the at least one eleventh pad or at least one twelfth pad being at at least one side of the third partition.

For example, in a display apparatus according to an embodiment of the present disclosure, a sound generating device in the first region and a sound generating device in the second region may be configured to vibrate the display panel to output a sound of a middle-high-pitched sound band.

For example, in a display apparatus according to an embodiment of the present disclosure, the at least one sound generating device may be in each of the first region, the second region, and the third region.

For example, in a display apparatus according to an embodiment the present disclosure, the first region, the second region, and the third region may have the same area.

For example, a display apparatus according to an embodiment of the present disclosure may further include at least one first pad in the first region, the at least one first pad being at the first side, at least one second pad at a side facing the at least one first pad, and at least one third pad or at least one fourth pad at the second side.

For example, a display apparatus according to an embodiment of the present disclosure may further include at least one fifth pad or at least one sixth pad in the first region, the at least one fifth pad or at least one sixth pad being at at least one side of the second partition.

For example, a display apparatus according to an embodiment of the present disclosure may further include at least one seventh pad in the second region, the at least one seventh pad being at the first side, at least one eighth pad at a side facing the at least one seventh pad, and at least one ninth pad or at least one tenth pad at the second side.

For example, a display apparatus according to an embodiment of the present disclosure may further include at least one eleventh pad or at least one twelfth pad in the second region, the at least one eleventh pad or at least one twelfth pad being at at least one side of the third partition.

For example, a display apparatus according to an embodiment of the present disclosure may further include at least one first member in the third region, the at least one first member being at the first side, at least one second member at at least one side of the second partition, and at least one third member at at least one side of the third partition.

For example, a display apparatus according to an embodiment of the present disclosure may further include at least one first member in the third region, the at least one first member being at the first side, at least one second member at at least one side of the second partition, at least one third member at at least one side of the third partition, and at least one fourth member at a side facing the at least one first member.

For example, in a display apparatus according to an embodiment of the present disclosure, a sound generating device in the first region and a sound generating device in the second region may be configured to vibrate the display panel to output a middle-high-pitched sound band, and a sound generating device in the third region may be configured to vibrate the display panel to output a sound of a middle-low-pitched sound band.

For example, in a display apparatus according to an embodiment of the present disclosure, a sound generating device in the first region, a sound generating device in the second region, and a sound generating device in the third region may be on the same line.

For example, in a display apparatus according to an embodiment of the present disclosure, the first region may include a 1—$1^{st}$ region and a 1—$2^{nd}$ region, and the second region may include a 2—$1^{st}$ region and a 2—$2^{nd}$ region.

For example, a display apparatus according to an embodiment of the present disclosure may further include a fourth partition between the 1—$1^{st}$ region and the 1-$2^{bd}$ region and a fifth partition between the 2—$1^{st}$ region and the 2—$2^{nd}$ region.

For example, a display apparatus according to an embodiment of the present disclosure may further include at least one second pad in the 1—$1^{st}$ region, the at least one second pad being at the first side, at least one third pad or at least one fourth pad at the second side, at least one thirteenth pad at at least one side of the fourth partition, at least one fourteenth pad in the 1—$2^{nd}$ region, the at least one fourteenth pad being at the second side of the first partition, and at least one fifteenth pad at at least one side of the second partition.

For example, a display apparatus according to an embodiment of the present disclosure may further include at least one fifth pad or at least one sixth pad in the 1—$1^{st}$ region, the at least one fifth pad or at least one sixth pad being at at least one side of the second partition.

For example, a display apparatus according to an embodiment of the present disclosure may further include at least one eighth pad in the 2—$1^{st}$ region, the at least one eighth pad being at the first side, at least one ninth pad or at least one tenth pad at the second side, at least one sixteenth pad at at least one side of the fifth partition, at least one seventeenth pad in the 2—$2^{nd}$ region, the at least one seventeenth pad being at the second side, and at least one eighteenth pad at at least one side of the third partition.

For example, a display apparatus according to an embodiment of the present disclosure may further include at least one eleventh pad or at least one twelfth pad in the 2—$1^{st}$ region, the at least one eleventh pad or at least one twelfth pad being at at least one side of the third partition.

For example, a display apparatus according to an embodiment of the present disclosure may further include at least one first member in the third region, the at least one first member being at the first side, at least one second member at at least one side of the second partition, and at least one third member at at least one side of the third partition.

For example, a display apparatus according to an embodiment of the present disclosure may further include at least one first member in the third region, the at least one first member being at the first side, at least one second member at at least one side of the second partition, at least one third member at at least one side of the third partition, and at least one fourth member at a side facing the at least one first member.

For example, in a display apparatus according to an embodiment of the present disclosure, a sound generating device in the 1—$1^{st}$ region and a sound generating device in the 1—$2^{nd}$ region may include a sound generating device having the same structure, and a sound generating device in the 2—$1^{st}$ region and a sound generating device in the 2—$2^{nd}$ region may include a sound generating device having the same structure.

For example, in a display apparatus according to an embodiment of the present disclosure, a sound generating device in the 1—$1^{st}$ region and a sound generating device disposed in the 2—$1^{st}$ region may be configured to vibrate the display panel to output a middle-pitched sound band, a sound generating device in the 1—$2^{nd}$ region and a sound generating device in the 2—$2^{nd}$ region may be configured to vibrate the display panel to output a sound of a high-pitched sound band, and a sound generating device in the third region may be configured to vibrate the display panel to output a sound of a middle-low-pitched sound band.

According to an embodiment of the present disclosure, an automotive apparatus includes a vehicle body and a display apparatus or a sound generating device in the vehicle body.

For example, in an automotive apparatus according to an embodiment of the present disclosure, a sound generating device in a left side and a sound generating device in a right side may be symmetrical with respect to a driver seat or two front seats of the vehicle body.

For example, in an automotive apparatus according to an embodiment of the present disclosure, the sound generating device in the vehicle body may output a sound of one or more of 150 Hz to 20 kHz, 2 kHz to 20 kHz, and 60 Hz to 150 Hz.

It will be apparent to those skilled in the art that various modifications and variations may be made in the display apparatus and the automotive apparatus of the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. A display apparatus, comprising:
   a display panel configured to display an image, the display device including:
     a first region;
     a second region; and
     a third region;
   a supporting member configured to support the display panel;
   at least one sound generating device in the display panel and at least one of the first region, the second region, and the third region;
   a connection member between the supporting member and the at least one sound generating device;
   a first partition between the display panel and the supporting member, the first partition including a first side and a second side vertical to the first side;
   a second partition between the first region and the third region; and
   a third partition between the second region and the third region;
   at least one first pad in the first region, the at least one first pad being at the first side;
   at least one second pad at a side facing the at least one first pad; and
   at least one third pad or at least one fourth pad at the second side,
   wherein each of the first pad and the second pad has a same shape and a same area with the third pad or the fourth pad within the first region.

2. The display apparatus of claim 1, wherein the connection member is disposed to correspond to a center axis of the at least one sound generating device.

3. The display apparatus of claim 1, wherein a center axis of the at least one sound generating device corresponds to a vibration axis of the display panel.

4. The display apparatus of claim 1, wherein the at least one sound generating device comprises:
   a plate;
   a magnet and a center pole on the plate;
   a bobbin around the center pole;
   a frame outside the plate; and
   a damper between the frame and the bobbin.

5. The display apparatus of claim 4, wherein the connection member is between the plate and the supporting member.

6. The display apparatus of claim 4, wherein the connection member is disposed to correspond to a center of the magnet and the center pole.

7. The display apparatus of claim 4, wherein the connection member passes through a lower portion of the supporting member and extends to an inner portion of the plate.

8. The display apparatus of claim 1, further comprising:
   a cover on an upper surface and a side surface of the display panel; and
   a pad between a lower surface of the cover and the upper surface of the display panel.

9. The display apparatus of claim 1, wherein the at least one sound generating device comprises one or more of a pair of sound generating devices, an oval sound generating device, a circular sound generating device, a single type sound generating device, and a two or more-device array sound generating device.

10. The display apparatus of claim 1, wherein the at least one sound generating device is in each of the first region and the second region.

11. The display apparatus of claim 1, further comprising at least one fifth pad or at least one sixth pad in the first region, the at least one fifth pad or at least one sixth pad being at at least one side of the second partition.

12. The display apparatus of claim 10, further comprising:
at least one seventh pad in the second region, the at least one seventh pad being at the first side;
at least one eighth pad at a side facing the at least one seventh pad; and
at least one ninth pad or at least one tenth pad at the second side.

13. The display apparatus of claim 12, further comprising at least one eleventh pad or at least one twelfth pad in the second region, the at least one eleventh pad or at least one twelfth pad being at at least one side of the third partition.

14. The display apparatus of claim 10, wherein a sound generating device in the first region and a sound generating device in the second region are configured to vibrate the display panel to output a sound of a middle-high-pitched sound band.

15. The display apparatus of claim 13, wherein the at least one sound generating device is in each of the first region, the second region, and the third region.

16. The display apparatus of claim 15, wherein the first region, the second region, and the third region have the same area.

17. The display apparatus of claim 15, further comprising:
at least one first pad in the first region, the at least one first pad being at the first side;
at least one second pad at a side facing the at least one first pad; and
at least one third pad or at least one fourth pad at the second side.

18. The display apparatus of claim 17, further comprising at least one fifth pad or at least one sixth pad in the first region, the at least one fifth pad or at least one sixth pad being at at least one side of the second partition.

19. The display apparatus of claim 15, further comprising:
at least one seventh pad in the second region, the at least one seventh pad being at the first side;
at least one eighth pad at a side facing the at least one seventh pad; and
at least one ninth pad or at least one tenth pad at the second side.

20. The display apparatus of claim 19, further comprising at least one eleventh pad or at least one twelfth pad in the second region, the at least one eleventh pad or at least one twelfth pad being at at least one side of the third partition.

21. The display apparatus of claim 17, further comprising:
at least one first member in the third region, the at least one first member being at the first side;
at least one second member at at least one side of the second partition; and
at least one third member at at least one side of the third partition.

22. The display apparatus of claim 17, further comprising:
at least one first member in the third region, the at least one first member being at the first side;
at least one second member at at least one side of the second partition;
at least one third member at at least one side of the third partition; and
at least one fourth member at a side facing the at least one first member.

23. The display apparatus of claim 15, wherein:
a sound generating device in the first region and a sound generating device in the second region are configured to vibrate the display panel to output a middle-high-pitched sound band; and
a sound generating device in the third region is configured to vibrate the display panel to output a sound of a middle-low-pitched sound band.

24. The display apparatus of claim 15, wherein a sound generating device in the first region, a sound generating device in the second region, and a sound generating device in the third region are on the same line.

25. The display apparatus of claim 1, wherein the first region comprises a $1\text{-}1^{st}$ region and a $1\text{-}2^{nd}$ region, and the second region comprises a $2\text{-}1^{st}$ region and a $2\text{-}2^{nd}$ region.

26. The display apparatus of claim 25, further comprising:
a fourth partition between the $1\text{-}1^{st}$ region and the $1\text{-}2^{nd}$ region; and
a fifth partition between the $2\text{-}1^{st}$ region and the $2\text{-}2^{nd}$ region.

27. The display apparatus of claim 26, further comprising:
at least one second pad in the $1\text{-}1^{st}$ region, the at least one second pad being at the first side;
at least one third pad or at least one fourth pad at the second side;
at least one thirteenth pad at at least one side of the fourth partition;
at least one fourteenth pad in the $1\text{-}2^{nd}$ region, the at least one fourteenth pad being at the second side of the first partition; and
at least one fifteenth pad at at least one side of the second partition.

28. The display apparatus of claim 27, further comprising at least one fifth pad or at least one sixth pad in the $1\text{-}1^{st}$ region, the at least one fifth pad or at least one sixth pad being at at least one side of the second partition.

29. The display apparatus of claim 26, further comprising:
at least one eighth pad in the $2\text{-}1^{st}$ region, the at least one eighth pad being at the first side;
at least one ninth pad or at least one tenth pad at the second side;
at least one sixteenth pad at at least one side of the fifth partition;
at least one seventeenth pad in the $2\text{-}2^{nd}$ region, the at least one seventeenth pad being at the second side; and
at least one eighteenth pad at at least one side of the third partition.

30. The display apparatus of claim 29, further comprising at least one eleventh pad or at least one twelfth pad in the $2\text{-}1^{st}$ region, and the at least one eleventh pad or at least one twelfth pad being at at least one side of the third partition.

31. The display apparatus of claim 27, further comprising:
at least one first member in the third region, the least one first member being at the first side;
at least one second member at at least one side of the second partition; and
at least one third member at at least one side of the third partition.

32. The display apparatus of claim 27, further comprising:
at least one first member in the third region, the at least one first member being at the first side;
at least one second member at at least one side of the second partition;

at least one third member ay at least one side of the third partition; and at least one fourth member at a side facing the at least one first member.

33. The display apparatus of claim 25, wherein:

a sound generating device in the 1-1$^{st}$ region and a sound generating device in the 1-2$^{nd}$ region comprises a sound generating device having the same structure; and a sound generating device in the 2-1$^{st}$ region and a sound generating device in the 2-2$^{nd}$ region comprises a sound generating device having the same structure.

34. The display apparatus of claim 25, wherein:

a sound generating device disposed in the 1-1$^{st}$ region and a sound generating device in the 2-1$^{st}$ region are configured to vibrate the display panel to output a middle-pitched sound band;

a sound generating device in the 1-2$^{nd}$ region and a sound generating device in the 2-2$^{nd}$ region are configured to vibrate the display panel to output a sound of a high-pitched sound band; and a sound generating device in the third region is configured to vibrate the display panel to output a sound of a middle-low-pitched sound band.

35. An automotive apparatus, comprising:

a vehicle body; and the display apparatus or the sound generating device of claim 1, the display apparatus or the sound generating device being in the vehicle body.

36. The automotive apparatus of claim 35, wherein a sound generating device in a left side and a sound generating device in a right side are symmetrical with respect to a driver seat or two front seats of the vehicle body.

37. The automotive apparatus of claim 35, wherein the sound generating device in the vehicle body outputs a sound of one or more of 150 Hz to 20 kHz, 2 kHz to 20 kHz, and 60 Hz to 150 Hz.

38. The display apparatus of claim 4, wherein the damper is a line that applies a sound signal to the at least one sound generating device.

39. The display apparatus of claim 38, wherein the damper includes:

a first damper to which positive power is applied; and a second damper to which negative power is applied.

40. The display apparatus of claim 4, wherein a shape of the damper is provided as a zigzag shape that has a constant thickness and width.

* * * * *